(12) United States Patent
Pragada et al.

(10) Patent No.: US 10,524,199 B2
(45) Date of Patent: Dec. 31, 2019

(54) METHOD AND APPARATUS FOR SUPPORTING PROXIMITY DISCOVERY PROCEDURES

(71) Applicant: INTERDIGITAL PATENT HOLDINGS, INC., Wilmington, DE (US)

(72) Inventors: Ravikumar V. Pragada, Warrington, PA (US); Saad Ahmad, Montreal (CA); Balaji Raghothaman, Chester Springs, PA (US); Samian J. Kaur, Plymouth Meeting, PA (US); Pascal M. Adjakple, Great Neck, NY (US); Ulises Olvera-Hernandez, London (GB); Zhuorong Deng, Brooklyn, NY (US); Kiran K. Vanganuru, San Diego, CA (US); Gregory S. Sternberg, Mt. Laurel, NJ (US); Guanzhou Wang, Brossard (CA); Michael F. Starsinic, Newtown, PA (US); Alexander Reznik, Pennington, NJ (US); Juan Carlos Zuniga, Montreal (CA); Eldad M. Zeira, Huntington, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/700,799

(22) Filed: Sep. 11, 2017

(65) Prior Publication Data

US 2017/0374611 A1    Dec. 28, 2017

Related U.S. Application Data

(63) Continuation of application No. 13/871,581, filed on Apr. 26, 2013, now Pat. No. 9,763,179.

(Continued)

(51) Int. Cl.
*H04W 48/18* (2009.01)
*H04W 76/14* (2018.01)
(Continued)

(52) U.S. Cl.
CPC ............ *H04W 48/18* (2013.01); *H04L 12/14* (2013.01); *H04L 67/16* (2013.01); *H04L 69/24* (2013.01);
(Continued)

(58) Field of Classification Search
CPC ..... H04W 88/06; H04W 92/02; H04W 88/02; H04W 68/00; H04W 76/02
(Continued)

(56) References Cited

U.S. PATENT DOCUMENTS 7,877,082 B2    1/2011    Eagle et al.
8,660,550 B2    2/2014    Jung et al.
(Continued)

FOREIGN PATENT DOCUMENTS

JP    2009111776 A    5/2009
WO    2003092218 A1   11/2003
(Continued)

OTHER PUBLICATIONS

ARM Limited, "ARM Security Technology Building a Secure System using TrustZone Technology," available at: http://infocenter.arm.com/help/topic/com.arm.doc.prd29-genc-009492c/PRD29-GENC-009492C_trustzone_security_whitepaper.pdf (last visited Feb. 14, 2014).

(Continued)

*Primary Examiner* — Congvan Tran
(74) *Attorney, Agent, or Firm* — Volpe and Koenig, P.C.

(57) ABSTRACT

A method and apparatus are described for supporting a two-stage device-to-device (D2D) discovery using a D2D interworking function (IWF). A D2D IWF component may (Continued)

be configured to perform mapping between an application running on an application server and a third generation partnership project (3GPP) network, and provide a set of application programming interfaces (APIs) to allow discovery to be provided as a service to D2D applications. An application identifier may be mapped to a 3GPP identifier. Further, a method and apparatus are described for performing client-server discovery. A first wireless transmit/receive unit (WTRU) may be configured for a listen-only operation, and a second WTRU may be configured to transmit beacons. The first and second WTRUs may perform a radio access network (RAN) discovery procedure at an access stratum (AS) layer. A method and apparatus for performing charging for D2D service using a D2D IWF are also described.

14 Claims, 42 Drawing Sheets

Related U.S. Application Data

(60) Provisional application No. 61/720,640, filed on Oct. 31, 2012, provisional application No. 61/695,625, filed on Aug. 31, 2012, provisional application No. 61/645,282, filed on May 10, 2012, provisional application No. 61/639,386, filed on Apr. 27, 2012.

(51) Int. Cl.
*H04W 8/00* (2009.01)
*H04W 84/04* (2009.01)
*H04L 29/06* (2006.01)
*H04W 12/06* (2009.01)
*H04L 12/14* (2006.01)
*H04M 15/00* (2006.01)
*H04W 4/24* (2018.01)
*H04L 29/08* (2006.01)
*H04W 8/20* (2009.01)
*H04W 8/24* (2009.01)
*H04W 60/04* (2009.01)

(52) U.S. Cl.
CPC ......... *H04M 15/8033* (2013.01); *H04W 4/24* (2013.01); *H04W 8/005* (2013.01); *H04W 12/06* (2013.01); *H04W 76/14* (2018.02); *H04W 84/042* (2013.01); *H04L 67/104* (2013.01); *H04L 67/1061* (2013.01); *H04W 8/20* (2013.01); *H04W 8/24* (2013.01); *H04W 60/04* (2013.01)

(58) Field of Classification Search
USPC ..... 455/426.1, 435.1, 437, 452.2, 41.1, 450; 370/235, 328, 338
See application file for complete search history.

(56) References Cited

U.S. PATENT DOCUMENTS

| | | | |
|---|---|---|---|
| 9,226,205 | B2 | 12/2015 | Pani et al. |
| 9,299,255 | B2 | 3/2016 | Yarnold et al. |
| 2004/0156346 | A1 | 8/2004 | O'Neill |
| 2005/0049001 | A1 | 3/2005 | Lazaridis |
| 2005/0094558 | A1 | 5/2005 | Lu |
| 2005/0232212 | A1* | 10/2005 | Kang ............... H04W 36/0061 370/338 |
| 2009/0257400 | A1 | 10/2009 | Perras |
| 2009/0268635 | A1 | 10/2009 | Gallagher et al. |
| 2010/0093364 | A1 | 4/2010 | Ribeiro et al. |
| 2010/0150267 | A1 | 6/2010 | Zangi |
| 2010/0167743 | A1 | 7/2010 | Palanki et al. |
| 2011/0098043 | A1* | 4/2011 | Yu ............... H04W 60/00 455/435.1 |
| 2011/0103318 | A1 | 5/2011 | Ekici et al. |
| 2011/0106952 | A1* | 5/2011 | Doppler ............ H04W 72/0406 709/226 |
| 2011/0258313 | A1 | 10/2011 | Mallik et al. |
| 2011/0258327 | A1 | 10/2011 | Phan et al. |
| 2011/0314287 | A1 | 12/2011 | Escott et al. |
| 2012/0014334 | A1 | 1/2012 | Oh et al. |
| 2012/0179789 | A1 | 7/2012 | Griot et al. |
| 2012/0184306 | A1* | 7/2012 | Zou ............... H04W 76/14 455/458 |
| 2012/0243431 | A1 | 9/2012 | Chen et al. |
| 2012/0300662 | A1 | 11/2012 | Wang et al. |
| 2012/0314660 | A1 | 12/2012 | Leppanen et al. |
| 2013/0064138 | A1* | 3/2013 | Hakola ............... H04L 67/16 370/255 |
| 2013/0065585 | A1 | 3/2013 | Pelletier et al. |
| 2013/0083684 | A1 | 4/2013 | Yeh et al. |
| 2013/0102314 | A1* | 4/2013 | Koskela ............ H04W 36/0072 455/436 |
| 2013/0109301 | A1* | 5/2013 | Hakola ............... H04W 76/14 455/39 |
| 2013/0136103 | A1* | 5/2013 | Kalhan ............... H04W 36/32 370/331 |
| 2013/0184024 | A1* | 7/2013 | Chen ............... H04W 76/14 455/509 |
| 2013/0223352 | A1* | 8/2013 | Sartori ............... H04W 76/14 370/329 |
| 2013/0223356 | A1 | 8/2013 | Khoshnevis et al. |
| 2013/0225130 | A1 | 8/2013 | Rost et al. |
| 2013/0272182 | A1 | 10/2013 | Li et al. |
| 2013/0288668 | A1 | 10/2013 | Pragada et al. |
| 2013/0324114 | A1 | 12/2013 | Raghothaman et al. |
| 2013/0331031 | A1 | 12/2013 | Palin et al. |
| 2014/0036718 | A1* | 2/2014 | Gao ............... H04W 72/121 370/254 |
| 2014/0064263 | A1 | 3/2014 | Cheng et al. |
| 2014/0106707 | A1 | 4/2014 | Bontu et al. |
| 2014/0112258 | A1 | 4/2014 | Vanderveen |
| 2014/0122607 | A1* | 5/2014 | Fodor ............... H04W 4/70 709/204 |
| 2014/0179330 | A1 | 6/2014 | Du et al. |
| 2014/0219261 | A1* | 8/2014 | Johnsson ............ H04W 8/005 370/338 |
| 2014/0256334 | A1* | 9/2014 | Kazmi ............... H04W 28/18 455/450 |
| 2014/0258434 | A1 | 9/2014 | Hong et al. |
| 2014/0274066 | A1* | 9/2014 | Fodor ............... H04W 36/08 455/437 |
| 2014/0328310 | A1* | 11/2014 | Xu ............... H04W 4/80 370/329 |
| 2015/0063091 | A1 | 3/2015 | Vesterinen et al. |
| 2015/0131475 | A1* | 5/2015 | Van Phan ........... H04W 8/26 370/254 |
| 2017/0105230 | A1 | 4/2017 | Matsumoto et al. |

FOREIGN PATENT DOCUMENTS

| | | |
|---|---|---|
| WO | 04/080103 | 9/2004 |
| WO | 06/117652 | 11/2006 |
| WO | 09/008615 | 1/2009 |
| WO | 10/039085 | 4/2010 |
| WO | 2010111150 A2 | 9/2010 |
| WO | 10/129930 | 11/2010 |
| WO | 2010127696 A1 | 11/2010 |
| WO | 11/052136 | 5/2011 |
| WO | 2011109941 A1 | 9/2011 |
| WO | 12/052911 | 4/2012 |
| WO | 13/163634 | 10/2013 |

OTHER PUBLICATIONS

Draft Standard for Information Technology—Telecommunications and information exchange between systems—Local and metropolitan area networks—Specific requirements; Part 11: Wireless LAN

(56) References Cited

OTHER PUBLICATIONS

Medium Access Control (MAC) and Physical Layer (PHY) specifications; Amendment 9: Interworking with External Networks, IEEE Std. 802.11u-2011 (Feb. 25, 2011).
IEEE P802.11ac/D2.0, "Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," (Jan. 2012).
IEEE P802.11ac/D4.2, "Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," (Jan. 2013).
IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2007 (Jun. 12, 2007).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Std 802.15.1-2005 (Revision of IEEE Std 802.15.1-2002), "IEEE Standard for Information Technology—Telecommunications and Information Exchange Between Systems—Local and Metropolitan Area Networks—Specific Requirements, Part 15.1: Wireless Medium Access Control (MAC) and Physical Layer (PHY) Specifications For Wireless Personal Area Networks (WPANs)," (Jun. 14, 2005).
Melia et al., "Logical Interface Support for multi-mode IP Hosts," NETEXT WG, Internet-Draft (Oct. 24, 2010).
Rescorla et al., "Datagram Transport Layer Security Version 1.2," Internet Engineering Task Force (IETF), Request for Comments: 6347 (Jan. 2012).
Sesia et al., "LTE—The UMTS Long Term Evolution: From Theory to Practice," John Wiley & Sons, Ltd., 2nd edition (2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.1.0 (Mar. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.7.0 (Mar. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.10.0 (Dec. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.9.0 (Dec. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.5.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.10.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.19.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.14.1 (Mar. 2013).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.9.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.3.0 (Mar. 2013).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.10.0 (Jun. 2013).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.4.0 (Dec. 2011).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).
Third Generation Partnership Project, "Technical Specification Group Radio Access Network; Evolved Universal Terrestrial Radio Access (E-UTRA); Physical Channels and Modulation (Release 11," 3GPP TS 36.211 V11.2.0 (Feb. 2013).

(56) References Cited

OTHER PUBLICATIONS

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2012).

Third Generation Partnership Project, "Technical Specification Group Services and System Aspects; System Improvements for Machine-Type Communications; (Release 11)," 3GPP TR 23.888 V1.2.0 (Apr. 2011).

Third Generation Partnership Project, "Technical Specification Group Services and System Aspects; System Improvements for Machine-Type Communications; (Release 11)," 3GPP TR 23.888 V1.6.0 (Feb. 2012).

Third Generation Partnership Project, "Technical Specification Group Services and System Aspects; System Improvements for Machine-Type Communications (MTC) (Release 11)," 3GPP TR 23.888 V11.0.0 (Sep. 2012).

Third Generation Partnership Project, "Technical Specification Group Services and System Aspects; Architecture enhancements to facilitate communications with packet data networks and applications (Release 11)," 3GPP TS 23.682 V11.0.0 (Mar. 2012).

Third Generation Partnership Project, "Technical Specification Group Services and System Aspects; Architecture enhancements to facilitate communications with packet data networks and applications (Release 11)," 3GPP TS 23.682 V11.3.0 (Dec. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.12.0 (Mar. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.7.0 (Mar. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.18.0 (Mar. 2013).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.15.0 (Mar. 2013).

Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.10.0 (Mar. 2013).

Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.5.0 (Mar. 2013).

Third Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.0.0 (Mar. 2013).

Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.1.0 (Mar. 2012).

Third Generation Partnership Project, "Technical Specification Group Services and System Aspects; Architecture enhancements for non-3GPP accesses (Release 8)," 3GPP TS 23.402 V8.10.0 (Mar. 2012).

Third Generation Partnership Project, "Technical Specification Group Services and System Aspects; Architecture enhancements for non-3GPP accesses (Release 10)," 3GPP TS 23.402 V10.7.0 (Mar. 2012).

Third Generation Partnership Project, "Technical Specification Group Services and System Aspects; Architecture enhancements for non-3GPP accesses (Release 11)," 3GPP TS 23.402 V11.2.0 (Mar. 2012).

Third Generation Partnership Project, "Technical Specification Group Services and System Aspects; Architecture enhancements for non-3GPP accesses (Release 9)," 3GPP TS 23.402 V9.12.0 (Mar. 2012).

Third Generation Partnership Project, "Technical Specification Group Services and System Aspects; Architecture enhancements for non-3GPP accesses (Release 10)," 3GPP TS 23.402 V10.8.0 (Sep. 2012).

Third Generation Partnership Project, "Technical Specification Group Services and System Aspects; Architecture enhancements for non-3GPP accesses (Release 12)," 3GPP TS 23.402 V12.0.0 (Mar. 2013).

Third Generation Partnership Project, "Technical Specification Group Services and System Aspects; Architecture enhancements for non-3GPP accesses (Release 11)," 3GPP TS 23.402 V11.6.0 (Mar. 2013).

Third Generation Partnership Project, "Technical Specification Group Services and System Aspects; Functional stage 2 description of Location Services (LCS) (Release 10)," 3GPP TS 23.271 V10.4.0 (Mar. 2013).

Third Generation Partnership Project, "Technical Specification Group Services and System Aspects; Functional stage 2 description of Location Services (LCS) (Release 11)," 3GPP TS 23.271 V11.2.0 (Mar. 2013).

Third Generation Partnership Project, "Technical Specification Group Services and System Aspects; Functional stage 2 description of Location Services (LCS) (Release 10)," 3GPP TS 23.271 V10.2.0 (Mar. 2011).

Third Generation Partnership Project, "Technical Specification Group Services and System Aspects; Functional stage 2 description of Location Services (LCS) (Release 7)," 3GPP TS 23.271 V7.10.0 (Dec. 2009).

Third Generation Partnership Project, "Technical Specification Group Services and System Aspects; Functional stage 2 description of Location Services (LCS) (Release 9)," 3GPP TS 23.271 V9.8.0 (Mar. 2013).

Third Generation Partnership Project, "Technical Specification Group Services and System Aspects; Functional stage 2 description of Location Services (LCS) (Release 8)," 3GPP TS 23.271 V8.1.0 (Dec. 2009).

Third Generation Partnership Project, "Technical Specification Group Services and System Aspects; Functional stage 2 description of Location Services (LCS) (Release 9)," 3GPP TS 23.271 V9.6.0 (Mar. 2011).

Third Generation Partnership Project, "Technical Specification Group Services and System Aspects; Network architecture (Release 12)," 3GPP TS 23.002 V12.1.0 (Dec. 2012).

Third Generation Partnership Project, "Technical Specification Group Services and System Aspects; Network architecture (Release 9)," 3GPP TS 23.002 V9.6.0 (Sep. 2011).

Third Generation Partnership Project, "Technical Specification Group Services and System Aspects; Network architecture (Release 10)," 3GPP TS 23.002 V10.5.0 (Dec. 2012).

(56) References Cited

OTHER PUBLICATIONS

Third Generation Partnership Project, "Technical Specification Group Services and System Aspects; Network architecture (Release 11)," 3GPP TS 23.002 V11.2.0 (Mar. 2012).
Third Generation Partnership Project, "Technical Specification Group Services and System Aspects; Network architecture (Release 10)," 3GPP TS 23.002 V10.4.0 (Dec. 2011).
Third Generation Partnership Project, "Technical Specification Group Services and System Aspects; Network architecture (Release 7)," 3GPP TS 23.002 V7.6.0 (Dec. 2008).
Third Generation Partnership Project, "Technical Specification Group Services and System Aspects; Network architecture (Release 11)," 3GPP TS 23.002 V11.5.0 (Dec. 2012).
Third Generation Partnership Project, "Technical Specification Group Services and System Aspects; Network architecture (Release 8)," 3GPP TS 23.002 V8.7.0 (Dec. 2010).
Third Generation Partnership Project, "Technical Specification Group Services and System Aspects; Feasibility study for Proximity Services (ProSe) (Release 12)," 3GPP TR 22.803 V12.1.0 (Mar. 2013).
Third Generation Partnership Project, "Technical Specification Group SA; Feasibility Study for Proximity Services (ProSe) (Release 12)," 3GPP TR 22.803 V0.2.0 (Feb. 2012).
Third Generation Partnership Project, "Technical Specification Group Core Network and Terminals; Non-Access-Stratum (NAS) protocol for Evolved Packet System (EPS); Stage 3(Release 8)," 3GPP TS 24.301 V8.10.0 (Jun. 2011).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.6.1 (Mar. 2012).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.9.0 (Mar. 2012).
Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.2.1 (Mar. 2012).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.11.0 (Mar. 2013).
Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.6.0 (Mar. 2013).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.10.0 (Mar. 2013).
Third Generation Partnership Project, "Technical Specification Group Core Network and Terminals; Non-Access-Stratum (NAS) protocol for Evolved Packet System (EPS); Stage 3 (Release 12)," 3GPP TS 24.301 V12.0.0 (Mar. 2013).
Third Generation Partnership Project, "Technical Specification Group Core Network and Terminals; Access to the 3GPP Evolved Packet Core (EPC) via non-3GPP access networks; Stage 3 (Release 8)," 3GPP TS 24.302 V8.10.0 (Sep. 2011).
Third Generation Partnership Project, "Technical Specification Group Core Network and Terminals; Access to the 3GPP Evolved Packet Core (EPC) via non-3GPP access networks; Stage 3 (Release 9)," 3GPP TS 24.302 V9.7.0 (Sep. 2011).
Third Generation Partnership Project, "Technical Specification Group Core Network and Terminals; Access to the 3GPP Evolved Packet Core (EPC) via non-3GPP access networks; Stage 3 (Release 10)," 3GPP TS 24.302 V10.7.0 (Mar. 2012).
Third Generation Partnership Project, "Technical Specification Group Core Network and Terminals; Access to the 3GPP Evolved Packet Core (EPC) via non-3GPP access networks; Stage 3 (Release 12)," 3GPP TS 24.302 V12.0.0 (Mar. 2013).
Third Generation Partnership Project, "Technical Specification Group Core Network and Terminals; Access to the 3GPP Evolved Packet Core (EPC) via non-3GPP access networks; Stage 3 (Release 11)," 3GPP TS 24.302 V11.6.0 (Mar. 2013).
Third Generation Partnership Project, "Technical Specification Group Core Network and Terminals; Access to the 3GPP Evolved Packet Core (EPC) via non-3GPP access networks; Stage 3 (Release 11)," 3GPP TS 24.302 V11.7.0 (Jun. 2013).
Third Generation Partnership Project, "Technical Specification Group Core Network and Terminals; Access Network Discovery and Selection Function (ANDSF) Management Object (MO) (Release 11)," 3GPP TS 24.312 V11.2.0 (Mar. 2012).
Third Generation Partnership Project, "Technical Specification Group Core Network and Terminals; Access Network Discovery and Selection Function (ANDSF) Management Object (MO) (Release 10)," 3GPP TS 24.312 V10.6.0 (Jun. 2012).
Third Generation Partnership Project, "Technical Specification Group Core Network and Terminals; Access Network Discovery and Selection Function (ANDSF) Management Object (MO) (Release 10)," 3GPP TS 24.312 V10.5.0 (Mar. 2012).
Third Generation Partnership Project, "Technical Specification Group Core Network and Terminals; Access Network Discovery and Selection Function (ANDSF) Management Object (MO) (Release 12)," 3GPP TS 24.312 V12.0.0 (Mar. 2013).
Third Generation Partnership Project, "Technical Specification Group Core Network and Terminals; Access Network Discovery and Selection Function (ANDSF) Management Object (MO) (Release 11)," 3GPP TS 24.312 V11.6.0 (Mar. 2013).
Third Generation Partnership Project, "Technical Specification Group Core Network and Terminals; Access Network Discovery and Selection Function (ANDSF) Management Object (MO) (Release 9)," 3GPP TS 24.312 V9.2.0 (Sep. 2011).
Third Generation Partnership Project, "Technical Specification Group Core Network and Terminals; Access Network Discovery and Selection Function (ANDSF) Management Object (MO) (Release 8)," 3GPP TS 24.312 V8.6.0 (Jun. 2012).
Third Generation Partnership Project, "Technical Specification Group Core Network and Terminals; Access Network Discovery and Selection Function (ANDSF) Management Object (MO) (Release 8)," 3GPP TS 24.312 V8.5.0 (Mar. 2010).
Third Generation Partnership Project, "Technical Specification Group Core Network and Terminals; Access Network Discovery and Selection Function (ANDSF) Management Object (MO) (Release 9)," 3GPP TS 24.312 V9.3.0 (Jun. 2012).
Third Generation Partnership Project, "Technical Specification Group Radio Access Network; Evolved Universal Terrestrial Radio Access (E-UTRA); Physical layer procedures (Release 11)," 3GPP TS 36.213 V11.2.0 (Feb. 2013).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.8.0 (Mar. 2013).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.2.0 (Mar. 2013).
Third Generation Partnership Project, "Technical Specification Group Services and System Aspects; Generic Authentication Architecture (GAA); Generic bootstrapping architecture (Release 7)," 3GPP TS 33.220 V7.11.0 (Mar. 2008).
Third Generation Partnership Project, "Technical Specification Group Services and System Aspects; Generic Authentication Architecture (GAA); Generic Bootstrapping Architecture (GBA) (Release 11)," 3GPP TS 33.220 V11.4.0 (Sep. 2012).
Third Generation Partnership Project, "Technical Specification Group Services and System Aspects; Generic Authentication Architecture (GAA); Generic bootstrapping architecture (GBA) (Release 9)," 3GPP TS 33.220 V9.4.0 (Mar. 2012).
Third Generation Partnership Project, "Technical Specification Group Services and System Aspects; Generic Authentication Architecture (GAA); Generic bootstrapping architecture (GBA) (Release 11)," 3GPP TS 33.220 V11.2.0 (Mar. 2012).

(56) References Cited

OTHER PUBLICATIONS

Third Generation Partnership Project, "Technical Specification Group Services and System Aspects; Generic Authentication Architecture (GAA); Generic bootstrapping architecture (GBA) (Release 12)," 3GPP TS 33.220 V12.0.0 (Mar. 2013).
Third Generation Partnership Project, "Technical Specification Group Services and System Aspects; Generic Authentication Architecture (GAA); Generic bootstrapping architecture (GBA) (Release 8)," 3GPP TS 33.220 V8.9.0 (Mar. 2012).
Third Generation Partnership Project, "Technical Specification Group Services and System Aspects; Generic Authentication Architecture (GAA); Generic bootstrapping architecture (GBA) (Release 10)," 3GPP TS 33.220 V10.1.0 (Mar. 2012).
Third Generation Partnership Project, "Technical Specification Group Core Network and Terminals; IP Multimedia Subsystem (IMS) Application Level Gateway (IMS-ALG)—IMS Access Gateway (IMS-AGW) interface: Procedures descriptions (Release 11)," 3GPP TS 23.334 V11.2.0 (Dec. 2012).
Third Generation Partnership Project, "Technical Specification Group Core Network and Terminals; IP Multimedia Subsystem (IMS) Application Level Gateway (IMS-ALG)—IMS Access Gateway (IMS-AGW) interface: Procedures descriptions (Release 10)," 3GPP TS 23.334 V10.3.0 (Dec. 2011).
Third Generation Partnership Project, "Technical Specification Group Core Network and Terminals; IP Multimedia Subsystem (IMS) Application Level Gateway (IMS-ALG)—IMS Access Gateway (IMS-AGW) interface: Procedures descriptions (Release 11)," 3GPP TS 23.334 V11.0.0 (Mar. 2012).
Third Generation Partnership Project, "Technical Specification Group Core Network and Terminals; IP Multimedia Subsystem (IMS) Application Level Gateway (IMS-ALG)—IMS Access Gateway (IMS-AGW) interface: Procedures descriptions (Release 10)," 3GPP TS 23.334 V10.5.0 (Dec. 2012).
Third Generation Partnership Project, "Technical Specification Group Core Network and Terminals; IP Multimedia Subsystem (IMS) Application Level Gateway (IMS-ALG)—IMS Access Gateway (IMS-AGW) interface: Procedures descriptions (Release 9)," 3GPP TS 23.334 V9.3.0 (Sep. 2010).
Third Generation Partnership Project, "Technical Specification Group Core Network and Terminals; Cx and Dx interfaces based on the Diameter protocol; Protocol details (Release 11)," 3GPP TS 29.229 V11.3.0 (Mar. 2013).
Third Generation Partnership Project, "Technical Specification Group Core Network and Terminals; Cx and Dx interfaces based on the Diameter protocol; Protocol details (Release 11)," 3GPP TS 29.229 V11.0.0 (Dec. 2011).
Third Generation Partnership Project, "Technical Specification Group Core Network and Terminals; Cx and Dx interfaces based on the Diameter protocol; Protocol details (Release 10)," 3GPP TS 29.229 V10.5.0 (Mar. 2013).
Third Generation Partnership Project, "Technical Specification Group Core Network and Terminals; Cx and Dx interfaces based on the Diameter protocol; Protocol details (Release 10)," 3GPP TS 29.229 V10.3.0 (Dec. 2011).
Third Generation Partnership Project, "Technical Specification Group Core Network and Terminals; Cx and Dx interfaces based on the Diameter protocol; Protocol details (Release 9)," 3GPP TS 29.229 V9.7.0 (Mar. 2013).
Third Generation Partnership Project, "Technical Specification Group Core Network and Terminals; Cx and Dx interfaces based on the Diameter protocol; Protocol details (Release 9)," 3GPP TS 29.229 V9.5.0 (Dec. 2011).
Third Generation Partnership Project, "Technical Specification Group Core Network and Terminals; Cx and Dx interfaces based on the Diameter protocol; Protocol details (Release 8)," 3GPP TS 29.229 V8.15.0 (Mar. 2013).
Third Generation Partnership Project, "Technical Specification Group Core Network and Terminals; Cx and Dx interfaces based on the Diameter protocol; Protocol details (Release 8)," 3GPP TS 29.229 V8.13.0 (Dec. 2011).
Third Generation Partnership Project, "Technical Specification Group Core Network and Terminals; Cx and Dx interfaces based on the Diameter protocol; Protocol details (Release 7)," 3GPP TS 29.229 V7.12.0 (Mar. 2013).
Third Generation Partnership Project, "Technical Specification Group Core Network and Terminals; Cx and Dx interfaces based on the Diameter protocol; Protocol details (Release 7)," 3GPP TS 29.229 V7.11.0 (Jun. 2011).
Third Generation Partnership Project, "Technical Specification Group Core Network and Terminals; Cx and Dx interfaces based on the Diameter protocol; Protocol details (Release 6)," 3GPP TS 29.229 V6.11.0 (Sep. 2009).
Third Generation Partnership Project, "Technical Specification Group Core Network; Cx and Dx interfaces based on the Diameter protocol; Protocol details (Release 5)," 3GPP TS 29.229 V5.13.0 (Sep. 2007).
TSG SA WG1, "WID on Proposal for a study on Proximity-based Services," 3GPP TSG SA Plenary Meeting #53, SP-110638,Fukuoka, Japan (Sep. 19-21, 2011.
Third Generation Partnership Project, "Technical Specification Group Core Network and Terminals; Mobile radio interface Layer 3 specification; Core network protocols; Stage 3 (Release 11)," 3GPP TS 24.008 V11.2.1 (Mar. 2012).
Third Generation Partnership Project, "Technical Specification Group Core Network and Terminals; Mobile radio interface Layer 3 specification; Core network protocols; Stage 3 (Release 11)," 3GPP TS 24.008 V11.6.0 (Mar. 2013).
Third Generation Partnership Project, "Technical Specification Group Core Network and Terminals; Mobile radio interface Layer 3 specification; Core network protocols; Stage 3 (Release 12)," 3GPP TS 24.008 V12.1.0 (Mar. 2013).
Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.5.0 (Mar. 2012).
Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.6.0 (Jun. 2012).
Third Generation Partnership Project, "Technical Specification Group Radio Access Network; Evolved Universal Terrestrial Radio Access Network (E-UTRAN); S1 Application Protocol (S1AP) (Release 11)," 3GPP TS 36.413 V11.3.0 (Mar. 2013).

\* cited by examiner

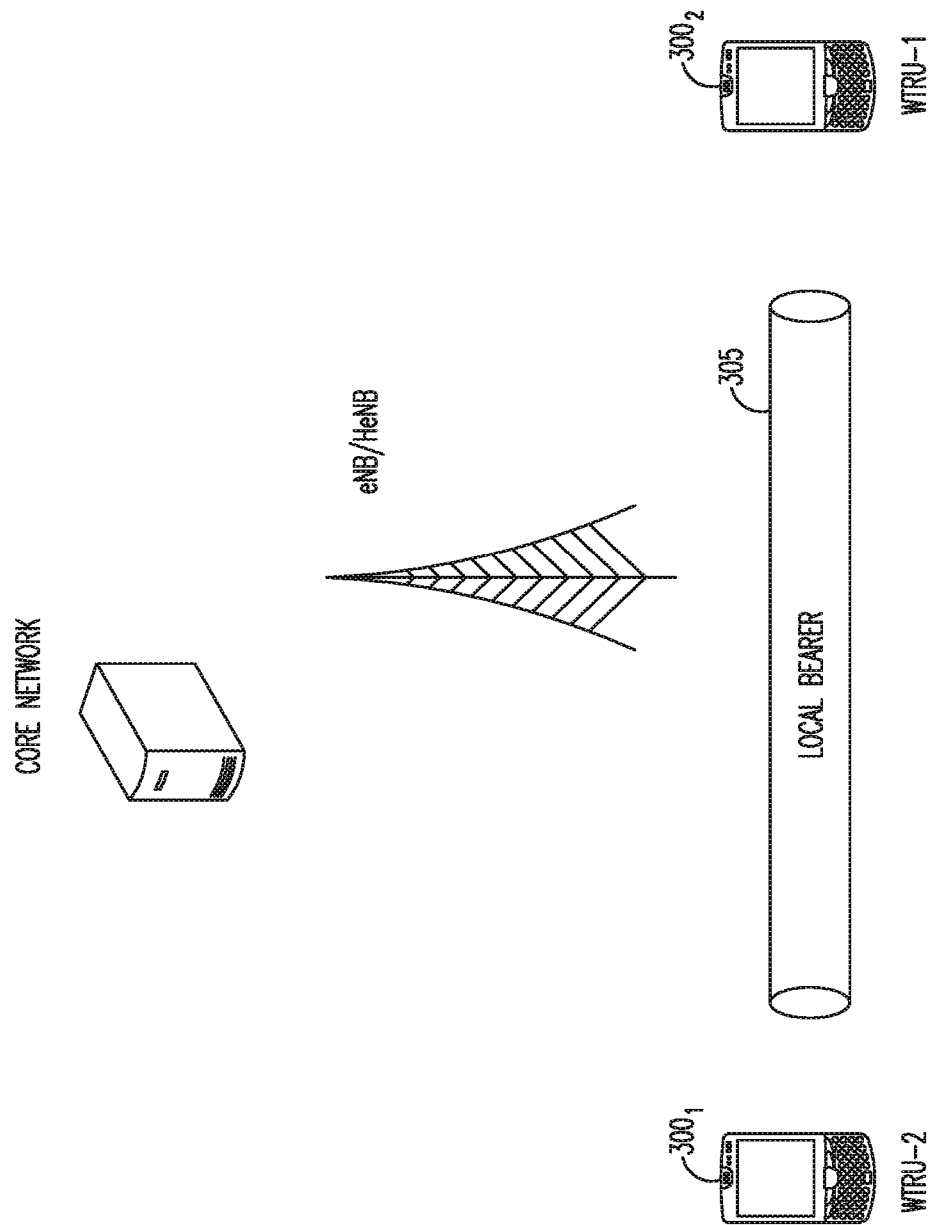

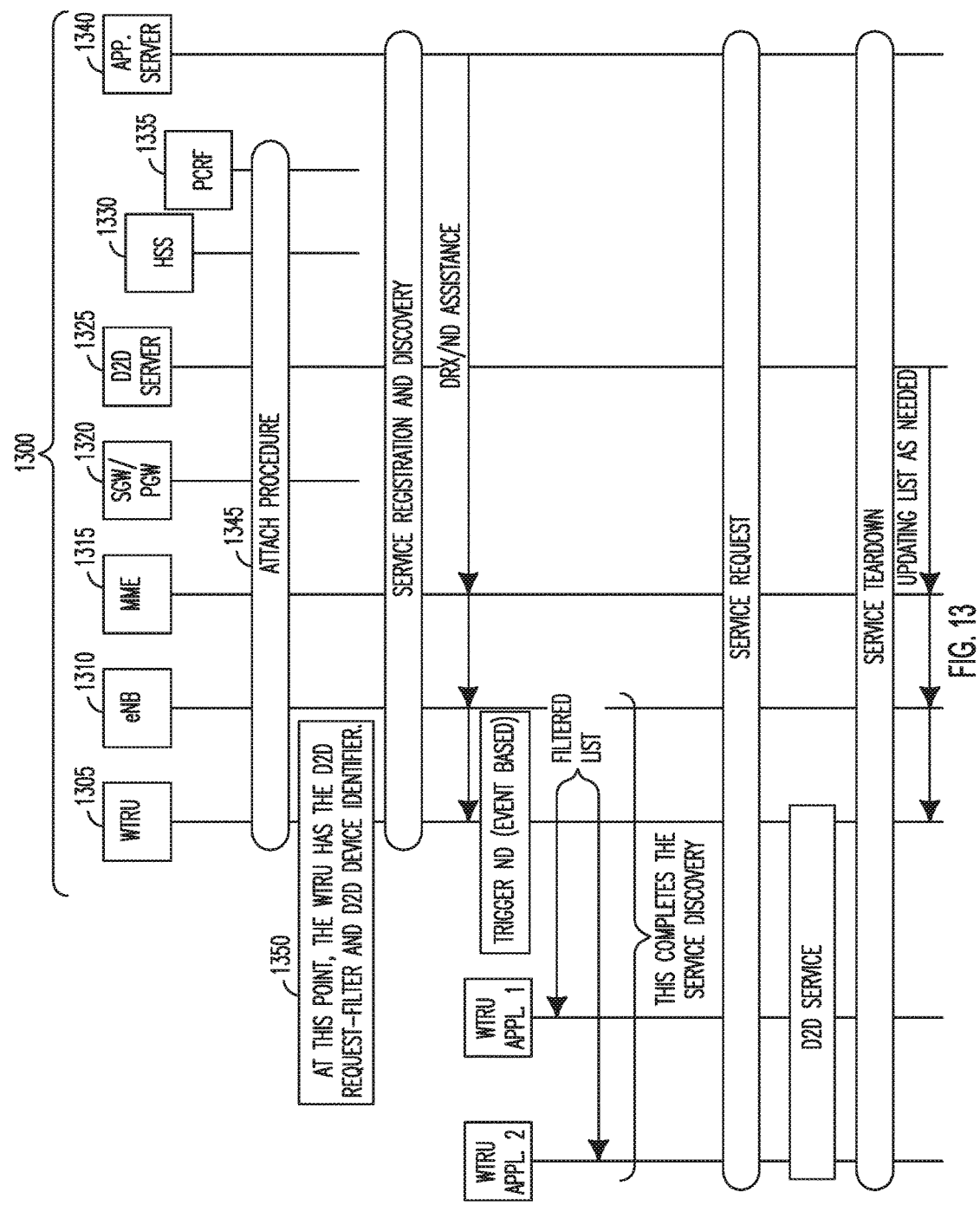

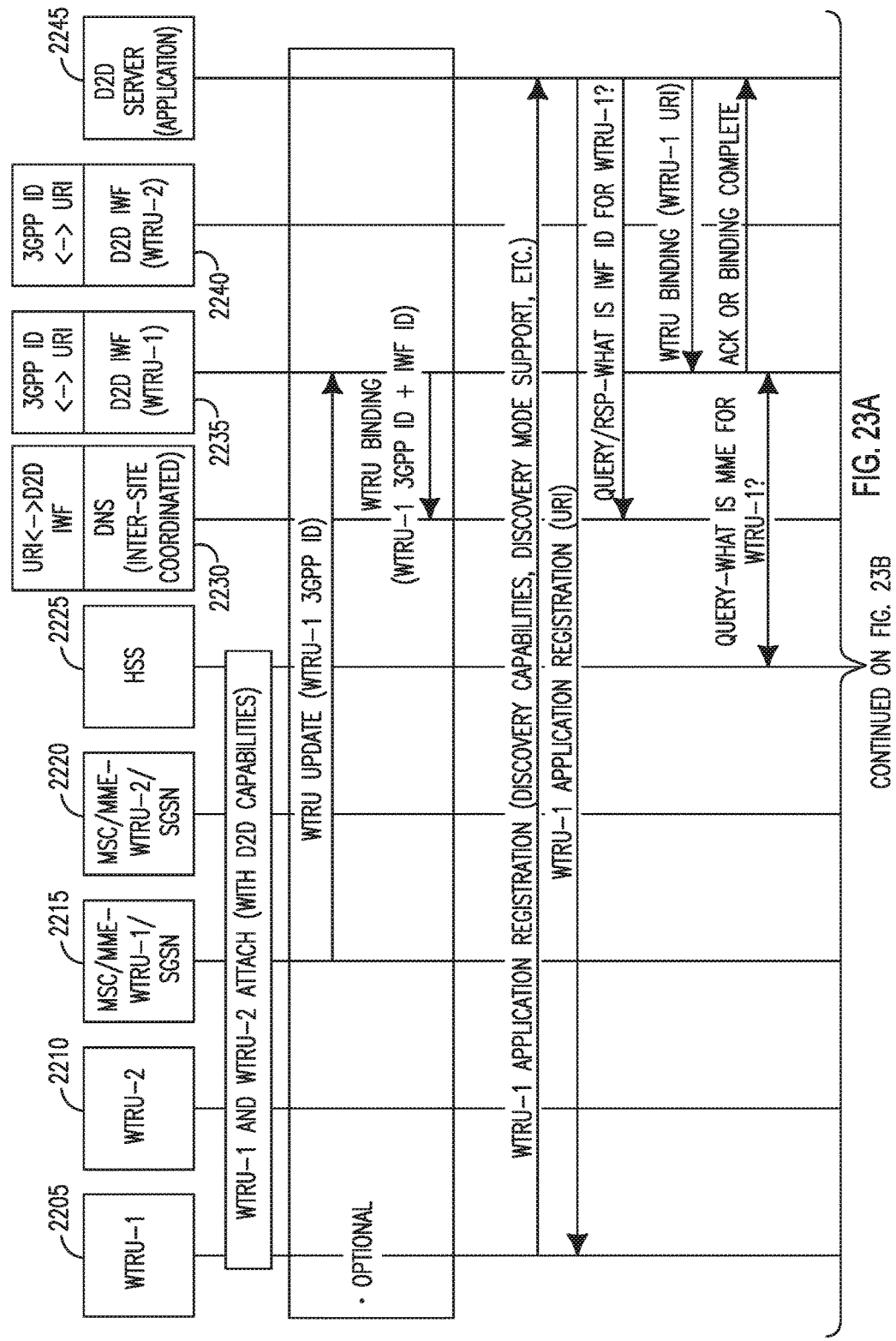

METHOD AND APPARATUS FOR SUPPORTING PROXIMITY DISCOVERY PROCEDURES

CROSS REFERENCE TO RELATED APPLICATIONS

This application is a continuation of U.S. patent application Ser. No. 13/871,581, filed Apr. 26, 2013, which claims the benefit of U.S. Provisional Application Ser. No. 61/639,386 filed Apr. 27, 2012, U.S. Provisional Application Ser. No. 61/645,282 filed May 10, 2012, U.S. Provisional Application Ser. No. 61/695,625 filed Aug. 31, 2012, and U.S. Provisional Application Ser. No. 61/720,640 filed Oct. 31, 2012, the contents of which are incorporated herein by reference in their entirety.

BACKGROUND

Proximity-based applications and services may have sociological and/or technological implications. At least one principle of proximity-based applications may be to discover one or more instances of the applications running in one or more devices that may be within proximity of each other. Proximity-based applications may also exchange or share application-related data or other events.

Device-to-device (D2D) communication between devices may take place after D2D-capable devices are made aware of the presence of other peer devices in their vicinity, and of the services that those devices offer and/or participate in. The discovery process may be viewed as distinct from the data communication process itself. From the radio perspective, it is possible that the device discovery may happen in a different frequency, as compared to the communication, (in this case, the judgment of the quality of the D2D link in the discovery frequency may have to be translated into a judgment of the corresponding D2D data link frequencies). One may envision discovery over a physical link between the devices, followed by communication over a local path that does not involve a direct physical D2D link. In addition, discovery may be performed by a wireless communication system, including at least one of radio access network (RAN) or core network (CN) elements, since the system may monitor the location of devices that are attached to it.

One of the main aspects of D2D communications is service discovery. The wireless transmit/receive units (WTRUs) that are involved in D2D communications need to develop a real-time awareness of their surrounding WTRUs in terms of the services that are supported by their peers. This awareness may help WTRUs to either participate or provide services to their peers. In most cases, the discovery is followed by communication, but in some cases, the discovery may be an end result in itself and need not be followed by any data communication.

Before a WTRU's D2D service may be operational, device discovery has to be performed, wherein WTRUs obtain lower layer device addresses for their neighbors that are also willing and able to participate in D2D communication. Service discovery is the process where the WTRU discovers the services that the discoverable users support and the corresponding service identities. Since service discovery is the ultimate goal of the process, it is desirable to tie device and service discovery together in the overall architecture and system design. Device and service discovery may be executed independently from one another before D2D services may be supplied, (e.g., discovery itself may be a service).

SUMMARY

A method and apparatus are described for supporting proximity discovery procedures. A two-stage discovery procedure may be implemented that includes both device and service discovery. Procedures to configure device and service discovery upon a third generation partnership project (3GPP) system attach and WTRU mobility are also described. For example, the system may retrieve user preferences regarding proximity from the attach message itself, or from the subscriber profile upon system attachment. Proximity configuration information, (e.g., buddy lists, location context, application applicability based on location), may be updated as the WTRU moves, e.g., through tracking area updates (TAUs) and handover (HO). Procedures may be implemented to enable a WTRU to register to specific device-to-device (D2D) proximity-based services. Procedures to combine device registration and application/service enablement are also described. Procedures are also described to enable discovery of proximity devices through multiple Radio Access Technologies (RATs). Unique identifiers (IDs) may be used across multiple RATs, and triggering of device discovery may occur across the RATs.

BRIEF DESCRIPTION OF THE DRAWINGS

A more detailed understanding may be had from the following description, given by way of example in conjunction with the accompanying drawings wherein:

FIG. 3A shows an example of establishing a direct WTRU-to-WTRU bearer with no intermediate nodes involved;

FIG. 13 is a signal flow diagram of a possible D2D service sequence;

FIGS. 23A-23C, as taken together, are a signal flow diagram of an example device-initiated directed service discovery procedure;

DETAILED DESCRIPTION

Figure 1A:
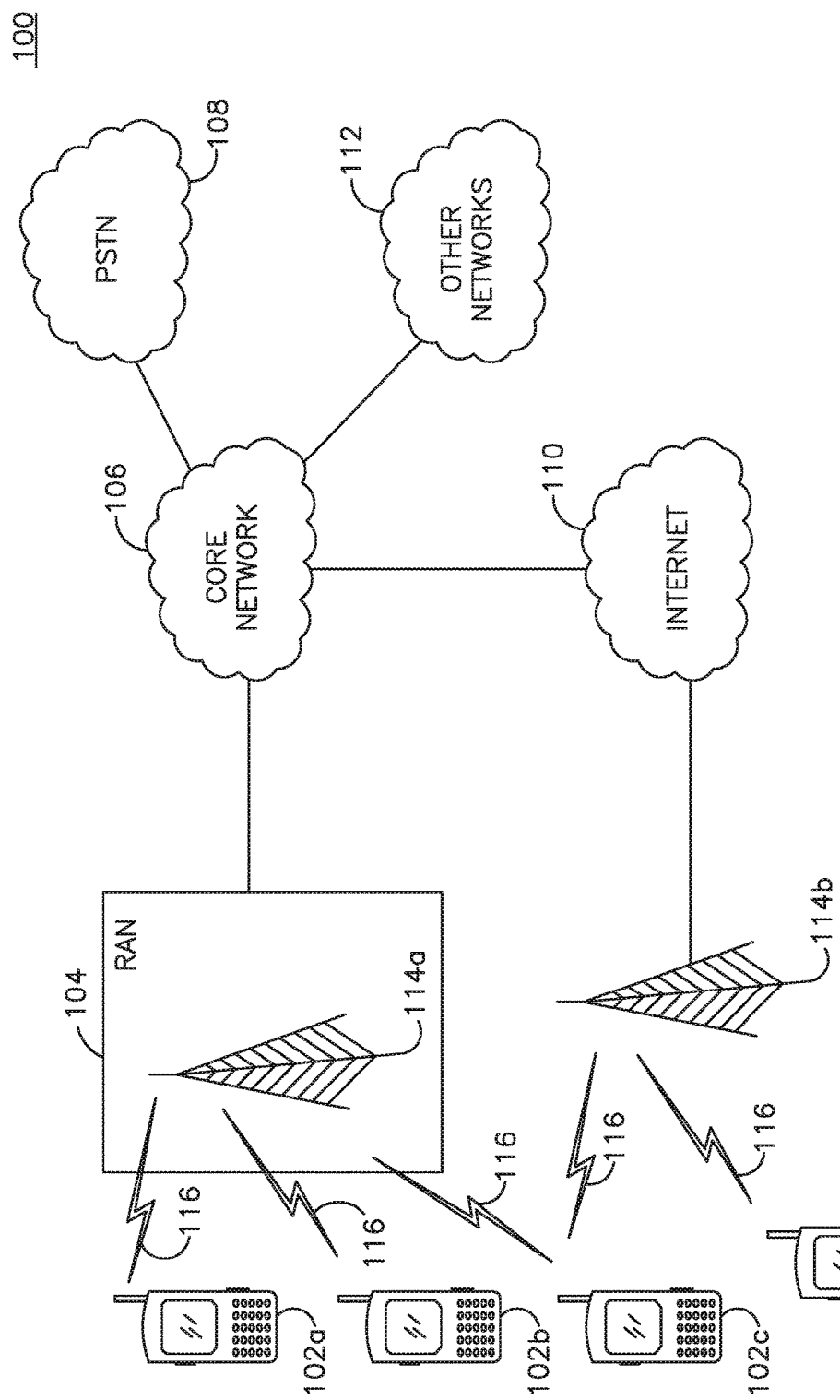
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1X, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
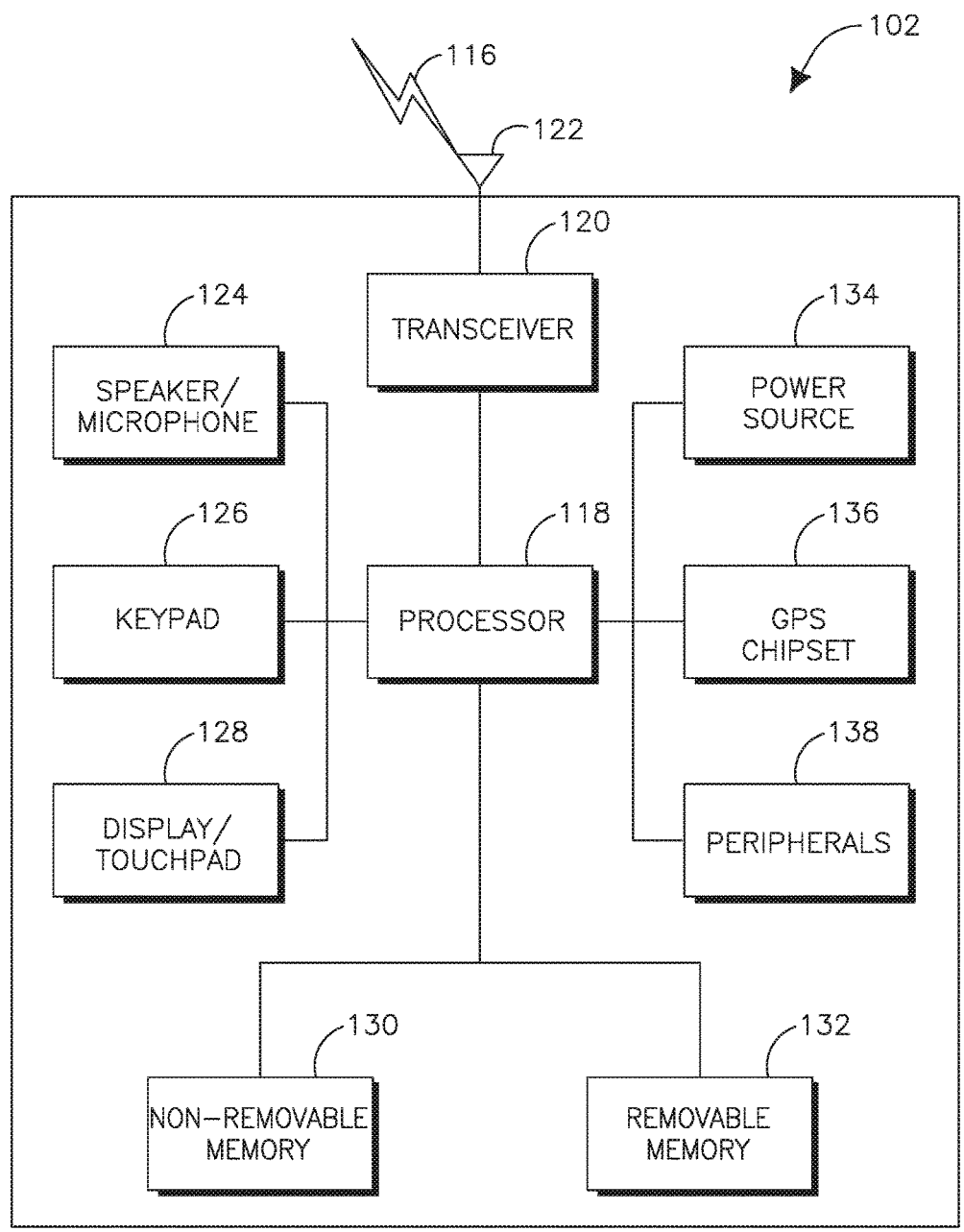
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
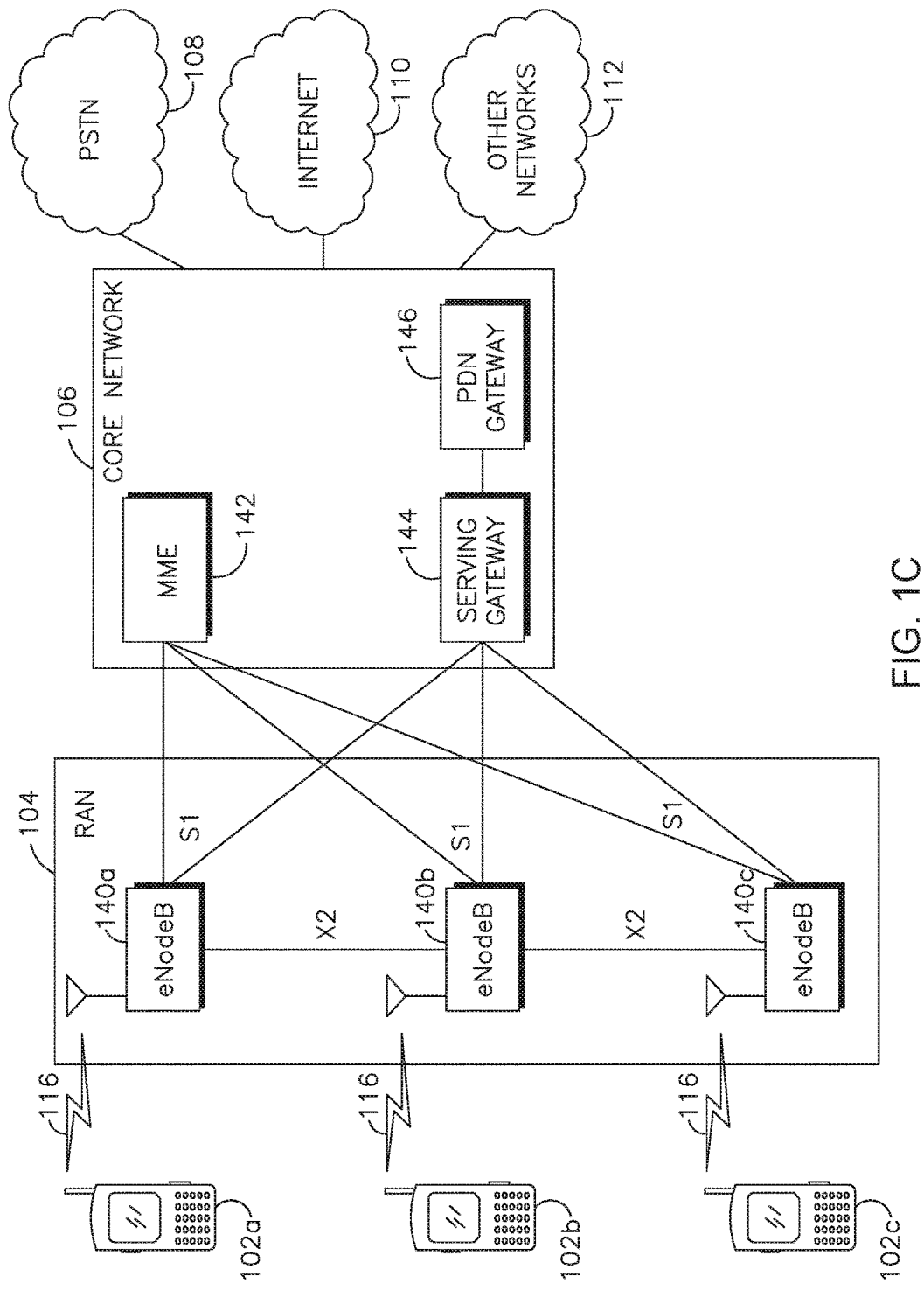
FIG. 1C shows an example radio access network and an example core network that may be used within the communications system shown in FIG. 1A.

FIG. 1C shows an example RAN 104 and an example core network 106 that may be used within the communications system 100 shown in FIG. 1A.

As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

GPS technology and/or related standards have the opportunity to become the platform of choice to enable proximity-based discovery and communication between devices, and promote a vast array of future and more advanced proximity-based applications and services.

There has been a considerable interest in proximity-based services. Use cases are being studied and potential requirements and functionalities are being identified for operator network-controlled discovery and communications between devices that are in proximity, under continuous network control, and/or are under 3GPP LTE network coverage. 3GPP proximity-based service may be enabled for commercial/social use, network offloading, public safety, and integration of current infrastructure services, (to assure the consistency of the user experience including reachability and mobility aspects), and public safety, in case of the absence of evolved universal mobile telecommunications system terrestrial radio access network (EUTRAN) coverage, (subject to regional regulation and operator policy, and limited to specific public-safety designated frequency bands and terminals).

The general scenarios of these proximity-based services may involve the WTRU proximity discovery, the WTRU consent to being discoverable, contactable or conversational, the proximity WTRU-to-WTRU (i.e., end-to-end) communications, and the controllability and policies by the network or operators to the discovery, discoverability and the subsequent forms of communication.

Figure 2A:
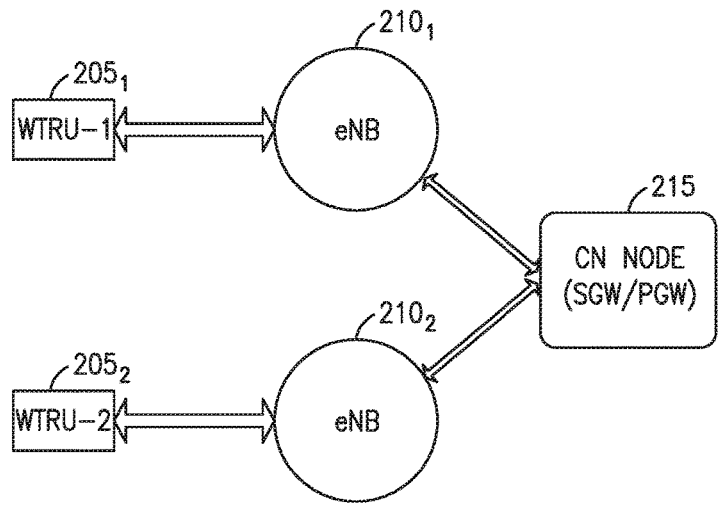
FIG. 2A shows an example of communications by two WTRUs in proximity of each other via respective evolved Node-Bs (eNBs) to a core network (CN) node, (e.g., serving gateway (SGW) or packet data network (PDN) gateway (PGW)

FIG. 2A shows an example of communications by two WTRUs $205_1$ and $205_2$ in proximity of each other via respective evolved Node-Bs (eNBs) $205_1$ and $205_2$ to a core network (CN) node 215, (e.g., a serving gateway (SGW) or a packet data network (PDN) gateway (PGW)). On a condition that the WTRUs 205 happen to be close to each other, then any communication between these WTRUs 205 may have to be routed via the CN node 215. The WTRUs 205 may be configured, for example, in a manner similar to the configuration of the WTRUs 102 depicted by FIGS. 1A-1C.

The communications between proximity WTRUs may be enhanced to take other paths, such as direct (e.g., direct radio path in licensed/unlicensed spectrum within certain distance), or indirect, (through network elements—intra/inter-cell or intra/inter-eNB or S-GW and the like), which may be controlled by the network or by operators.

Figure 2B:
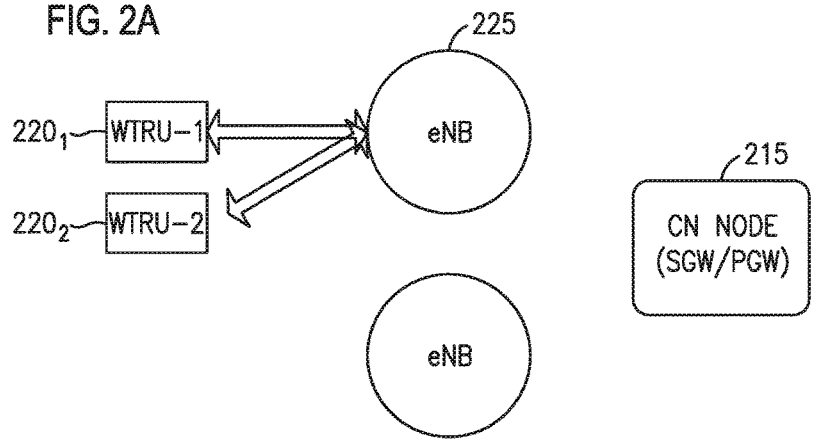
FIG. 2B shows an example of data paths for proximity communications between two WTRUs that are locally routed via an eNB.

FIG. 2B shows an example of data paths for proximity communications between two WTRUs $220_1$ and $220_2$ that are locally routed via an eNB 225.

Figure 2C:
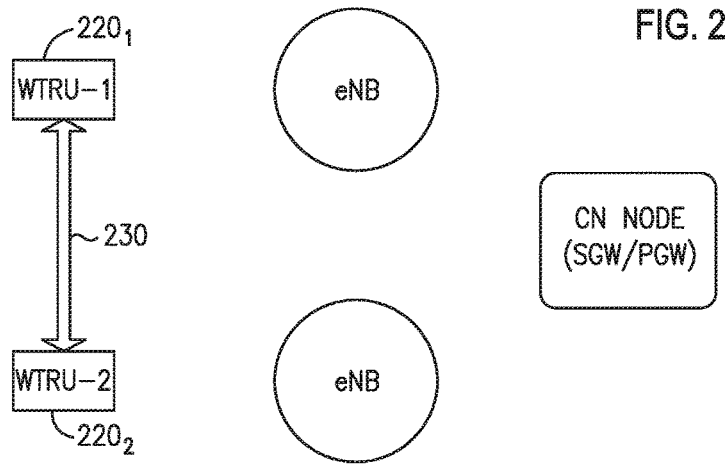
FIG. 2C shows an example of a direct WTRU-to-WTRU, (i.e., end-to-end), data path.

FIG. 2C shows an example of a direct WTRU-to-WTRU data path 230 directly over an air interface.

The proximity service data path selection, (direct or indirect over a certain path in the infrastructure), may be determined by the radio or network coverage, load conditions, or by policies set by network or operators. Proximity-based services may be supported in network sharing deployments.

Various techniques may be used to address one or more challenges to the enablement of WTRU-WTRU proximity service. For example, the paging procedure for a WTRU-to-WTRU connection or bearer may be different from the current S1 paging procedure. One of the WTRUs may need to somehow notify the MME that it has data for the other WTRU, which may be in idle mode and also may be under the coverage of another MME. Also, the current paging procedure may setup some or all the resources, (e.g., bring back all the existing evolved packet system (EPS) bearers between the WTRU and the network). However in case of a WTRU-to-WTRU connection, this may not be required, and the resources or resources needed for the direct communication may be setup, thus requiring that this procedure be modified. Further, the MME may page the WTRU to determine its location. Thus, a mechanism may be defined to bring a WTRU to a connected mode, perhaps just to determine the cell level location, and not establish a user plane.

Before the WTRU-to-WTRU communication starts, both of the WTRUs may discover each other and determine that they are close enough for the direct communication to be possible. This type of discovery may be possible at several levels or layers in the protocol stack. NAS methods may be implemented to discover WTRUs. Therefore, different NAS procedures may be defined to send discovery proximity related information to the network. The discovery procedure may be initiated by the network or the WTRU, and may be different for each case. Furthermore, this discovery may also be extended to case where a WTRU may discover a group of WTRUs or both WTRU may belong to different public land mobile networks (PLMNs). In both cases, methods may be defined for a WTRU to discover, join, or leave the group. Furthermore, a proximity group, (referred to hereinafter as a proximity service (ProSe) group), maybe be formed and dissolved dynamically. A determination may be made as to what the attributes of such groups are, how are such groups formed, who triggered the formation of the group, and when and how.

There may be rules and policies that may typically be listed for allowing certain services. Some or every service may have rules and conditions that may be verified by the CN to allow it to be used. Proximity may be another service that may require rules and policies to be defined, such that the network may control such a service and may be able to charge fees for its usage based on various criteria.

Relevant rules and policies may be required to allow proximity service needs to be listed. These rules may take into different factors, (e.g., WTRU location, subscription, PLMN, priority user, and the like).

In the case of an emergency proximity scenario, a separate set of rules and policies may apply for using proximity services. There may some abnormal actions, both at the WTRU and the network, so that these abnormal rules and actions may be outlined.

These rules may be enforced at different nodes, (e.g., eNodeB, MME, WTRU, and the like). Also, there may be a mechanism to exchange these rules between the WTRU and the network, and thus it would be desirable to define a procedure for exchanging these rules.

Charging may be an important aspect, especially for operators as they require revenue for introducing this service. Thus, methods may be defined by which charging may be applied, depending on the method of communication, (e.g., direct, or via a RAN, or via nodes above RAN).

There may be different ways a direct WTRU-to-WTRU bearer or PDN connection may be setup. This bearer may start from one WTRU and may go all the way to the other WTRU. Depending on how the network establishes this WTRU-to-WTRU bearer, and the capabilities of the WTRUs involved, this bearer may be a direct bearer between two WTRUs, or there may be some intermediate RAN or CN nodes in the path of this bearer.

FIG. 3A (Case 1) shows an example of establishing a direct WTRU-to-WTRU bearer, (i.e., end-to-end bearer) with no intermediate nodes involved. FIG. 3A shows that if both WTRUs $300_1$ and $300_2$ support direct WTRU-to-WTRU communication, a local bearer 305 may be established between the two WTRUs $300_1$ and $300_2$. This type of bearer may include a radio bearer between the two WTRUs $300_1$ and $300_2$, but it still may have bearer context at the NAS level in both of the WTRUs. Therefore, a NAS identifier (ID), similar to an EPS bearer ID in the current bearer setup case, may be assigned to this bearer. Alternatively or additionally, this new bearer may not have a NAS context and may start from the packet data convergence protocol (PDCP) layer of one of the WTRUs $300_1$, and may end at the PDCP layer of the other WTRU $300_2$, or vice versa. In this scenario, this bearer may be identified by a RAB ID.

Figure 3B:
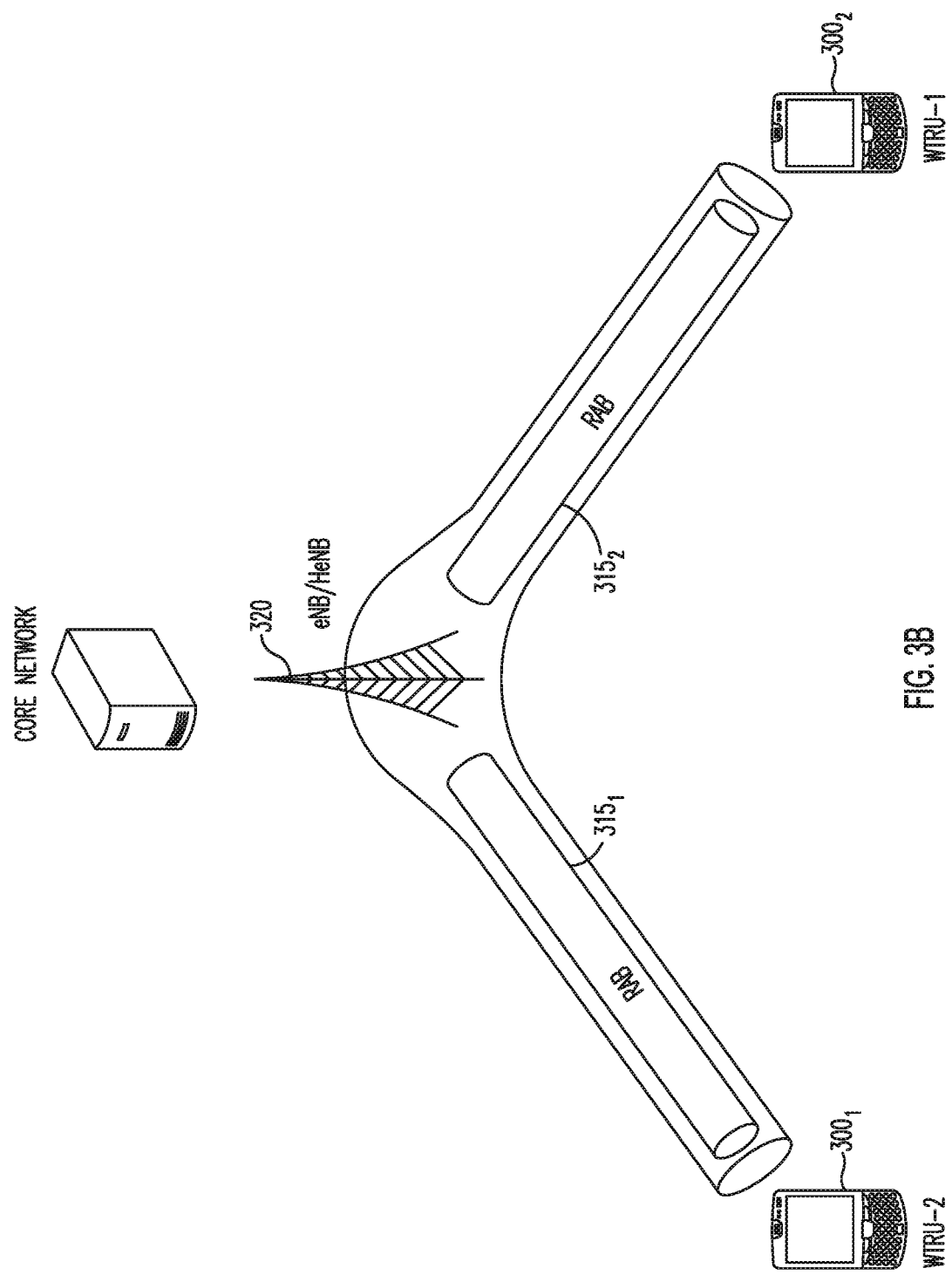
FIG. 3B shows an example of a WTRU-to-WTRU bearer that passes through an eNB or a home eNB (HeNB)

As previously mentioned, the WTRU-to-WTRU bearer may pass through a RAN or a CN node. FIG. 3B (Case 2)

shows an example of a WTRU-to-WTRU bearer that passes through an eNB or a home eNB (HeNB). This bearer may include two radio bearers (RABs) $315_1$ and $315_2$. The RAB $315_1$ may be between WTRU1 and an eNB/HeNB 320, and the RAB $315_2$ may be between WTRU2 and the eNB/HeNB 320. These types of bearers may not have a one-to-one mapping between the RAB 315 and an S1 bearer, as there may not be any S1 and S5 resources established in this scenario. Instead, there may be a one-to-one mapping between the RABs 315 on each side of the respective bearers, (e.g., there may be a one-to-one mapping between the RAB $315_1$ to eNB/HeNB 320, and the RAB $315_2$ to eNB/HeNB 320.

Figure 3C:
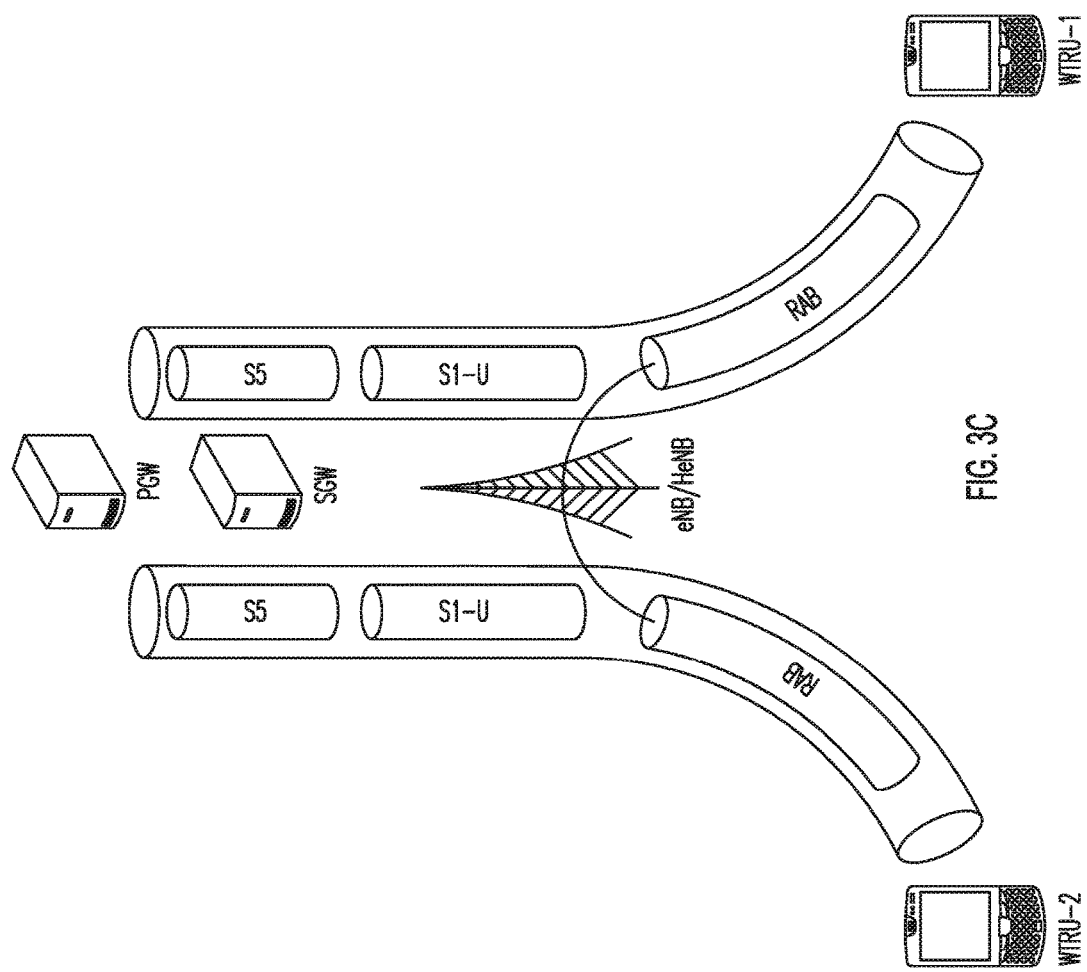
FIG. 3C shows an example of establishing a bearer via an eNB or HeNB in the path.

FIG. 3C (Case 3) shows an example of establishing a bearer via an eNB or HeNB in the path. Each WTRU may establish a regular PDN connection, (e.g., both WTRUs may establish S1 and S5 resources as shown in FIG. 3C. However, these resources may not be used for WTRU-to-WTRU communication because when the data arrives at the eNB/HeNB, instead of sending the data to the S1-U tunnel, the eNB/HeNB may route the data towards the RAB connecting the receiving WTRU. The solution presented in Case 3 may also be applied to the following scenario at the SGW level.

Figure 3D:
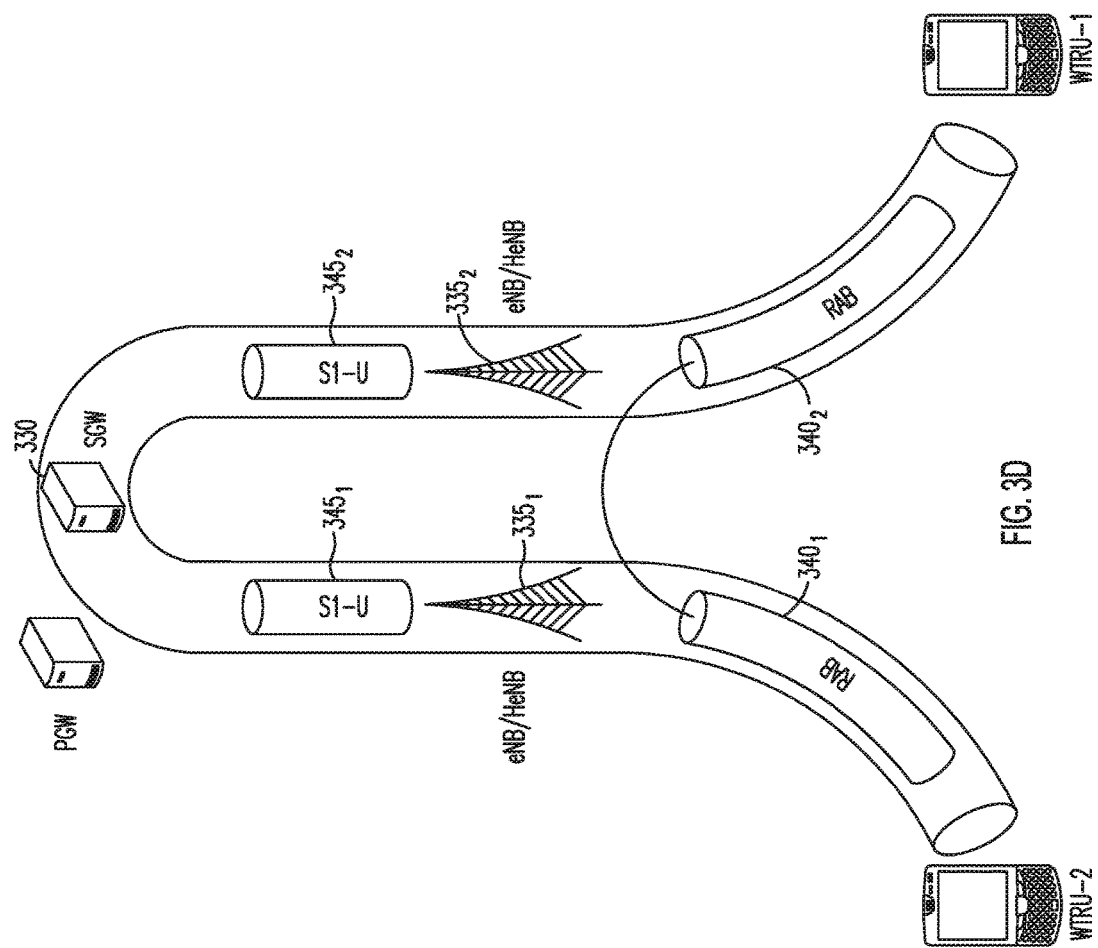
FIG. 3D shows an example of establishing an end-to-end bearer that passes through an SGW when two WTRUs are under the coverage of two different eNBs or HeNBs.

FIG. 3D (Case 4) shows an example of establishing an end-to-end bearer that passes through an SGW 330 when two WTRUs are under the coverage of two different eNBs/HeNBs $335_1$ and $335_2$. In this scenario, the end-to-end bearer may include two RABs $340_1$ and $340_2$, and two S1-U tunnels $345_1$ and $345_2$, as shown in FIG. 3D. There is an RAB $340_1$ between WTRU1 and an eNB/HeNB $335_1$, and a corresponding S1-U connection between the other eNB/HeNB $335_2$ and the SGW 330. Also, the same arrangement exists between WTRU2 and the SGW 330. There may be a one-to-one mapping between the RAB and the S1-U connection. Also, there may be a one-to-one mapping between the two S1-U tunnels 345 as depicted in FIG. 3D.

Figure 4:
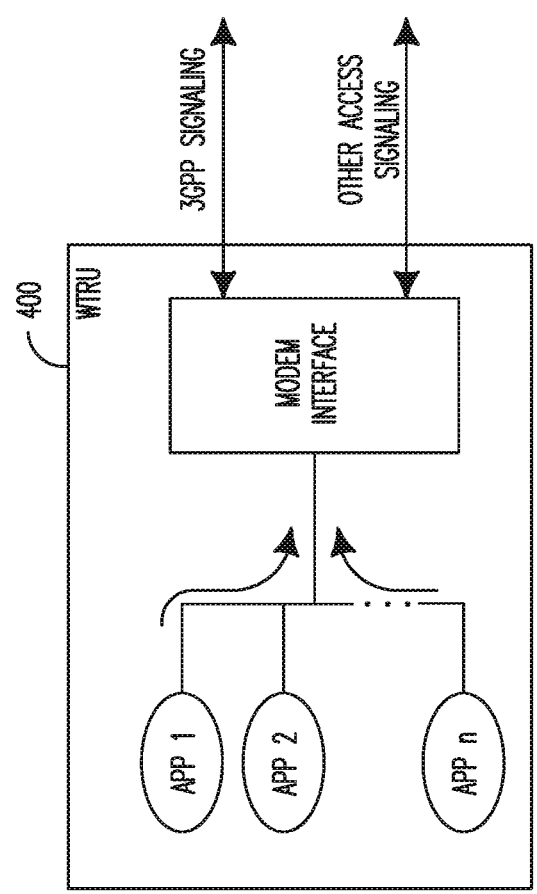
FIG. 4 shows an example of a WTRU initiating a request for proximity services and the establishment of an optimized proximity connection (OPC) to support optimal device-to-device (D2D) communication.

FIG. 4 shows an example of a WTRU 400 initiating a request for proximity services and the establishment of an optimized proximity connection (OPC) to support optimal device-to-device (D2D) communication. The establishment of a proximity service bearer may be initiated by the WTRU 400 or a network. The WTRU 400 may request resources with specific quality of service (QoS) requirements along with at least one of a proximity feature ID or a list of buddies for which the WTRU 400 may be interested about establishing an optimized proximity connection (OPC), or a request to determine buddy proximity. The WTRU 400 may use a value broadcast by surrounding WTRUs and/or it may explicitly use IDs provided by the application function, to send the appropriate information element (IE) to the MME. The WTRU 400 may request resources with specific QoS requirements along with an indication of whether a D2D bearer may share the same QoS class ID (QCI) characteristics, an indication of whether the originating WTRU and termination WTRU may have the same QoS parameters, and/or an indication of whether the requesting WTRU may assume temporary sponsoring attributes. Sponsoring attributes may include, but are not limited to, assuming the financial burden that the establishment of system resources incurs, (e.g., assuming the cost of establishing a network resource, such as a radio connection or a network connection for transporting data packets).

The WTRU 400 may request the establishment of network and radio resources for the purpose of executing D2D communications or executing a proximity procedure. This may be implemented through a bearer resource allocation request or a bearer resource modification. The network may be able to accept or reject whether a proximity procedure may be triggered by a particular WTRU. When a WTRU requests a network resource using the mechanisms described herein, the network may determine what may be its most viable procedure, based on the requirements of a particular application, to establish an optimized connection and pass location information.

An application may request resources that warrant establishment of proximity bearers. For example, an application may request services or actions over an Rx interface that may prompt the policy and charging rules function (PCRF) to set rules that trigger the establishment of a bearer, or a bearer that may be used to support an OPC. The services or actions that may trigger the establishment of bearer supporting OPC are described herein.

Alternatively, an application that provides proximity services may request the establishment of a bearer to support an OPC, (e.g., over the Rx interface). Possible reasons, although not a complete list of reasons as to why an application may request resources to support an OPC are described herein. Alternatively, an application that requires proximity services may request the proximity service from a proximity server or a central proximity function, which in turn may use any of the previously described methods to establish an end-to-end proximity bearer. Alternatively, an application within the WTRU 400 may request resources that may require the establishment of a bearer used to support an OPC.

Figure 5:
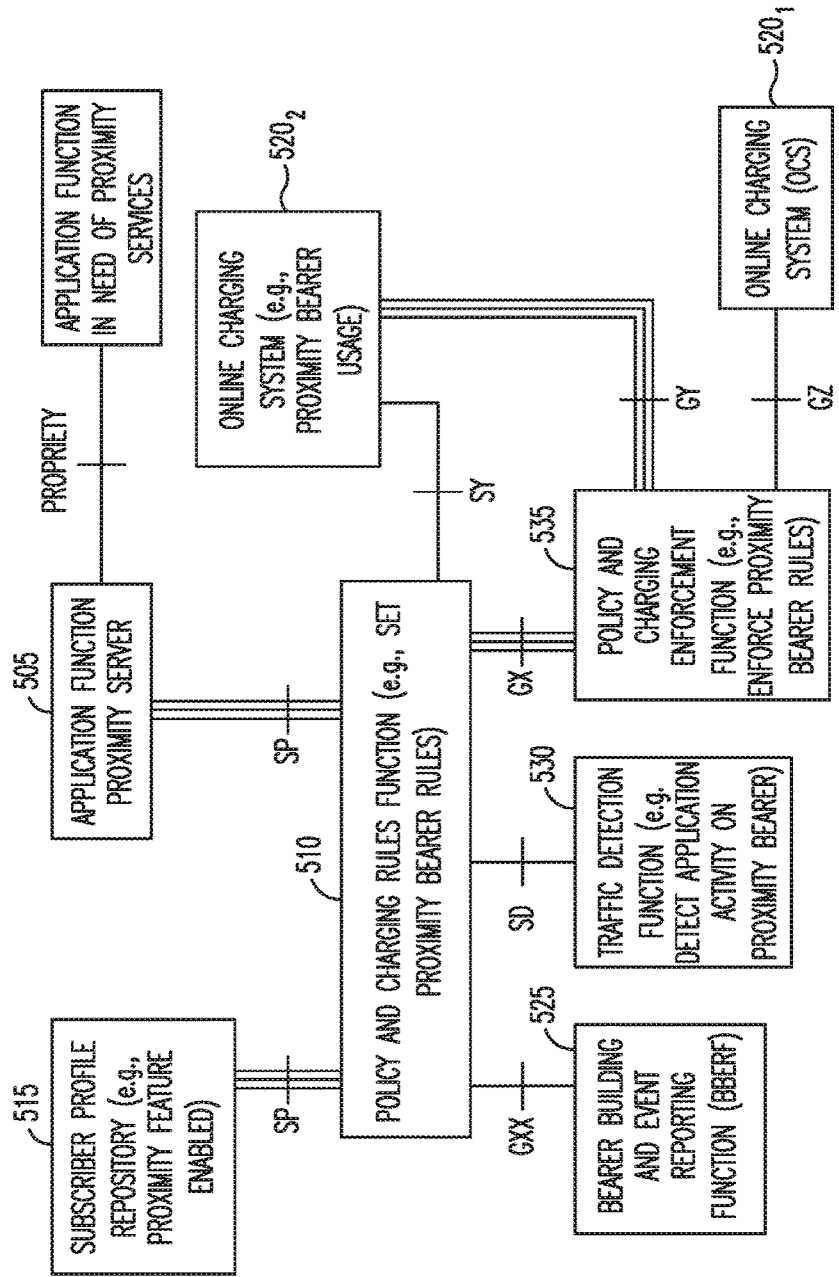
FIG. 5 shows a policy and charging control model for proximity services.

FIG. 5 shows a policy and charging control model 500 for proximity services, whereby a PCRF-based proximity-driven bearer may be established. An application function (AF) 505, (e.g., proximity server), may provide a PCRF 510 with the characteristics and/or requirements that bearers must comply with to support the needs of data flows transported over these bearers. Thus, the AF 505 may explicitly indicate to the PCRF 510 "supported features" or the "application identity" of an application that may require proximity support. This may be implemented using existing attribute value parameters (AVPs) already included in an authentication and authorization request (AAR) diameter message. The PCRF 510 may use policies to "bind" the "application identity" or the "supported feature" with specific QoS and/or policy and charging control (PCC) rules and/or a single proximity service ID.

The policy and charging control model 500 further includes a subscriber profile repository (SPR) 515, online charging systems (OCS) $520_1$ and $520_2$, a bearer building and event reporting function (BBERF) 525, a traffic detection function 530 and a policy charging enforcement function 535.

The single proxy service ID may be used to associate any other member that subscribes to an application that may require proximity services. These members may be either part of a group or individual WTRU that may be connected through an OPC, which is the connection which takes shorter path for WTRU-to-WTRU communication, (e.g., a proximity connection through an eNB in Case 3).

The proximity service ID may be derived from a group ID or an application ID associated to applications or services that require proximity support. A single proximity service ID (SPSI) may be used to manage connection of WTRUs that may associate to this single traffic flow template (TFT), leaving the decision as to when and/or where to establish this connection entirely to the 3GPP network. The PCRF, through the relevant PGW, may pass the single proximity service ID to the MME. The MME may use this identity to determine if there are WTRUs supporting proximity services that may be connected using OPCs. If the MME identifies two or more WTRUs having the same proximity service ID, the MME may determine whether these WTRUs may be connected through an OPC. OPCs may be defined at different levels, including same PGW, same LGW, same eNB/HeNB/HeNB, or any other node that may support direct routing over the same proximity bearer ID.

Besides using the SPSI, the MME may use several other criterions to determine if an OPC may be allowed/executed, including a modified WTRU proximity indication signaling the proximity of a candidate OPC WTRU.

In addition, the node ID of a candidate node executing the OPC may be used as long as the MME is able to determine that two or more WTRUs are connected to a candidate OPC node. The MME may obtain the candidate OPC node ID from the WTRU bearer context, and this information may be transferred during a handover procedure, including inter and intra MME handover. For example, the bearer context may be transferred in the "handover required" message and the "forward relocation request" message. Alternatively, the global eNB ID may be used to identify whether two or more proximity-enabled WTRUs are connected to the same eNB. Furthermore, the closed subscriber group (CSG) ID and local H(e)NB (LHN) may be used.

Figure 6:
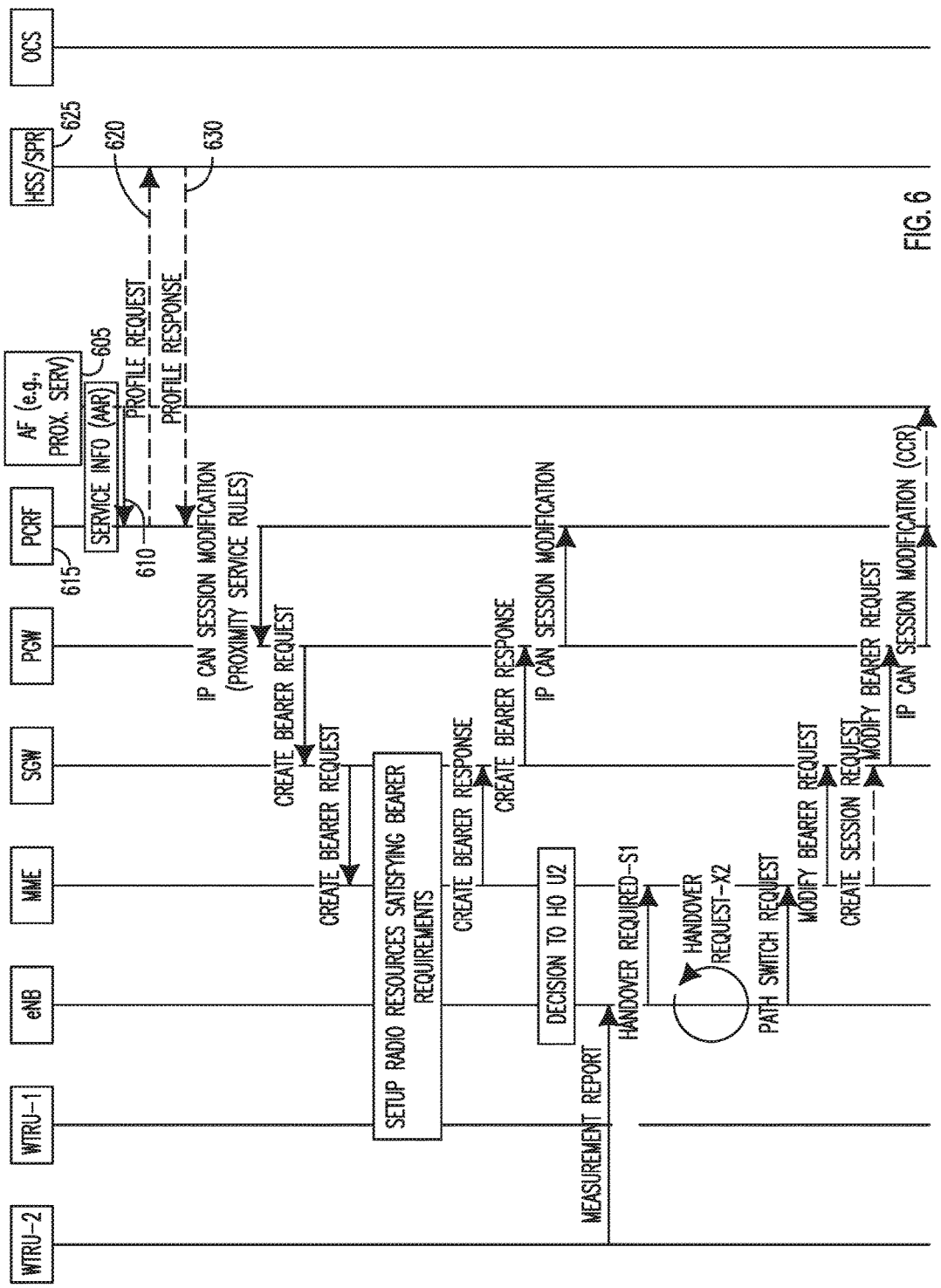
FIG. 6 shows a flow diagram of a network-based proximity trigger procedure.

FIG. 6 shows a flow diagram of a network-based proximity trigger procedure 600. An application function (AF) 605, possibly acting as a proximity server, may send a proximity service request 610 to a PCRF 615. The proximity service request 615 may have been triggered by a separate AF requesting proximity services from the AF 605. The service information may provide, amongst other things, the application ID or feature ID and a single proximity service ID. The PCRF 615 may send a subscriber profile request message 620 to a home subscriber server (HSS)/subscriber profile repository (SPR) 625, passing the application ID/feature ID. The HSS/SPR 625 may use this information to retrieve the list of subscriber that maybe defined by the subscriber as potential proximity buddies. The list may be provided in a profile response message 630 sent by the HSS/SPR 625. The proximity buddy list, along with the application/features ID, may be passed to the MME through the message chain. The MME may use this information to determine whether an OPC may be established.

Procedures and the effect on the WTRU-to-WTRU bearer when one or both the WTRU move to Idle mode are described herein. Furthermore, a paging procedure is described that may cause one of the WTRUs to transition to connected mode when another WTRU has data to be sent to in idle mode. The procedures and methods may be different, depending on the WTRU-to-WTRU bearer case described herein.

In Case 1 shown in FIG. 3A, when one of the WTRUs goes to idle mode, the direct WTRU-to-WTRU bearer may be torn down, (i.e., the radio bearer may be released). However, the context of the bearer may remain in both of the WTRUs. The bearer context may be made up of radio bearer context or a full or partial EPS bearer context. Therefore, when both WTRUs return to connected mode, the same bearer may be reestablished.

In the example shown in FIG. 3A, if one of the WTRUs is in idle mode, the RAB between WTRU1 and WTRU2 may be down. However, WTRU2 may have some peer data to be sent to WTRU1, but since the direct WTRU-to-WTRU bearer is down, WTRU2 may therefore know that WTRU1 is in idle mode and therefore WTRU2 may send a first packet via a default PDN connection or default bearer towards a PDN connection. Since this first packet's destination Internet protocol (IP) address may be the address of WTRU1, it may be routed to the PGW, and eventually the SGW of WTRU1. This may trigger the regular paging by the MME to transition the WTRU1 to connected mode. Once the WTRU1 is in connected mode, the remaining packets may be sent over the direct WTRU-to-WTRU bearer. Alternatively, the first packet which triggers paging may be discarded by the eNB or SGW, and once the WTRU-to-WTRU bearer is re-established, all of the packets including the first packet may be sent over the direct bearer.

In the example shown in FIG. 3B (Case B), when one of the WTRUs transition to idle mode, the end-to-end bearer may be turned down, i.e., both RABs may be released. However, the contexts of the RABs may remain in WTRU1, WTRU2 and the eNB. If this is the case, the solution described previously may also apply to this case if one of the WTRUs has packets to be sent to the other WTRU, which may be in idle mode.

The entire WTRU-to-WTRU bearer may not be released if one of the WTRUs is in idle mode, but only the parts of the bearer which are connected to that particular WTRU may be released.

In the example shown in FIG. 3B (Case B), if WTRU1 transitions to idle mode, the RAB from WTRU1 to the eNB may be released, but the RAB from WTRU2 to the eNB may not be released if WTRU2 remains in the connected mode. If WTRU2 has some proximity packet or peer-to-peer packets to be sent to WTRU1, it may not know that WTRU1 is in idle mode, since the RAB for the WTRU-to-WTRU bearer from WTRU2 to eNB is still active. Therefore it may send the packet on that RAB. When the first packet arrives at the eNB, it knows that WTRU1 is in idle mode. It may send a notification to the MME to bring the WTRU to connected mode, and once it receives the response from the MME, it may send a radio resource control (RRC) reconfiguration request to re-establish the RAB. Once the RAB is re-established between the eNB and WTRU1, the eNB may then forward the first packet to the WTRU, and then some or all of the remaining packets may be transmitted over the WTRU-to-WTRU bearer, transparent to the eNB. The eNB may discard the first packet, and all of the packets including the first packet may be sent by WTRU2 once the bearer is re-established.

FIG. 3C shows an example of establishing a bearer via an eNB or HeNB in the path. In the example shown in FIG. 3C (Case 3), each of the WTRUs may have a separate bearer to the PGW or ProSce-GW, but the data packets may be transferred directly from one RAB to another RAB at the eNB, which is connected to both of the WTRUs. Therefore, in this case, when one of the WTRUs moves to idle mode, all of the RABs and S1-U bearers associated with that WTRU may be torn down or released.

Referring to FIG. 3C, if WTRU1 goes into idle mode, the eNB/HeNB may remove or deactivate the "mapping ID" associated with this bearer or RAB. Thus, if WTRU2 has data to be sent to WTRU1, when the data may arrive at the eNB/HeNB. If there is no mapping ID assigned to this RAB, this data may then be forwarded to the corresponding S1-U tunnel, and then eventually to an S5/S8 tunnel. The data may be routed back to the PGW/ProSe and SGW of WTRU1, which may trigger the regular paging procedure to transition WTRU1 into a connected mode. A new "mapping ID" or indication may be sent to the eNB/HeNB to reactivate the old mapping ID during this paging procedure. Thus, once WTRU1 returns to the connected mode, the eNB/HeNB may enable the local path through the eNB/HeNB for this bearer and all of the peer-to-peer data may be sent via this path from WTRU1 to WTRU2. For Case 4, which may be similar to the situation described for Case 2, when one of the WTRUs transitions to idle mode, either the entire end-to-end bearer may be deactivated, or a portion of the bearer associated with the WTRU transitioning to idle mode may be deactivated, which in this case may be the RAB and the corresponding S1-U bearer. For example, if WTRU1 transitions to idle mode, the RAB between WTRU1 and the eNB/HeNB and the tunnel between the eNB/HeNB and the SGW may be deactivated, but the S1-U tunnel between the SGW and the eNB/HeNB serving WTRU2 and the corresponding RAB may stay active.

Similarly, if WTRU2 has peer-to-peer packets for WTRU1 while WTRU1 is in idle mode, the packets may be sent over the default PDN connection as described before on a condition that the entire WTRU-to-WTRU bearer had been deactivated. Alternatively, the packets may be sent by WTRU2 on the WTRU-to-WTRU bearer while it is still active from WTRU2's perspective. In this case, when the packets arrive at the SGW using the RAB and S1-U tunnel, the SGW may trigger the regular paging procedure to transition WTRU1 to connected mode. Once WTRU1 is in connected mode, the packets may be sent to WTRU1 over the WTRU-to-WTRU bearer.

Non access stratum (NAS) discovery methods for proximity are described herein. A WTRU's registration for proximity discovery may include the willingness to use the proximity discovery service to look for other WTRUs, and/or to identify itself as discoverable or not by other WTRUs. If it is discoverable, the user may also provide a "nickname" for the network (NW) to display to other user, and the user may also provide other information like the gender, interests for network to display to other users. Whether the network grants the WTRU to use the discovery service may be based on the subscription profile.

Moreover, the WTRU may also include in the registration message the well-known applications (i.e., apps) that it is using. Well-known applications are those widely used smartphone applications that may benefit from the proximity service, such as voice over Internet protocol (VoIP) clients (Skype, Vonage), and/or the social networks (SNS) applications(Facebook). The information may be used by the network or application server for further proximity based services. The network may record the WTRU's proximity discovery registration information, well-known applicationsinfo and associated location information (global positioning system (GPS) coordinates, cell_ID, eNB_ID, CSG, and the like).

New information elements (IEs) may be added in attach or tracking area update (TAU) messages for registration. The network may notify the WTRU the registration result in a response message. New NAS messages may also be devised for this purpose.

A cell may broadcast at the RRC level if the system supports the proximity discovery.

Application specific information may be requested. If a well-known application registration is implemented, the MME may request a WTRU to send some application specific information, such as the nickname, login-ID, password and the like. The information may be used by the network or further provided to application servers for proximity based services. A new NAS message may be devised for this purpose.

A WTRU may modify its proximity registration information, (e.g., change from discoverable to non-discoverable). Upon the location movement, e.g., reselection or HO to another cell, or TAU in a new area, the system may or should update or delete the proximity info of this WTRU in the original MME. If WTRU's are capable of GPS, the WTRU may be configured to send GPS coordinates over NAS periodically to update the location information.

Proximity discovery information may be requested. The WTRU may request the network for proximity discovery information, such as all WTRUs that allow themselves to be discoverable in the vicinity, or for a specific well-known application, other users of the same application in the vicinity. A new NAS message may be devised for this purpose.

Inter-system proximity information exchange may occur. The MME may exchange the proximity information, (e.g., discovery information, location information, proximity capability information, and/or proximity QoS information, and the like), with other system elements such as a serving general packet radio service (GPRS) support node (SGSN). The MME may request the SGSN to send the proximity related information for certain location (e.g., GPS coordinates, cell or tracking area). The SGSN may map the location to its own location (cell or routing area) and return all of the discoverable WTRUs in that location or the application specific information. The MME may also provide similar information to other system as well. A new inter-system message may be devised.

Communication may be established between an MME and an application server. The MME may provide the current proximity information to a well-known application server, so that the server may have the proximity information. When a user gets online for the application, the application may display related proximity information to the user. Upon request or periodically, the MME may send the current tracking area ID or eNB ID of the WTRUs, which may be registered with the application server and/or proximity server. Alternatively, the proximity server may inform the MME about whether two WTRUs desire to communicate via the proximity server, or not. In the first case, the application server/proximity server may use this information, (e.g., tracking area IDs of the WTRU to identify whether two WTRUs which have requested the proximity service and/or may be using a specific application are within the same area or not). If the application server determines that they are within the same area, the application server or proximity server may request the MME and/or the network to establish the proximity connection between two or more WTRUs.

In the second case where the application server may send information to the MME, the MME may determine whether the two WTRUs in the same tracking area would like to communicate to each other based on the information from the application server/proximity server. If it is concluded by the MME that WTRUs may desire and/or may perform proximity communication, then a proximity connection may be established among those WTRUs.

Figure 7:
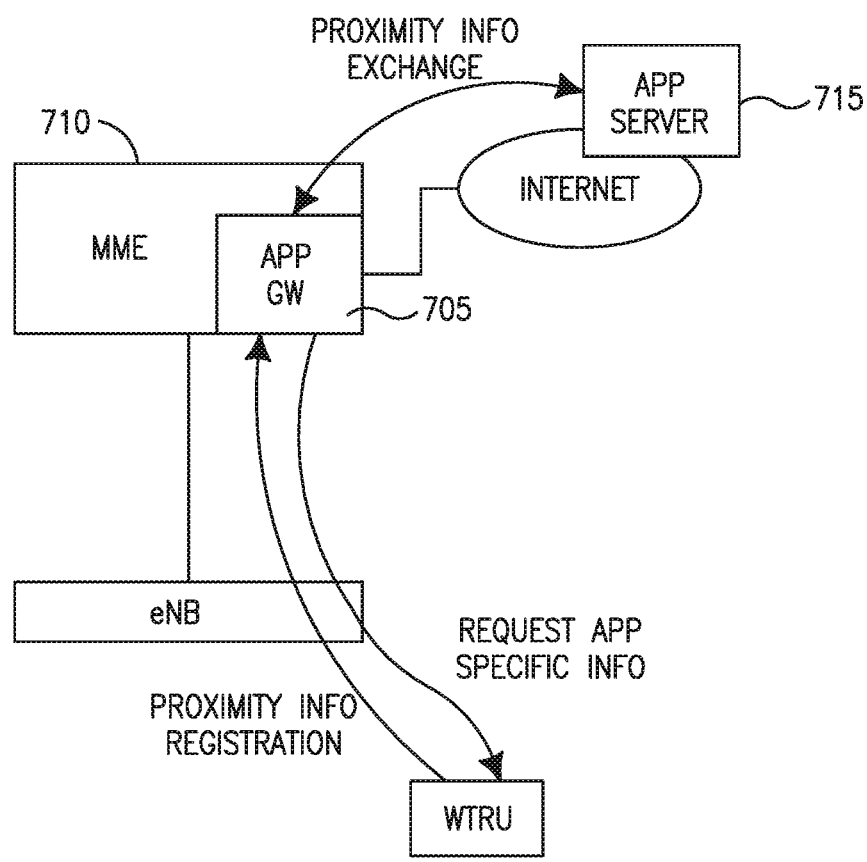
FIG. 7 shows the registration and exchange of proximity information for a particular application.

As shown in FIG. 7, an application gateway 705 may be embedded in an MME 710 to enable communications with an application server 715.

In order to realize ProSe, (WTRU-to-WTRU proximity service), and enable WTRU-to-WTRU communication, a new logical node may be provided, (referred to herein as a proximity service gateway (GW), (i.e., ProSe-GW)). The ProSe-GW may be deployed by the network operator or by an independent ProSe service provider or by an enterprise. The ProSe-GW may span multiple local home networks and the associated local GW (LGW). Similarly the ProSe-GW may span multiple enterprise local networks. The ProSe-GW may include the IP address allocation for use by ProSe PDN connection, and a policy control enforcement function (PCEF) in support of QoS enforcement and flow based charging function according to PCRF rules.

If the ProSe-GW is deployed by an enterprise or an independent ProSe provider, then the PCEF and flow based charging function may not be located in the Prose-GW. In such case, the ProSe maybe supported with a PDN connection or a bearer, (such as a WTRU default bearer), with a predefined QoS level as per the user service level agreement.

The ProSe-GW may also include the following functions toward a WTRU involved in the proximity service which also may be S-GW functions. When the WTRU has only a ProSe PDN connection, a local mobility anchor may be used with the data bearers when the WTRU moves between eNodeBs or between HeNBs. Information about the bearers may be retained when the WTRU is in the idle state, (e.g., EPS mobility management (EMM)) idle or EPS connection management (ECM)-IDLE), and at least temporarily buffers downlink data while the MME initiates paging of the WTRU to reestablish the bearers. For roaming WTRUs, information may be collected for charging, (e.g., the volume of data sent to or received from the user), and lawful interception.

For example, a proximity service (ProSe) area may be defined as one or more a collection of cells, (e.g., cells with same CSG ID or belongs to a list of CSG IDs), or a collection of local home network or local enterprise network. The ProSe area may span cells from multiple PLMNs, or the ProSe area may span multiple CSGs.

The ProSe area may be associated with an ID which may be a global unique ID. Such an ID may be broadcasted by the cells in that ProSe area. The ProSe area ID may also be exchanged between the WTRUs, or between a WTRU and a network entity in dedicated RRC messages or NAS messages. The ProSe area ID may be used by a WTRU or a network entity, (MME, eNB/HeNB, GWs including ProSe GW), in support of ProSe discovery, or discovery of ProSe peer WTRUs or group of WTRUs. The WTRUs in the same ProSe area may engage in ProSe communications.

ProSe access may be provided using accessibility control, activation triggers, and a decision node to determine when and how the ProSe access may be provided. For ProSe control, perhaps in order to enable and control ProSe, the following information may be incorporated into the WTRU or the user's subscription profile.

ProSe permission may be defined as permission for the WTRU to engage in a ProSe. Furthermore, the PDN subscription context in the HSS may contain various granularities of ProSe permission, such as an access point name (APN) and an indication for the APN of whether ProSe is allowed or prohibited for the AP; an APN and an indication of whether only ProSe is supported for this APN; an APN and an indication of whether ProSe supported is conditional, (e.g., ProSe-conditional); the identity of a PGW or a ProSe GW, (e.g., default ProSe GW), and an APN; a ProSe area, (e.g., a list of ProSe areas), and an APN; whether ProSe is allowed during roaming, (e.g., in a visited public land mobile network (VPLMN)); whether ProSe is allowed during roaming through a visited network ProSe GW or a PGW; whether ProSe is allowed for a specific ProSe group, (open group, close group, private group, public group); an APN with an indication on whether ProSe is allowed for a specific ProSe group or type of group; whether a WTRU is allowed to invite another WTRU into a ProSe communication, even if the invited WTRU has not subscription to ProSe; and/or an APN with an indication of the allowed level of ProSe Service, (whereby there may be many levels of ProSe Service); whether the ProSe is allowed to be established on the default PDN connection bearer or on a dedicated bearer or a dedicated PDN connection; whether the ProSe was allowed for an originated call only, a terminated call only, or both; the Permission is granted for specific QoS attributes and related thresholds such as maximum bit rates, QoC class IDs (QCIs) and allocation and retention priority (ARP); validity of the permission; the permission is granted for a specific service type; and user consent, (which may have the same level of granularity described above).

Such information may reside in the HSS. Furthermore, this information may be provided, (e.g., by the HSS), to the CN nodes such as an MME, SGSN, SGW or PGW. The information may also be provided to the ProSe GW described herein.

Additionally, ProSe may be allowed between WTRUs under the same local network or between WTRUs that belong to a list of defined local networks. ProSe may be allowed between WTRUs that belongs to the same CSG. The Prose may be always allowed; always prohibited; and/or conditionally allowed between WTRUs.

Support of ProSe communications may also be subject to network configurations and capability. Similarly the support for ProSe communication may be subject to the WTRU configuration and its capability and protocol/hardware version or release. For example, some MMEs, SGWs and PGWs may support ProSe while some may not. Similarly, some eNBs or HeNBs may support ProSe while some may not.

During mobility, the serving network or network Node (MME, S-GW/P-GW or eNB or HeNB) may verify the support of ProSe in the target network or Specific Target NW node. The serving network may de-activate a ProSe PDN connection if the target network, (or specific target NW node that will be serving the WTRU), does not support ProSe. The deactivation may be initiated by the eNB or HeNB, the MME, and/or the SGW, P-GW or the ProSe-GW.

Triggers for ProSe and the time when a ProSe may be triggered are described herein. The ProSe may be triggered upon discovery of a nearby friend or upon notification that a friend or a point of interest is nearby. The notification may be addressed to the user from the NW or from the WTRU. For example the user may configure the WTRU to issue a notification upon discovery of friend or a point of interest which may not be already on the user friend list.

The notification may be addressed to the WTRU. For example, the WTRU may be configured to autonomously take certain action, (e.g., update friend list), upon notification from the NW or a peer WTRU or point of interest.

The ProSe may be triggered upon entering a ProSe area or upon reading a ProSe area ID from the system info broadcast.

The ProSe may be triggered upon request from the user. For example, the user may trigger the WTRU to detect nearby friends. The terminology "friend" refers to an individual entity, (e.g., person, shop, and the like), that the user may desire to establish a contact with if is nearby, a group of subscribers or social network groups, a ProSe Area server or ProSe-GW, a local network, among others, for example.

The ProSe may be triggered upon paging or request to initiate ProSe from the network. For example, the paging maybe a result of a friendly WTRU who want to establisher a ProSe communication.

The ProSe may be triggered upon the update of the ProSe allowed list, upon a proximity indication, upon activation of the feature by the network, upon selecting a cell or handover to a cell which support ProSe, upon selecting a network or entering the coverage of a cell or a GW that supports ProSe, upon selection of a specific CSG ID or a specific APN or GW identity, upon activation of local IP access (LIPA) service, managed remote access (MRA) service or selective IP traffic offload (SIPTO) service, or upon the selection of any of the ProSe permission control parameter described under the ProSe control section.

A WTRU or a network may make the decision to trigger a ProSe. For example, the ProSe may be triggered by a WTRU, or by a user toward another user or in response or a request from another user or group of user or social group, or shop, or the like.

The ProSe may be a push service from the network, (or a ProSe service provider). The network may autonomously initiate ProSe. For example, the network may offer advertisement services. Upon the proximity of the user to a point of interest, (for example in function of the user profile and pre-arranged consent), the network operator or service provider may trigger the ProSe and push advertisement information to be displayed on WTRU screen. Such advertisement information maybe also be push to the WTRU available to be displayed at any time by the WTRU, assuming that the information is still relevant to the location of the WTRU. Such ProSe initiation may be triggered by the MME, the SGW, the PGW, the ProSe-GW or the eNB/HeNB.

Termination of ProSe and release of ProSe bearers or connections may occur. A ProSe may be terminated upon a change in any of the ProSe permission control parameters leading to ProSe no longer being allowed. For example, the ProSe communication may terminate upon the expiration of the validity time granted by the network, a change in network configuration or WTRU configuration, or mobility into part of the network or into a network where ProSe is not supported either because that entire part of the network doesn't support ProSe or is not configured to support ProSe, the new network doesn't support ProSe, or the new eNB, HeNB, MME, SGW or PGW does not support ProSe, or a decision of the network, WTRU or user to terminate the ProSe. The WTRUs may reach the allowed threshold for sending proximity data.

Charging models may impact network architecture supporting ProSe. Operators may deploy ProSe services versus independent ProSe providers versus an enterprise deployed ProSe versus home deployed ProSe. Charging may be based on a fixed rate, (e.g., monthly) charging.

A default WTRU bearer, or a default PDN connection with pre-agreed/preconfigured QoS attributes or a dedicated PDN with pre-agreed/preconfigured QoS attributes may be established to support ProSe. In this scheme, a policy control enforcement function (PCEF) for QoS in the downlink (DL), (e.g., rate policing based on APN AMBR), may reside in the eNB or HeNB if the ProSe-GW, or any other node trusted by the network operator such as the SGW or the PGW, is used.

A function may also be specified at the eNB or HeNB to report to the network the data volume consumed using S1-AP messages. The AF may explicitly indicate to the PCRF "supported features" or the "application identity" of an application that requires proximity support. These may be performed using existing attribute value parameters (AVPs) already included in the AAR diameter message.

The single proxy service ID may be used to associate any other member that subscribes to an application that may require proximity services. These members may be either part of a group or individual WTRU that may be connected through an optimized proximity connection (OPC).

In one or more scenarios when one of the WTRUs goes to idle mode, the direct WTRU-to-WTRU bearer may be turned down, while the context of the bearer may remain in both the WTRUs. Therefore, when both WTRUs return to connected mode, the same bearer may be reestablished. It may also be possible that the whole end-to-end bearer may not be released if one of the WTRUs is idle mode, but only the parts of bearer which are connected to that particular WTRU may be released.

A heretofore unknown "mapping ID" or indication to the eNB to reactivate the old mapping ID may be sent to the eNB during this paging procedure. Thus, once WTRU1 returns to the connected mode, the eNB may enable the local path through the eNB for this bearer and all of the peer-to-peer data may go on this path from WTRU1 to WTRU2.

The WTRU may include in the registration message the well-known applications that it is using. Well-known applications may be widely used smart-phone applications that may benefit from the proximity service, such as VoIP clients (for example, Skype, Vonage), or the SNS applications(for example, Facebook). The information may be used by the network or application server for further proximity based services.

In order to realize ProSe, (WTRU-to-WTRU proximity service), and enable WTRU-to-WTRU communication, a new logical node may be defined for a ProSe-GW.

A WTRU may establish a setting-up of network and radio resources. This may be implemented through a bearer resource allocation request or bearer resource modification. The network may be able to accept or reject whether a proximity procedure may be triggered by a particular WTRU.

A method and apparatus are described for performing an attach procedure to obtain device-to-device (D2D) services, and performing D2D service advertising and discovery. A mobility management entity (MME) may receive an attach request non-access stratum (NAS) message from a wireless transmit/receive unit (WTRU) and send a D2D WTRU capabilities message to a D2D server. The D2D server may send a unique D2D device ID to the MME on a condition that the D2D server approves the WTRU for D2D service. The MME may send an attach accept NAS message including the unique D2D device ID to the WTRU. A D2D WTRU may send a generic alert message to an access network discovery and selection function (ANDSF), which may update an ANDSF management object (MO) associated with the D2D WTRU with new D2D discovery information. The D2D WTRU may use the new D2D discovery information to find another WTRU to communicate with.

Procedures to enable service discovery for device-to-device (D2D) communications are described herein, as well as evolved packet core (EPC) architecture enhancements and different architecture models to enable D2D communications, introduction of a D2D server and its logical functions, impact to the existing EPC nodes and a WTRU to enable D2D communications, updates to attach procedures and provisioning of D2D temporary device IDs, procedures for D2D service registration and service discovery, and D2D service advertising and discovery using enhanced access network discovery and selection function (ANDSF), generic advertisement service (GAS) and access network query protocol (ANQP). These procedures may be applicable to both the network and WTRUs operating in D2D communications.

The demand for wireless mobile data continues to explode, and this is leading to a surge in the number of smart phones in usage throughout the world. The telecommunications industry has in the past responded to demand with newer standards that provided increases in spectral efficiency through the use of better multiple access, modulation and coding and multi-antenna techniques.

Another dimension for capacity improvement has been through the increase in the density of deployment and correspondingly reducing the cell radius. In addition, heterogeneous topologies have been increasingly used, wherein small cells (micro/pico/femto) are deployed in conjunction with macro cells. Indoor coverage improvements through the use of remote radio-heads and distributed antennas have also proliferated. There are, however, limits and drawbacks to these approaches. Small cell deployments lead to a huge increase in mobility events, and the accompanying interference management issues are complex. The biggest drawback of the above techniques is the necessity for large amounts of additional infrastructure, such as high capacity internet backhaul, power sources, and radio frequency (RF) equipment that have to be maintained.

One possible alternative solution is to use the power of the smart phone revolution in a creative manner. Smart phones are becoming increasingly powerful devices, with multiple wideband radios and modems, and the capability to process large amounts of data, as well as run multiple simultaneous applications. If these smart phones are allowed to communicate directly with each other when necessary and possible, an alternate topology may be created that may co-exist with the conventional cellular deployment.

Enabled by such direct WTRU-to-WTRU communications, advanced topology (AT) applications may include AT-relay (AT-R) and AT-local offload (AT-LO). In the AT-R application, a terminal-WTRU (T-WTRU) may exchange data with the network through a relay node, which is a helper-WTRU (H-WTRU). The AT-LO application may allow the direct data communication between WTRUs in proximity under the control of the central network.

The AT-R application may include a capacity mode and a coverage mode. In the capacity mode, the T-WTRU is associated with the network and enlists the H-WTRU to augment the radio link capacity and improve data transmission capacity, while in the coverage mode the T-WTRU is out of network coverage and may rely on an H-WTRU to attain the network association. Both modes are envisioned for low mobility WTRUs.

In the AT-LO application, WTRUs in proximity may either be the source or the sink for the information exchanged. The radio link between the WTRUs in an AT-LO application may use licensed cellular spectrum or unlicensed or lightly-licensed spectrum.

The communication between WTRUs may occur in a dedicated channel called the cross link (XL), as opposed to the traditional eNB-to-WTRU communications that occur over the traditional radio link (TRL). The XL may be in a separate band (out-band solution) or in the same band as the traditional link (TRL), even in adjacent frequency subcarriers. The H-WTRU and T-WTRU may communicate with each other either in frequency division duplex (FDD) or time division duplex (TDD) fashion, and the related configuration may be defined by the network. The network may provide coarse resource allocation for the XL, and the WTRUs may have the freedom to handle the per-transmission timing interval (TTI) resource allocation.

D2D communications have become a subject of discussion in the 3GPP with the introduction of the proximity services (ProSe) study item in the SA1 group. "Direct path", wherein the physical communication is directly between the D2D devices, and "local path", wherein the communication may be through the eNB to which both the devices are connected, are both scenarios that are within the scope of ProSe.

Several use cases have been defined to be tackled as part of ProSe thus far, each of which bring up a different set of requirements on the system design. These may be broadly categorized under social and public safety.

In a basic social use case, D2D users may be able to discover and be discoverable by other D2D users that belong to their user group, (e.g., friends' list), and then may use a social network application over the D2D link. The discovery may be performed without any WTRU location information. In a public discovery case, a D2D user may be discoverable by any other D2D user without needing prior permission. For different public land mobile network (PLMN) discovery, D2D users belonging to different PLMNs may be discoverable to each other. A sub-set of this is when the D2D users are also roaming. For service continuity, D2D users may move between direct path and infrastructure mode with no degradation perceivable by the user. For location and presence, operators may enhance their location and presence information with ProSe procedures.

In a basic public safety use case, two authorized public safety users may communicate directly over the D2D link. A PS D2D user may maintain multiple simultaneous one-to-one D2D sessions with different D2D public safety users.

The objectives of D2D discovery may be achieved by device and service discovery respectively. Device discovery, (i.e., neighbor discovery), process leads user devices to find each other based on device identities. These device identities may be in the form of physical layer sequences, radio access network (RAN) identities, or higher layer IDs. Device discovery may involve physical communication between the devices. In the device (or neighbor) discovery process, the WTRUs looking for neighbors, (neighbor seeking WTRUs (NSWTRUs)), may transmit a discovery sequence in specific time-frequency resources based on a schedule provided by the network. Other WTRUs, (neighbor present WTRUs (NPWTRUs)), may listen during these intervals and receive these sequences. Based on their measurements, they may either respond back directly to the NSWTRUs or report the measurements back to the network for further action, followed by an association process between the WTRUs.

Each D2D device may have one or more services, and thus have multiple service identities. These service identities, along with the parameters of the offered services, may be discovered as part of service discovery. Service discovery may be performed either by communication between the device and another 3GPP node, some node external to the 3GPP network, or by direct exchange of service information between the devices after completion of device discovery. Service discovery may occur either before or after device discovery.

Architectural enhancements are needed in order to incorporate D2D communication into the 3GPP evolved packet core (EPC). These changes and additions to the existing architecture may be needed in order to enable the efficient operation of a large number of D2D-capable devices in the network, enable the coexistence of D2D links along with the traditional cellular links, fulfill all the deployment configurations envisioned for the 3GPP ProSe feature, and fulfill all the service requirements for D2D communication as laid out by 3GPP.

The architectural models for enabling D2D communication in a 3GPP network may be generally categorized as direct, indirect and hybrid models. In order to enable the D2D functionality, a new logical entity is introduced called the D2D server. The primary distinction between the direct and indirect model is the location of the D2D server.

Figure 8:
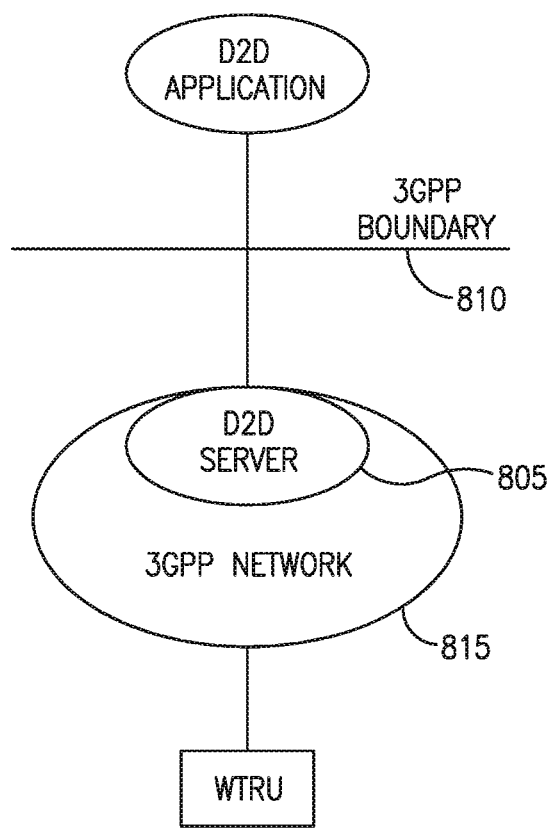
FIG. 8 shows a D2D architecture as a condensed view of a direct model.

FIG. 8 shows a D2D architecture 800 as a condensed view of a direct model. In this direct model, a D2D server 805 may be located within the 3GPP network boundary 810. It may be located as a single entity that is common to multiple operators and is managed jointly by them, or it may be realized as multiple entities, located partly in each operator's domain.

Figure 9:
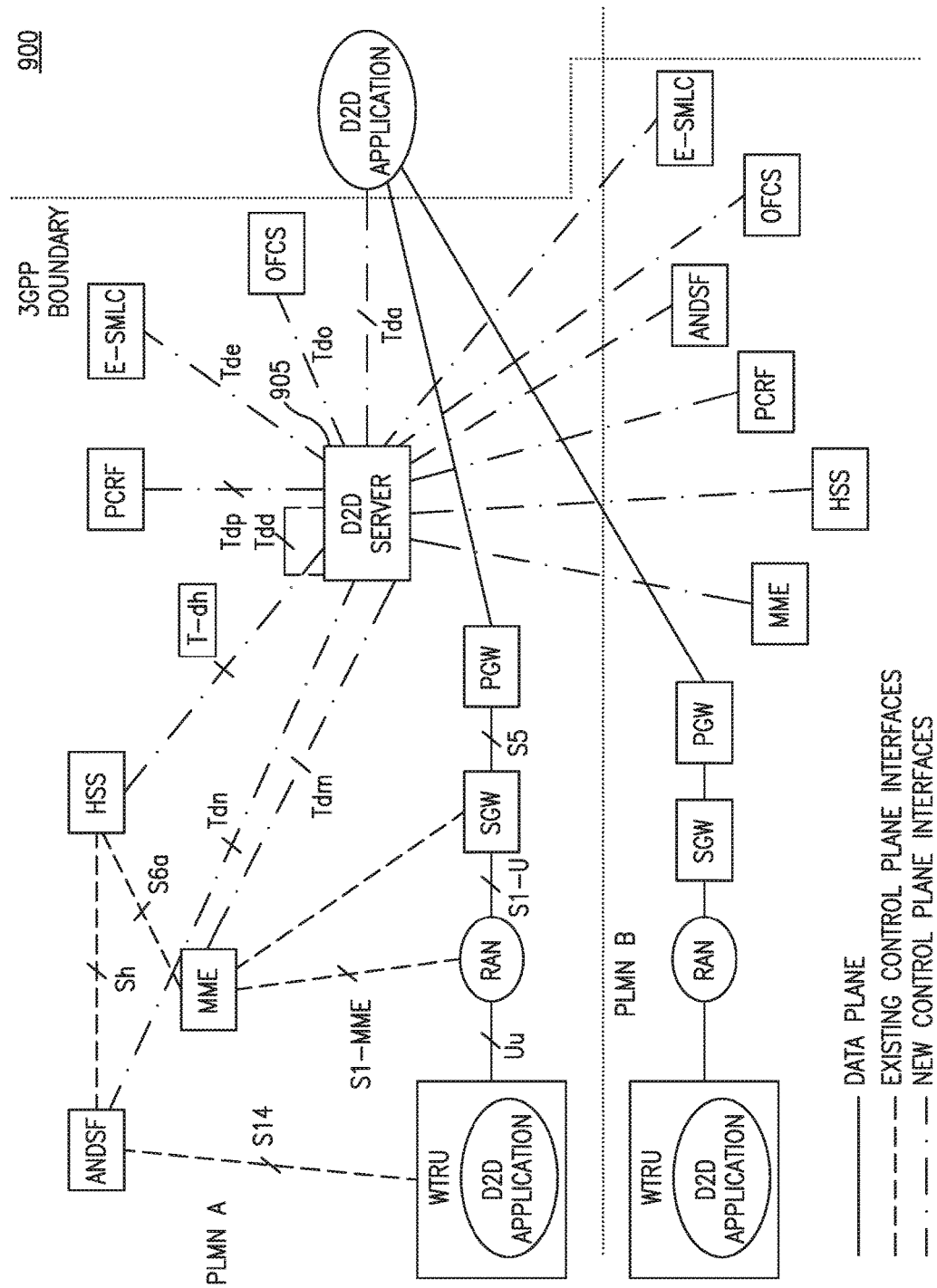
FIG. 9 shows a D2D architecture as an expanded view of a direct model.
Figure 10:
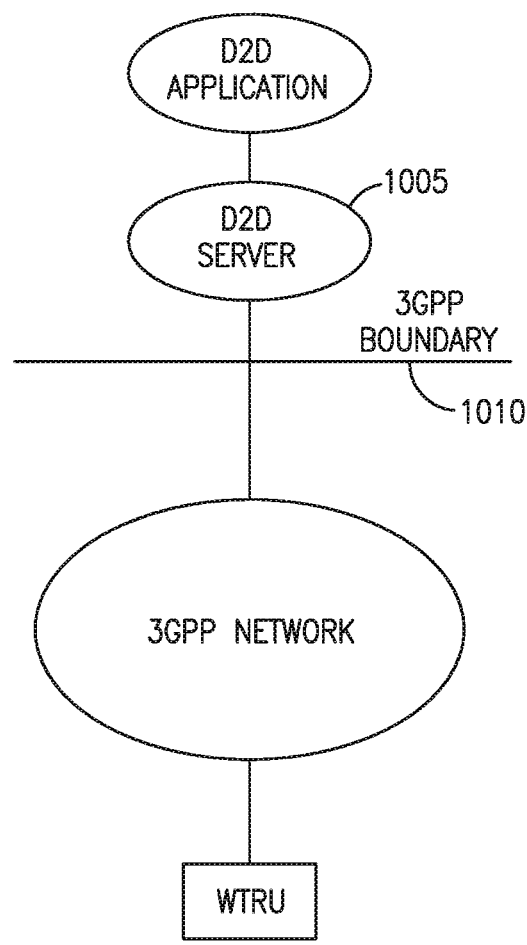
FIG. 10 shows a D2D architecture as a condensed view of an indirect model.
Figure 11:
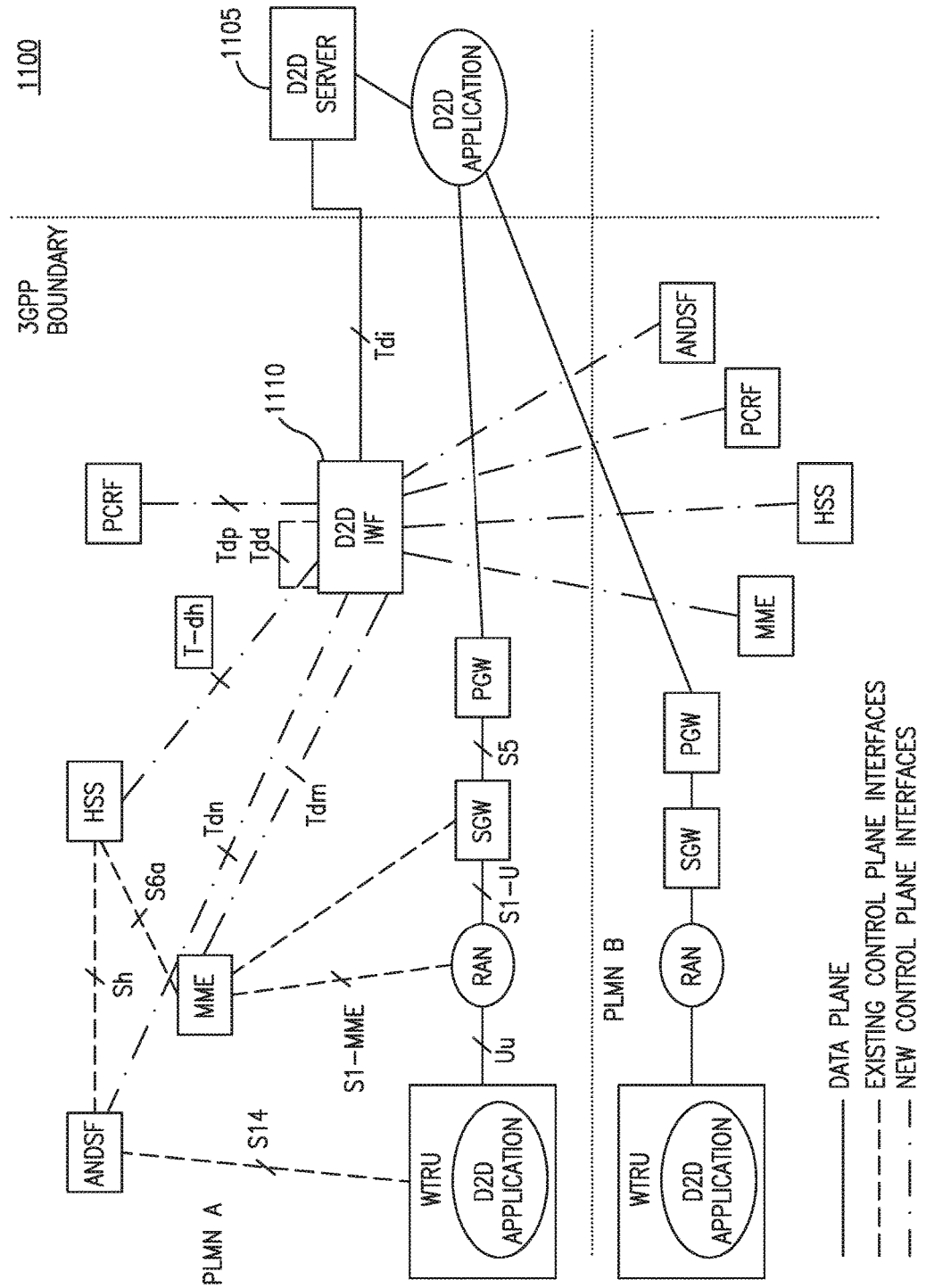
FIG. 11 shows a D2D architecture as an expanded view of an indirect model.

FIG. 9 shows a D2D architecture 900 as an expanded view of a direct model. FIG. 10 shows a D2D architecture 1000 as a condensed view of an indirect model. In the indirect model shown in FIG. 10, a D2D server 1005 may be located outside the 3GPP network boundary 1010, and may be maintained by third party application servers. In the direct model shown in FIG. 8, a D2D interworking function (D2D-IWF) inside the 3GPP network 815 may act as the interface into the D2D server 805. The architecture including a D2D server 1105 and a D2D-IWF 1110 is shown in FIG. 11. Interfaces to an evolved serving mobile location center (E-SMLC) and offline charging system (OFCS) are not shown in FIG. 11. These interfaces may be similar to what is shown in FIG. 11, except that for an indirect model they interface with the D2D-IWF 1110 instead of the D2D server 1105 for the direct model.

Figure 12:
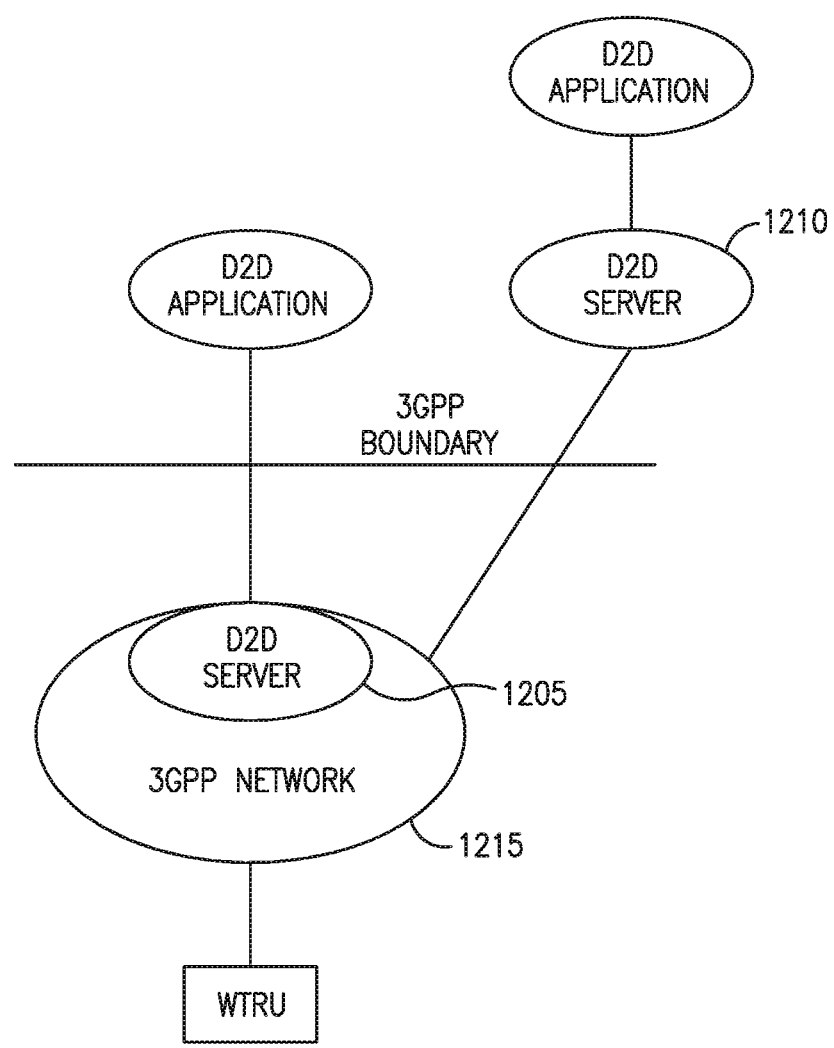
FIG. 12 shows a D2D architecture as a condensed view of a hybrid architecture.

FIG. 12 shows a D2D architecture 1200 as a condensed view of a hybrid architecture. In the hybrid model, a combination of the direct and indirect models are allowed, wherein an operator deploys a D2D server 1205 within its network for a certain portion of its network, while for others, a D2D server function 1210 may be outside the 3GPP network 1215 and may be maintained by a third party. Similarly, in an inter-operator scenario, some operators may deploy the direct model while others may deploy the indirect model, leading to an overall hybrid architecture.

New nodes are described herein as part of the EPC architectures for D2D. For example, the D2D server may manage D2D services for both the direct path and local path approaches to D2D. It may be able to manage both intra-operator as well as inter-operator D2D services. The D2D services may be managed using either a centralized, hierarchical or a distributed management approach. The D2D server may accommodate all of these approaches. The physical location(s) of the D2D server may also depend on the type of D2D management approach used. In the centralized approach, the D2D server for the entire 3GPP network across all operators may be located in one entity. In a hierarchical approach, D2D servers may be replicated for different domains, (a domain may be defined as a PLMN, or an MME pool within a PLMN, and the like), and these may be coordinated by a D2D server entity at a higher level. Multiple levels of hierarchy may be possible. In a distributed approach, multiple peer D2D entities may be located in different domains, and they may communicate to each other when they need to do so. The D2D server's functionality may be divided into several logical functions.

For purposes of device discovery, each user device may be provided with a D2D ID that is locally unique, preferably unique within the region serviced by the D2D server. This ID is tied to the physical device, and not to any application and/or service that the end-user may be subscribed to.

The D2D ID may be of several forms. For example, a physical layer (PHY) sequence such as a Zadoff Chu (ZC) sequence may be used in baseline LTE PHY to separate the reference symbol transmissions from different WTRUs on the uplink. A D2D radio network temporary ID (D2D-RNTI), similar to the RNTIs used to distinguish the PHY channels to/from different WTRUs, may be used. A D2D temporary mobile subscriber identity (D2D-TMSI), similar to the TMSI used in baseline LTE to identify a WTRU's subscriber identity module (SIM), may be used. Alternatively, a temporary identity pertaining to a different air interface, such as IEEE 802.11n, in the case where the D2D link is over a different radio access technology (RAT), or a D2D uniform resource ID (URI) may be used.

The D2D server may be responsible for provisioning, storing and maintaining the D2D device IDs for each D2D capable device that is attached to the network in cooperation with a home subscriber server (HSS). It may also provide the users with the mapping of the service identity to device identity that is required for the successful completion of the service discovery function. The device ID may be unique within the region controlled by the D2D server.

The D2D server may function as the repository as well as the arbiter of policies that affect the D2D communication. These policies may broadly be divided into operator specific policies, user specific policies and preferences, and user access list restrictions. Some of these policies may also pertain to specific services and may affect all devices that are using that service. For example, a proximity policy may be used to define proximity either by radio distance or imposed by an operator network. Discoverability and privacy restrictions may dictate whether a user may be discovered only by a restricted set of other users, or by anyone on the network. Another policy may dictate behavior with respect to users belonging to a different PLMN versus the same PLMN. These may be operator-defined, user-defined or both. Discoverability may also be restricted on the service layer, for example allowed for unicast (and not multicast) services. A battery life policy may govern the operation of the D2D discovery and communication mechanisms in relation to the remaining battery life of the WTRU. A public safety policy may dictate the operation of the public safety mode, (including loss of infrastructure coverage). For D2D user preferences and D2D application specific policies, specific D2D users may not be allowed to access some D2D applications based on their subscription or other billing reasons.

A D2D server may obtain location information for D2D capable WTRUs either directly from an evolved serving mobile location center (E-SMLC) or from an MME. The MME may initiate the location service upon receiving a request for location service for a particular D2D capable WTRU from another entity, such as a gateway mobile location center (GMLC), eNB, or WTRU. The MME may also initiate location services on behalf of a particular D2D capable WTRU. The MME my then send a location service request to the E-SMLC, which in turn may process the location service request. The process may include transferring assistance data to the D2D WTRU to assist with WTRU-based and/or WTRU-assisted positioning, and/or may include positioning of the D2D capable WTRU. Once complete, the E-SMLC may return the process result back to the MME, (e.g., a position estimate for the WTRU and/or an indication of any assistance data transferred to the WTRU). The MME may further forward the result to D2D server as required.

The D2D server may use this information to assist in service discovery procedure. Similar operations may also be performed as part of an enhanced ANDSF function.

The D2D server may play a major role in the establishment of a D2D call. The D2F server may be aware of the PLMN associated with each D2D WTRU, and may assist in several aspects of call establishment, since the D2D server may be aware of the MME to which a D2D WTRU is attached. Therefore, the D2D server may select the appropriate MME to contact in order to negotiate the parameters of a D2D call. For broadcast sessions, this may involve multiple MMEs from multiple PLMNs.

The D2D server may coordinate the establishment of D2D links by maintaining and tracking the capabilities of the D2D WTRUs. The server maintains the list of WTRUs that are currently attached to the network and capable of D2D services, their WTRU capability information along with their PLMNs, device IDs, and the temporary service names for the application services used by them. Based on this information, the D2D server may determine the minimum set of capabilities for a D2D session, and communicate the same to the end users through the 3GPP network. For example, if WTRU1 reports in its capability information, (WTRU-evolved universal terrestrial radio access (EUTRA) capability information element (IE)), that it may support a two-layer multiple-input multiple-output (MIMO) configuration for both downlink (DL) and uplink (UL), while WTRU2 may support a two-layer DL, but only a non-MIMO UL, then the minimum configuration for the D2D session, as conveyed in radio resource control reconfiguration messages may include two-layer MIMO for transmissions from WTRU1 to WTRU2, and non-MIMO for WTRU2 to WTRU1 transmissions. Capability establishment may be performed for both unicast and for broadcast sessions.

The D2D server may be aware of the D2D users registered in the area. It may be informed by the MME, both when WTRUs register in a tracking area in RRC-IDLE state, and when the WTRUs enter into RRC-Connected state with a particular eNB. Thus it may be in a position to track the mobility of the D2D WTRUs and may assist in mobility functions, such as handover from D2D mode to infrastructure mode.

The D2D Server may perform negotiations with the application servers. It may be aware of all the temporary D2D services that are registered and active in the region that it is servicing. It may track user-access lists for each service separately. For example, both user A and user B may be registered with Facebook and Google+ services. But user A may be a Facebook friend of user B, but not a Google+ group member of user B. The D2D server may push down the required filters to the WTRU for all of the temporary services that the WTRU is registered for. It may manage the service filters for each WTRU per service and update them as required. Service filters may also be provided by an enhanced ANDSF function. The D2D server may also maintain and push service-specific policies to the users.

The D2D devices may perform periodic and event-driven discovery in order to discover new devices in their vicinity, or to maintain connectivity with other users within the same temporary service group for certain applications. This process may be performed both in IDLE mode, and in connected mode, though possibly at different periodicities. In connected mode, when the WTRUs are not actively transmitting, they may go to connected mode discontinuous reception (DRX), while still participating in the discovery process. The D2D devices may be configured with a discovery pattern, that dictates when they wake-up, transmit their own device identity, listen for other WTRUs, and go back to sleep. The D2D server may assist in the formation of this pattern and co-ordination of the patterns for each group so that the WTRUs may minimize their wake-up and more efficiently use their battery.

The D2D server may contain a comprehensive database of WTRU parameters related to D2D service. The database may include WTRU device IDs (types of IDs). For each WTRU, the database may include the address for the MME with which WTRU is attached. The database may include WTRU capabilities relevant to D2D services, temporary service names for each service, WTRU service IDs for WTRUs registered with each service, (the same WTRU may have a different service ID in different services), mapping of WTRU device ID to service IDs, a list of WTRUs registered with each service, WTRU filters for each service, (i.e., for each WTRU/service pair, a list of other WTRU service IDs that are allowed to have D2D associations). The same WTRUs may be allowed to have D2D association on some service, but not on others. For example, user A may be a Facebook friend of user B, but not a Google+ group member of user B. The database may include D2D service preferences for each WTRU/service, location information for each WTRU, and offline charging information for each WTRU.

The D2D server may be a logical entity. The physical location of the D2D server may depend on the architectural choices made by each operator. For separate physical entity or entities, the D2D server may be a single or multiple physical entities per operator, or it may be consolidated across multiple operators. For a D2D server co-located with existing nodes, it may be co-located with one or more of the existing EPC nodes—eNB, ANDSF, MME, HSS, policy and charging rules function (PCRF), E-SMLC, and the like. One or more of the logical functions may be executed within existing EPC nodes. An enhanced ANDSF may be used for assistance with service discovery.

In an alternative embodiment, a portion of the logical functions of D2D server may also be executed as part of the application server functionality.

Whatever the choice of the physical realization of D2D server, the logical functions may be executed to implement D2D services.

For the indirect and hybrid models of deployment of D2D services, where the D2D server lies outside the 3GPP network boundary, an interworking function may be necessary as a standardized interface between the 3GPP network nodes and the D2D server. If the D2D server is within the 3GPP boundary, the D2D-IWF may collapse into the D2D server or may be co-located with it. The D2D-IWF may be similar to a machine type communication (MTC)-IWF in its functionality. It may hide the internal EPC interfaces and architecture from the D2D server. The D2D-IWF may hide the 3GPP operator's internal network topology, terminate the interfaces to the D2D server, MME, HSS and perform the appropriate protocol translation, authenticate the D2D server before it communicates with the 3GPP network, and authorize and support control plane messaging to and from the D2D server.

An instantiation of the policy and charge enhanced function (PCEF) may be pushed to the WTRU in order for the WTRU to be able to interface with the PCRF and for the network to enforce compliance with its policies. The D2D server may optionally collect charging information from PCEF in the WTRU and provide it to the offline charging system (OFCS). The charging information may also be sent directly from the PCEF in the WTRU to the online charging system (OCS) via the Gy interface.

When the PCEF is executed in the WTRU, the end-user may not have the ability to manipulate the policy and charging information. For this reason, it is recommended that this functionality be implemented in a trusted environment in the WTRU, for example using TrustZone.

Alternatively, an Open Mobile Alliance (OMA) device management (DM)-based policy framework may be used. In this case, an OMA DM client may be located in the WTRU, with the OMA DM server providing policies as OMA DM management objects (MOs). OMA DM may define a protocol for exchanging MOs which may be used. Alternately, OMA DM MOs maybe exchanged using Web service protocols such as simple object access protocol (SOAP). An example of an OMA DM-based policy framework is ANDSF.

Charging may also be supported within OMA DM by associating a usage element (or elements) in the MO with each D2D IP flow/service and requiring the WTRU to keep track an update the element appropriately. Finally, the OMA DM MOs may be well suited to securing with device security concepts, such as TrustZone. Some of the changes that may be required in existing EPC nodes in order to integrate the D2D server into the 3GPP network architecture, and to provide D2D services to users, are described herein.

The MME may be the primary interface between the WTRU's control plane and the D2D server. The MME may relay a D2D device ID to WTRU from the D2D server, process D2D information during an attach procedure and assist in D2D association between WTRUs. The MME may process one or more new device request types for related D2D services. The MME may perform modified bearer setup procedures for D2D bearers. The MME may coordinate radio configuration for D2D service for inter-MME D2D scenarios. For this purpose, there a master-slave relationship may exist between the participating MMEs. The MME may provide the D2D server with information, such as the WTRU's D2D capabilities, direct path availability indication, and the like.

The HSS may provide the D2D server with the mapping between an international mobile subscriber identity (IMSI), and D2D device ID(s) and temporary service IDs.

The PCRF may be the repository of D2D-related policies and may provide the D2D server with D2D policies. The PCRF may receive updates on a user's D2D preferences, verify whether a user's service requests are permissible by its policy settings, and ensure compliance with network policies.

The eNBs may be responsible for radio resource management (RRM) of D2D links. For inter-eNB D2D scenarios, this may involve coordination with multiple eNBs simultaneously, some of them within the same PLMN, and some in other PLMNs. Such coordination may be performed over the X2 interface, which may be modified for this purpose. The eNBs may also be responsible for providing compatible radio bearer configurations for inter-eNB D2D links. For such inter-eNB coordination, there may be an assumption of master-slave relationship between the participating eNBs.

The eNBs may also perform multicast D2D scheduling, which is also a new paradigm compared to baseline multimedia broadcast multicast service (MBMS). For D2D links, the eNBs may modify their bearer configurations, in the sense that the S1 and S5 interfaces may not be necessary for both direct path and local path bearers. They may also perform modified routing for local path bearers. For mobility between infrastructure and D2D modes, the eNBs may forward data in their buffers, (infra to D2D handover), and receive such data from the WTRUs, (D2D to infra handover).

ANDSF functionality may be enhanced to support D2D services. New interfaces may include D2D server to MME (Tdm interface), D2D server to HSS (Tdh interface), D2D server to PCRF (Tdp interface), D2D server to D2D server (Tdd interface), D2D server to ANDSF (Tdn interface), D2D server to E-SMLC (Tde interface), D2D server to OFCS (Tdo interface), and D2D server to application server (Tda interface).

Updates to existing interfaces may include extending an S10 interface to allow inter-MME exchanges, (both for intra-PLMN and inter-PLMN), for D2D services apart from inter-MME handovers. These D2D exchanges may also allow for coordination of radio configurations required for D2D bearer setup. Updates to existing interfaces may also include extending an S6a interface for D2D service verification directly between an MME and an HSS. It may also help to provide mapping between the IMSI or other existing temporary IDs and the D2D temporary device ID.

FIG. 13 is a signal flow diagram of a possible D2D service sequence in a wireless communication system 1300 including a D2D-capable WTRU 1305, an eNB 1310, an MME 1315, an SGW/PGW 1320, a D2D server 1325, an HSS 1330, a PCRF 1335 and an application server 1340. The introduction of D2D services may require changes in NAS and RRC procedures. FIG. 13 provides a view of the overall sequence of procedures as a WTRU attaches to the network and obtains D2D services. In the procedure descriptions below, the direct model may be assumed, wherein the D2D server is within the 3GPP boundary. The corresponding procedure for the indirect model may be slightly modified with the introduction of the D2D-IWF.

FIG. 13 depicts a modified attached procedure that enables the D2D-capable WTRU 1305 to provide the network with its D2D capabilities. Furthermore, the procedure is used to enable the network to provide the D2D-capable WTRU 1305 with an identity it may use when executing the D2D discovery procedure. During an attach procedure 1345, the WTRU 1305 may inform the network about its D2D capabilities, including but not limited to, direct path D2D radio capability and D2D service capabilities such as the ability to support D2D services and whether the WTRU 1305 may operate in relay mode and/or a broadcast mode. This information may be transported in an attach NAS message and then sent to the D2D server 1325 for further processing to determine whether the WTRU 1305 is capable of the D2D service. The D2D server 1325 may further check policies with other policy entities such as the PCRF 1335. If the D2D server 1325 approves the WTRU 1305 for D2D services, based on the WTRU capabilities and associated policies, the D2D server 1325 may assign a D2D device identifier. The D2D server 1325 may passes this information to the MME 1315. The MME 1315 may include the D2D identifier in an attach accept message. Once the default bearer is set up at the WTRU 1305 as a result of the attach procedure, the WTRU 1305 may push user preferences to the D2D server 1325. The D2D server 1325 may update the PCRF 1335 with updated user preference, which may include discoverability public or private preferences.

The WTRU 1305 may attempt to use D2D services at any time that it is attached to the network. It may do so by sending an application request message to the application server 1340 through the default radio bearer. This may initiate the service discovery process. As part of the service discovery, the WTRU 1305 may be provided with one or more temporary service names for each D2D application it is registered to. This service name may be provided by the application server 1340 and relayed by the D2D server 1325 to the WTRU 1305.

The D2D server 1325 may also provide the WTRU 1305 with a user list, which may provide the application identities of the possible D2D peers for each application, and the D2D device IDs associated with each device on the user list.

Figure 15:
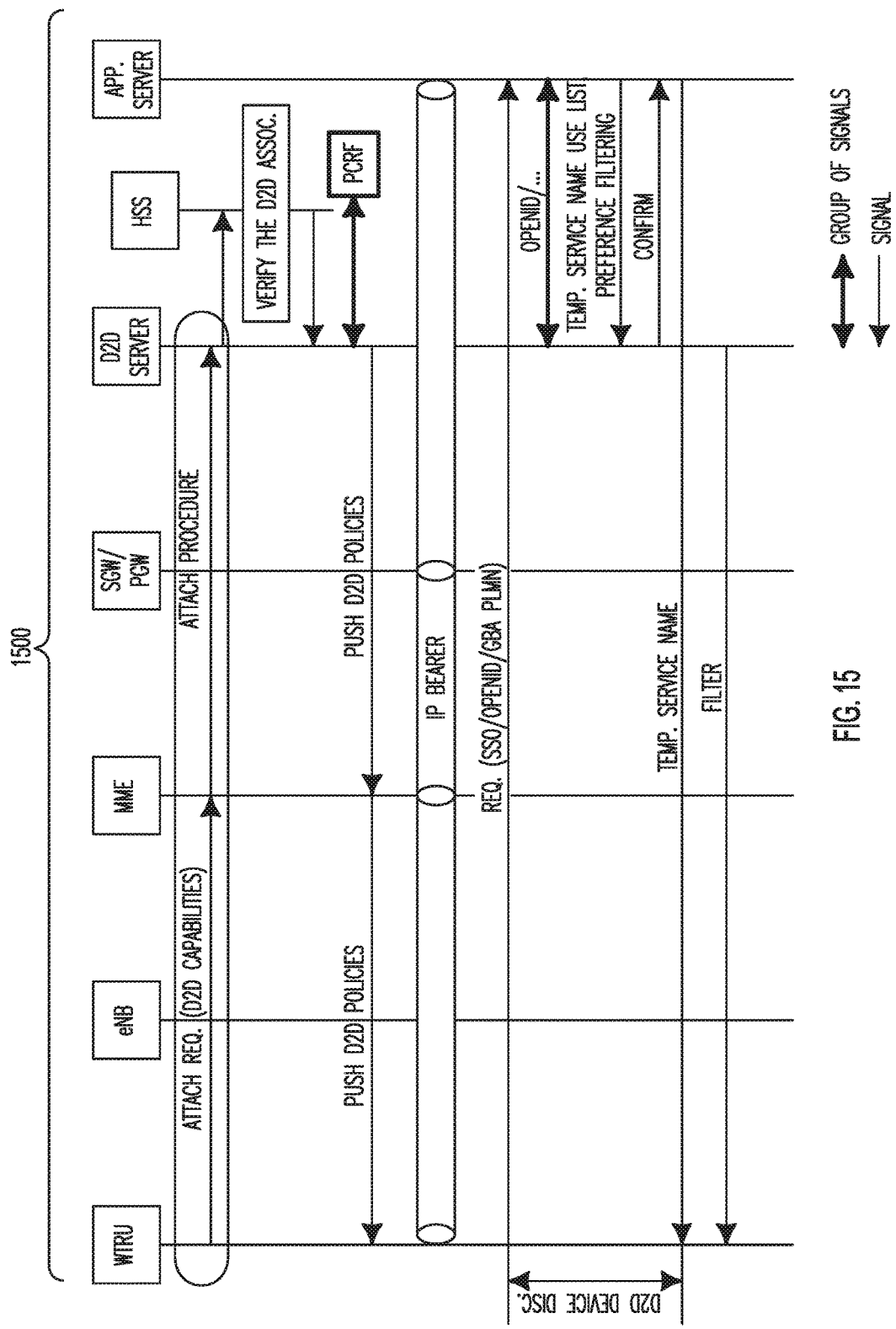
FIG. 15 is a signal flow diagram of example service and device discovery procedures.

There may be more than one D2D service available at a time for the WTRU 1305, and each of them may have an associated temporary service name and user list. The WTRU 1305 may perform an event triggered device discovery. The result of the device discovery, which is a list of discovered device identities, may be filtered by the WTRU 1305 (1350) using the service name—user list—device identity mapping provided above by the D2D server 1325, as depicted in FIG. 15. Alternately, this process of device filtering may be performed at the D2D server 1325. Thus, the WTRU 1305 may send an exhaustive list of discovered devices to the D2D server 1325, which may then filter the list and provide the WTRU 1305 with the users it may associate with for a given service. The device filters may be updated whenever a new service is added, or when a service is deleted or its parameters are updated.

The device discovery may precede the service discovery. In this case, the WTRU 1305 may discover all of the device identities that it may receive in its radio proximity, and the filtering based on device-to-service-identity mapping may be performed at the time of service registration/discovery.

Figure 14A:
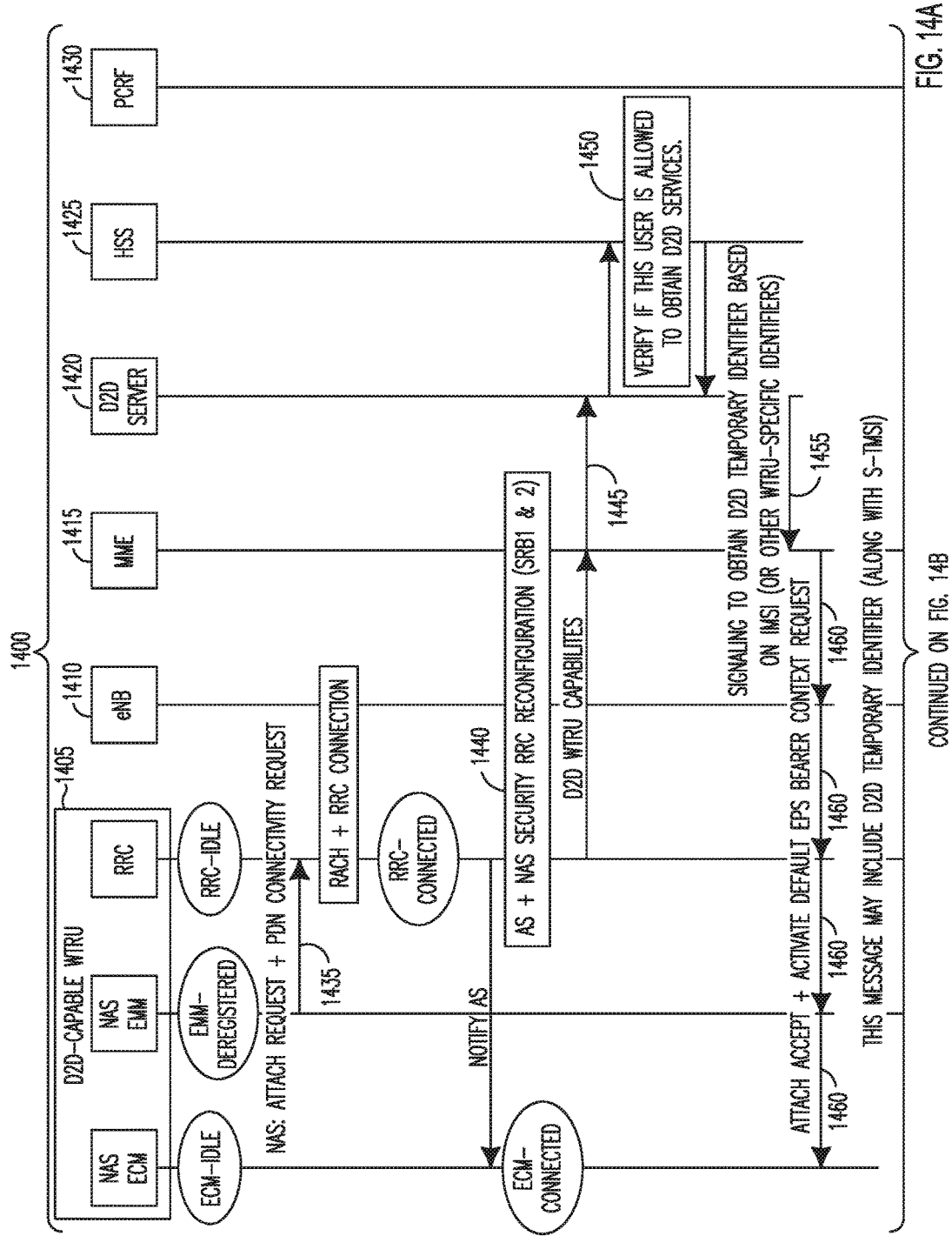
FIGS. 14A and 14B, taken together, are a signal flow diagram of an example attach procedure with D2D support.
Figure 14B:
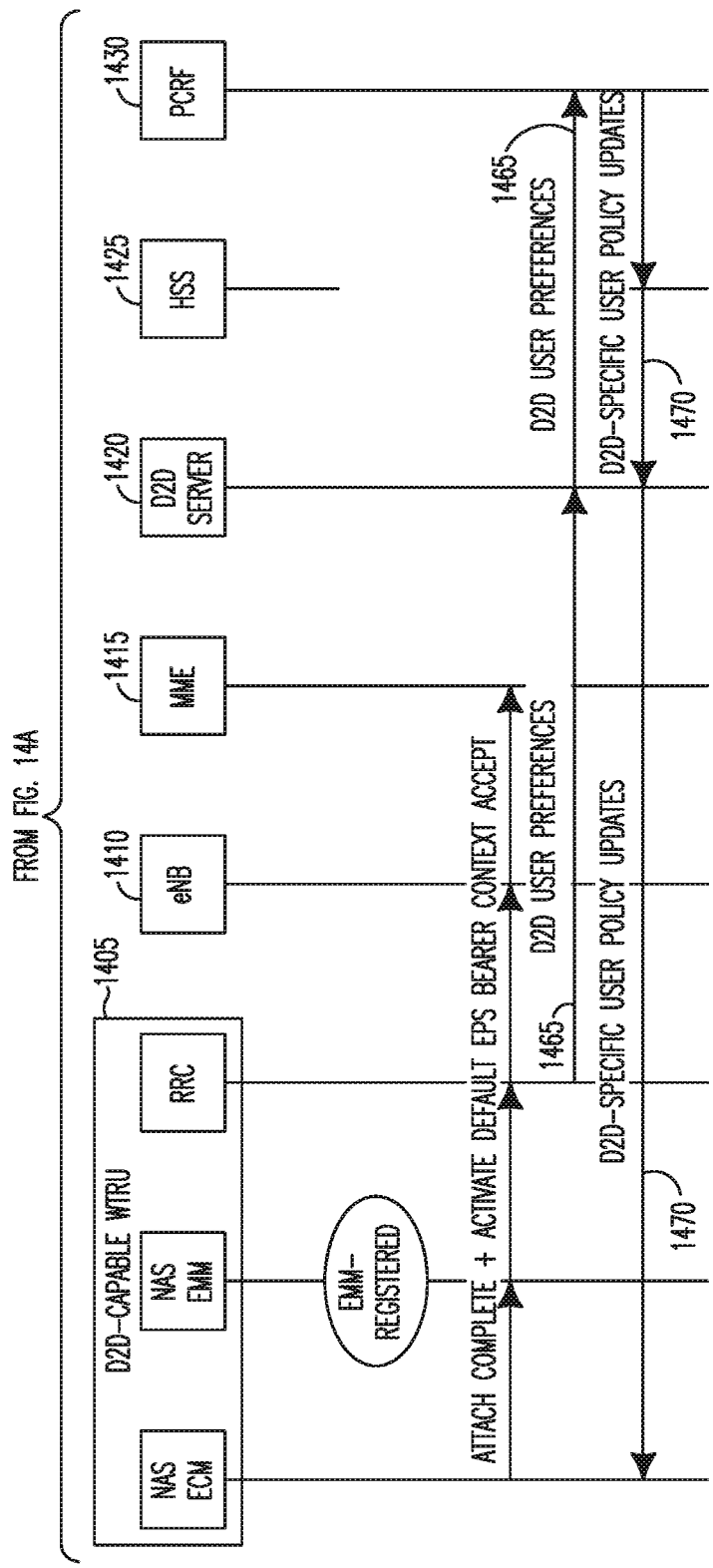

FIGS. 14A and 14B, taken together, are a signal flow diagram of an example attach procedure with D2D support in a wireless communication system 1400 including a D2D capable WTRU 1405, an eNB 1410, an MME 1415, a D2D server 1420, an HSS 1425 and a PCRF 1430. Motivation for updating an attach procedure may occur when a 3GPP ProSe requires that all D2D users be registered in the network. Updates to the attach procedure may be required so that a D2D capable WTRU may inform the network of its D2D capabilities when registering to the network. The network may provide the WTRU with its D2D identity to be used for D2D discovery.

As shown in FIG. 14A, at the beginning of the attach procedure, in the attach request NAS message 1435, one or more new IEs may be added that carry the intention of the WTRU 1405 to participate in D2D services and, optionally, D2D WTRU capabilities. The D2D WTRU capabilities carried in the new IEs may include direct path D2D radio capabilities, D2D service capabilities (via NAS), and the ability of the WTRU 1405 to support D2D services, (e.g., D2D relay mode, broadcast mode).

As shown in FIG. 14A, once the MME 1415 receives the attach request NAS message (1440), the MME 1415 may send the D2D WTRU capabilities 1445 to the D2D server 1420 via the MME 1415. The D2D server 1420 may check if the WTRU 1405 is capable of D2D service. It may also check for policy with other policy entities 1450, (e.g., the PCRF 1430, and the like).

If the D2D server 1420 is logically located outside of the core network, a D2D-IWF may be used to communicate to the D2D server 1420. In the case where the D2D server 1420 is inside the 3GPP network, either as a separate entity or as part of an existing node, such as the ANDSF, the D2D-IWF may become a simplified function that is co-located with the D2D server 1420.

If the D2D server 1420 approves the WTRU 1405 for D2D service, the D2D server 1420 may assign a unique D2D device ID to the WTRU 1405. The D2D server 1420 may send the D2D device ID to the MME 1415 (1455), which may include the same in an attach accept NAS message 1460 sent to the WTRU 1405.

After receiving the attach accept NAS message 1460 and having the default radio bearer setup, the WTRU 1405 may push D2D user preferences 1465 to the D2D server 1420 as shown in FIG. 14B. The D2D server 1420 may update the PCRF 1430 with the (changed) user preferences 1465, which may include discoverability preferences, such as public or private behavior in relation to battery life and the like. These user preferences 1465 may be generally applicable to all D2D services and not specific to any particular D2D application. However, in the case of emergency service messaging, (e.g., E911, earthquake and tsunami warning system (ETWS), and the like), the user preferences 1465 may be overridden to ensure service continuity. Additionally, in the case of a lawful intercept, the user preferences 1465 may also be overridden to ensure compliance with the local governmental requirements. After taking into account the network imposed D2D policies as well as the WTRU preferences, D2D-specific policies updates 1470 may be pushed from the PCRF 1430 to the D2D server 1420 to the WTRU 1405.

Finally, the D2D server 1420 may also update its database associating the WTRU 1405 with its temporary device ID and the identity of the MME 1415 to which it is attached, and the like. FIG. 15 is a signal flow diagram of example service and device discovery procedures, (with filtering at the WTRU), as described with respect to FIG. 13. A specific protocol for a network service advertising and discovery procedure, and several implementation options for the procedure, are described herein. A network-informed service enabler (NISE) protocol may be employed. A NISE server may be deployed by a third party, possibly for specific uses (e.g., gaming).

A registration request message may be sent from a WTRU to a NISE server. A D2D-capable WTRU may register itself with the NISE server. The registration process may involve terminal identification, whereby the WTRU identifies itself using some means, (i.e., the standard WTRU identification means used in cellular networks). Using location identification, the WTRU may identify its location, again, using communication properties, (e.g., channels, technologies, frequencies that the WTRU uses or may use for D2D communication). Using a D2D service advertisement, the WTRU may list services that it is willing to offer over D2D links. Using a D2D service query, the WTRU may list services which it would like to receive over D2D links, provided a proximate WTRU supporting such services is available. These messages may be sent together or separately. For example, the D2D service advertisement and query messages may be sent at the time the WTRU is registering, but may be repeated to update the list of services the WTRU supports or query for new services. Furthermore, the lists of services that the WTRU supports and services that it is looking to run may be different. This, sending separate advertisement and query messages may provide for maximal flexibility. In some systems, such flexibility may not be necessary and these two messages may be combined into a single message.

A registration confirmation may be sent by a NISE server to a WTRU to confirm a registration request. An advertisement confirmation may be used to confirm an advertisement listing and a query Response may be sent in response to a WTRU service query. The query response may contain a list of WTRUs known to support at least some of the services which the WTRU queried the server for, identified as those requested by the user, and which may be within direct-link range of the WTRU. While the NISE server may use location information to identify WTRUs that are in the general vicinity of the WTRU in question, it may not be possible to identify WTRUs that are within transmission range of a particular WTRU. Mobility may further complicate this problem.

For each WTRU, WTRU discovery information and a list of services may be provided, based on that WTRU registration and service advertisement. WTRU discovery information may be required to discover if the WTRU is within transmission range. This may include certain aspects of the WTRU ID, which channel and radio technologies the WTRU uses, and the like.

As is the case for WTRU-to-NISE server transmissions, the messages may be sent together or separately, depending on whether the WTRU-to-NISE server messages are sent together or separately. Furthermore, if the WTRU-to-NISE server advertisement and query messages are combined, then the advertisement confirmation response may not be necessary, as the query response may implicitly confirm the Advertisement. Likewise, if the query response and registration are combined, the query response may implicitly confirm the registration.

Upon receiving the NISE query response, a WTRU may be able to proceed with a D2D discovery protocol to discover and connect to one of the WTRUs listed in the query response. While any number of known device discovery protocols may be used, running NISE prior to discovery may significantly reduce the overhead associated with discovery, as the WTRU initiating discovery may now possess the information about WTRUs which are nearby, (although perhaps not actually within range), and are able to support desired services. Furthermore, the WTRU may also have search information, (e.g., channels used), that may significantly reduce the effort required for discovery.

Formally, ANDSF is a network discovery and selection function, (i.e., server), which supports discovery and selection of non-3GPP access networks by the WTRU. The selection process may be policy based, (i.e., the ANDSF may provide rules/policies which the WTRU may follow in selecting access networks). Practically, the term ANDSF may be used to encompass the ANDSF server itself, as well as the protocol used to access it and the information delivered from it. The information delivered may be contained in an OMA DM MO, (i.e., the ANDSF MO). The ANDSF MO may contain both the discovery information and access rules/policies.

3GPP may support both a push and a pull model for provisioning the WTRU by the ANDSF.

Figure 16:
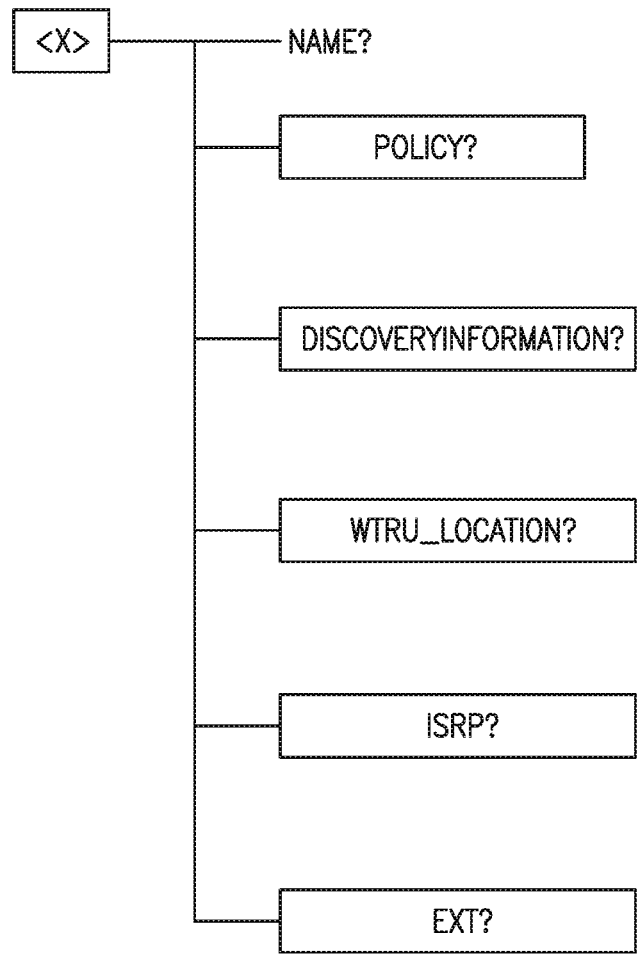
FIG. 16 shows an access network discovery and selection function (ANDSF) management object (MO) top-level structure.

FIG. 16 shows an access network discovery and selection function (ANDSF) management object (MO) top-level structure. D2D service discovery information may be incorporated into the ANDSF MO, which may be partitioned as shown in FIG. 16.

Figure 17:
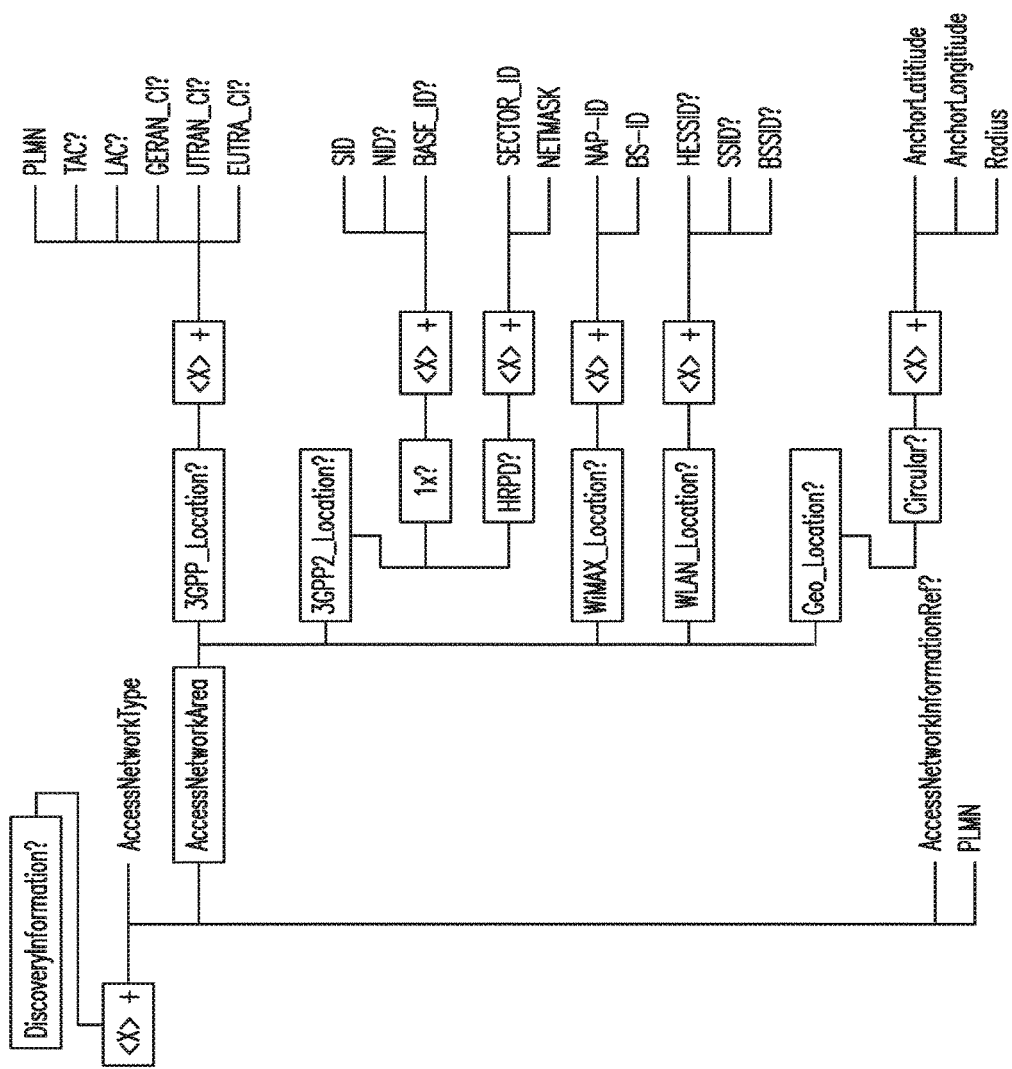
FIG. 17 shows an ANDSF MO discovery information sub-tree structure.
Figure 18:
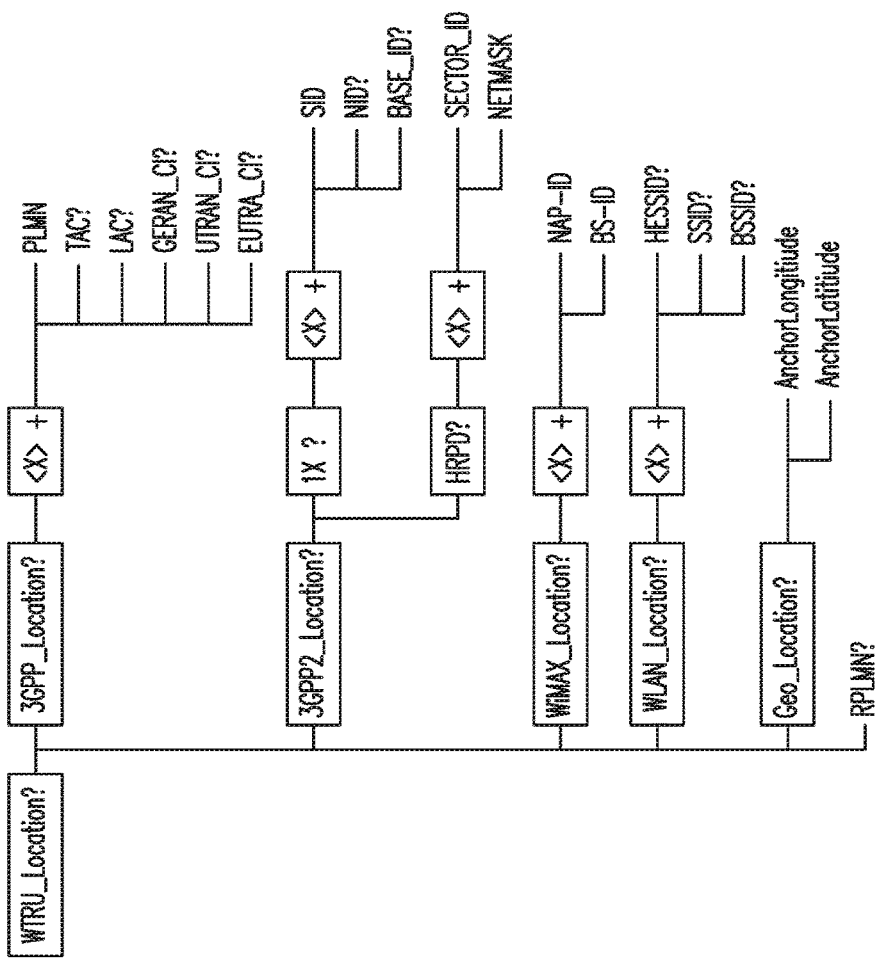
FIG. 18 shows an ANDSF MO WTRU location sub-tree structure.

The main parts (sub-trees) of the ANDSF MO may include a policy that is used to provision inter-system mobility policy (ISMP) rules, which may be used primarily for offload network selection. The ANDSF MO may also include a discovery information sub-tree structure, as shown in FIG. 17, which may be used to provision the WTRU with information necessary for access network discovery. The ANDSF MO may also include an ANDSF MO WTRU location sub-tree structure, as shown in FIG. 18, to allow a WTRU to record its location, which may then be read by ANDSF. The trigger for update of this information may be a change of location, although the exact definition and timing tend to be somewhat implementation dependent. The means of location identification may be clearly observed from the structure of this sub-tree. The ANDSF MO may also include inter-system routing policy (ISRP). This sub-tree may record policies for inter-system routing, i.e., flow-specific usage of various networks and situations where different networks may be used for different flows). The sub-tree is rather large and complex.

To implement NISE using ANDSF, additional structures may be defined that need to be introduced in the ANDSF MO. A service advertisement sub-tree, which will be used throughout, may be referred to as "D2D_Service" and may contain a service/application name IE, a service/application ID IE as per some known service/application registration or identification system, and a service/application signature IE, (e.g., for integrity verification). In addition, a D2D service discovery sub-tree may contain a list of WTRUs available in the area, together with some identifying information. For each WTRU, information designed to assist in discovery of the WTRU and information about services supported by the WTRU may be included in the list.

Figure 19:
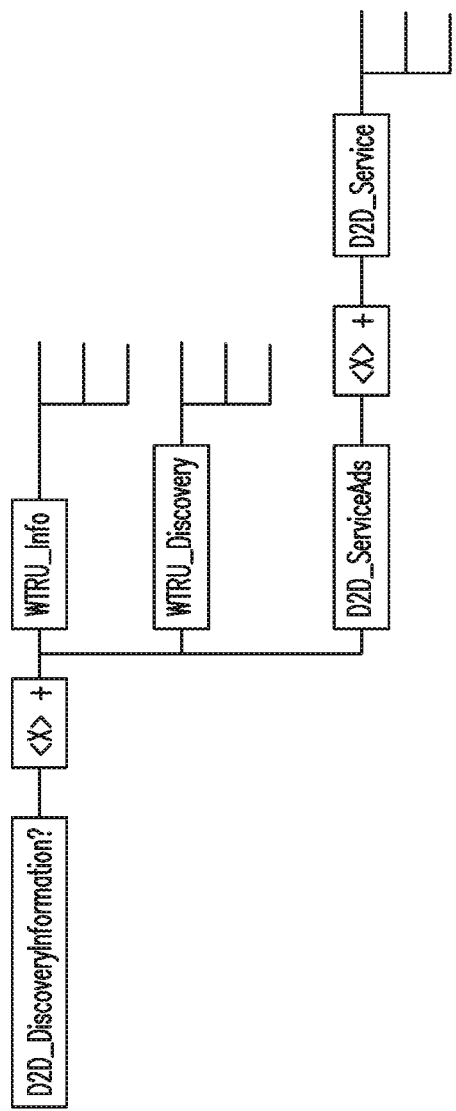
FIG. 19 shows a D2D service discovery sub-tree.

FIG. 19 shows a D2D service discovery sub-tree. The tree may be located in several places within the ANDSF MO. The most natural options may be either at the top level of ANDSF MO, or within the "discovery information" sub-tree. As shown in FIG. 19, a "D2_ServiceAds" sub-tree may be composed of a list of "D2D_Service" sub-trees used to inform a WTRU of the services being advertised by discoverable WTRUs in its vicinity. However, the "D2D_ServiceAds" sub-tree may also be used standalone, (e.g., at the root level of the ANDSF MO), for a WTRU to record (and then report) services which it is willing to support. Likewise, a "D2D_ServiceQuery" sub-tree may be composed of a list of D2D_Service sub-trees used to query the ANDSF for service available D2D services. The most natural location for WTRUs service advertizing and query sub-trees may be to place a new "D2D" sub-tree at the root of the MO, which would include these sub-trees as well, as, potentially D2D discovery information.

The 3GPP standard may use the OMA DM protocol to provision the WTRU with the ANDSF MO. Other protocols for exchanging extensible markup language (XML) documents, (e.g., SOAP), may also be used.

Figure 20:
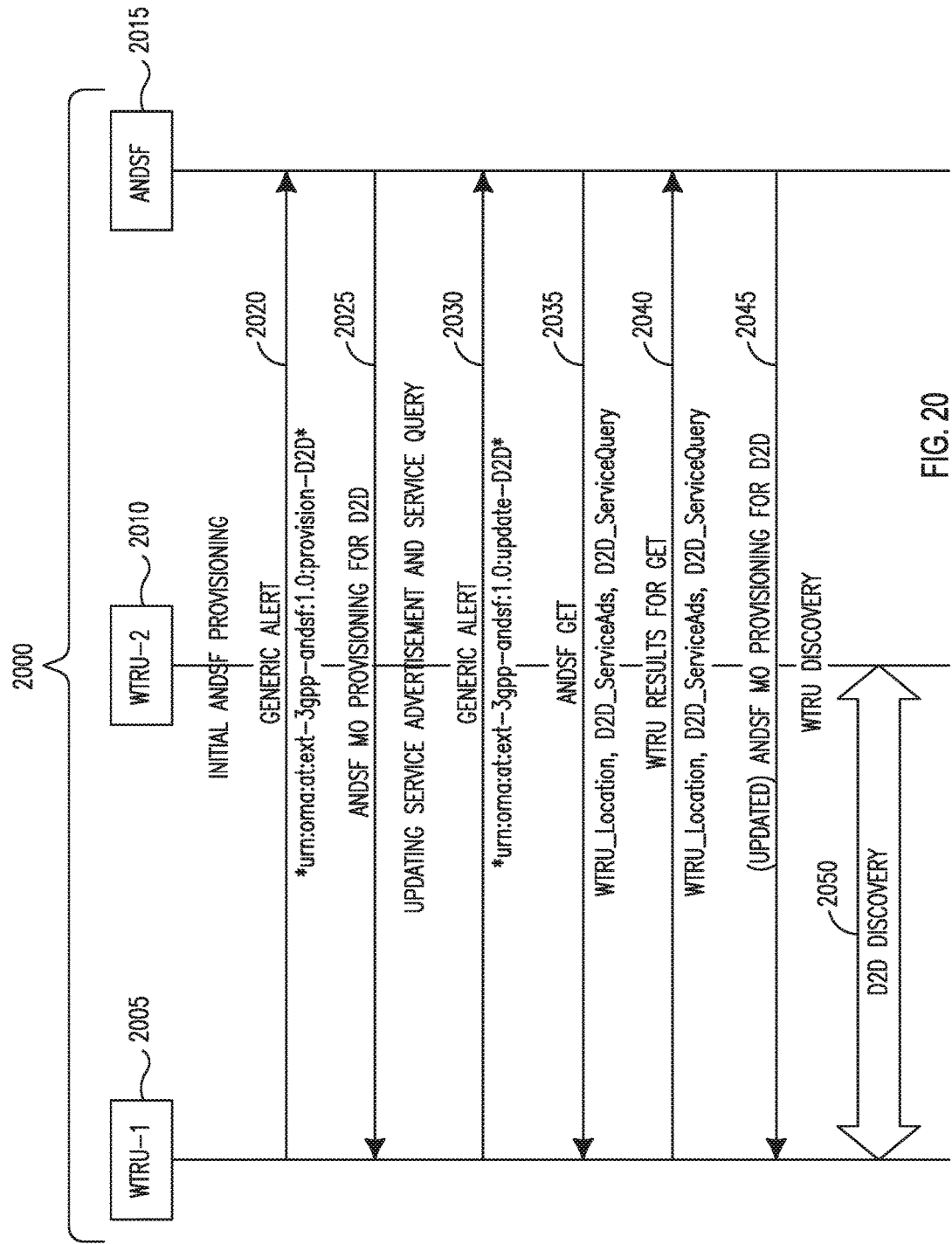
FIG. 20 shows an example of a communication exchange for ANDSF assisted D2D discovery.

FIG. 20 shows an example of a communication exchange procedure for ANDSF assisted D2D discovery in a wireless communication system 2000 including a first WTRU 2005, a second WTRU 2010 and an ANDSF 2015. During initial ANDSF access, an OMA DM "generic alert" message 2020 may initiate ANDSF provisioning 2025, where the "type" of alert message 2020 indicates that D2D provisioning information is desired. ISRP and/or ISMP provisioning may require a separate alert to be sent or may be included as part of D2D provisioning. As part of this process, the WTRU 2005 may provide identifying and location information, and the MO may be provisioned with capabilities to fill-in service advertisement and/or service query information.

At some point, the WTRU 2005 may fill in service advertisement and service query leafs, and inform the ANDSF 2015, (using an "update-D2D" type of generic alert 2030), that it has updated some (or all) of this information. The ANDSF 2015 may then use the OMA DM "GET" method 2035 to read the updated information and, based on the results, may update (2040) the WTRU's ANDSF MO with new D2D discovery information. The WTRU location may be read as part of the D2D update 2045, as this may have changed since the last exchange and may provide the WTRU 2005 with useful information. Finally, the WTRU 2005 may use the newly provisioned discovery information to perform D2D discovery 2050 and find another WTRU to communicate with.

The ANDSF push may differ somewhat, but not significantly, from the pull process described below. The push model may be useful for pushing policy updates that are time sensitive, (i.e., may not wait for the WTRU to request the policy). In accordance with the push model, s full policy may be pushed to a WTRU or a set of WTRUs (or broadcast to all). The WTRUs may receive a policy check for policy applicability, and if the policy update applies to them they may store it. Further communication may not be necessary.

The policy push may only be a trigger for the WTRU (or WTRUs) to go and get a particular policy update, (i.e., the push may initiate a pull). In this case, the WTRUs receiving a push may check its content and, if necessary, may initiate a policy update as per FIG. 20.

Discovery of suitable access networks may be provided through the advertisement of an access network type, (private network, free public network, for-fee public network), roaming consortium, and venue information. The layer 2 (L2) protocol generic advertisement service (GAS) and the query/response mechanism (access network query protocol (ANQP)) built on top of GAS may be provided.

GAS is a layer 2-based protocol for transport of advertisement frames between a WTRU and a server in the network prior to authentication to provide the availability of information related to the network services. GAS may provide functionality that enables WTRUs to discover the availability of information related to desired network services, (e.g., information about services such as provided in an independent basic service set (IBSS), local access services, available subscription service providers (SSPs) and/or SSP networks (SSPNs) or other external networks.

GAS may server as a transport mechanism for advertisement services that uses a generic container to advertise network services' information over an IEEE 802.11 network while WTRUs are in the unassociated state as well as the associated state.

ANQP is one advertisement protocol transported by GAS. The advertisement protocol element may specify the advertisement protocols that a WTRU may use to communicate with an advertisement server (AS). The AS may be co-located with a WTRU or in an external network. The AS may be either a media independent handover (MIH) Server, (as GAS is used to transport MIH messages), or an ANQP server, (storing ANQP parameters), or another type of information server.

Figure 21:
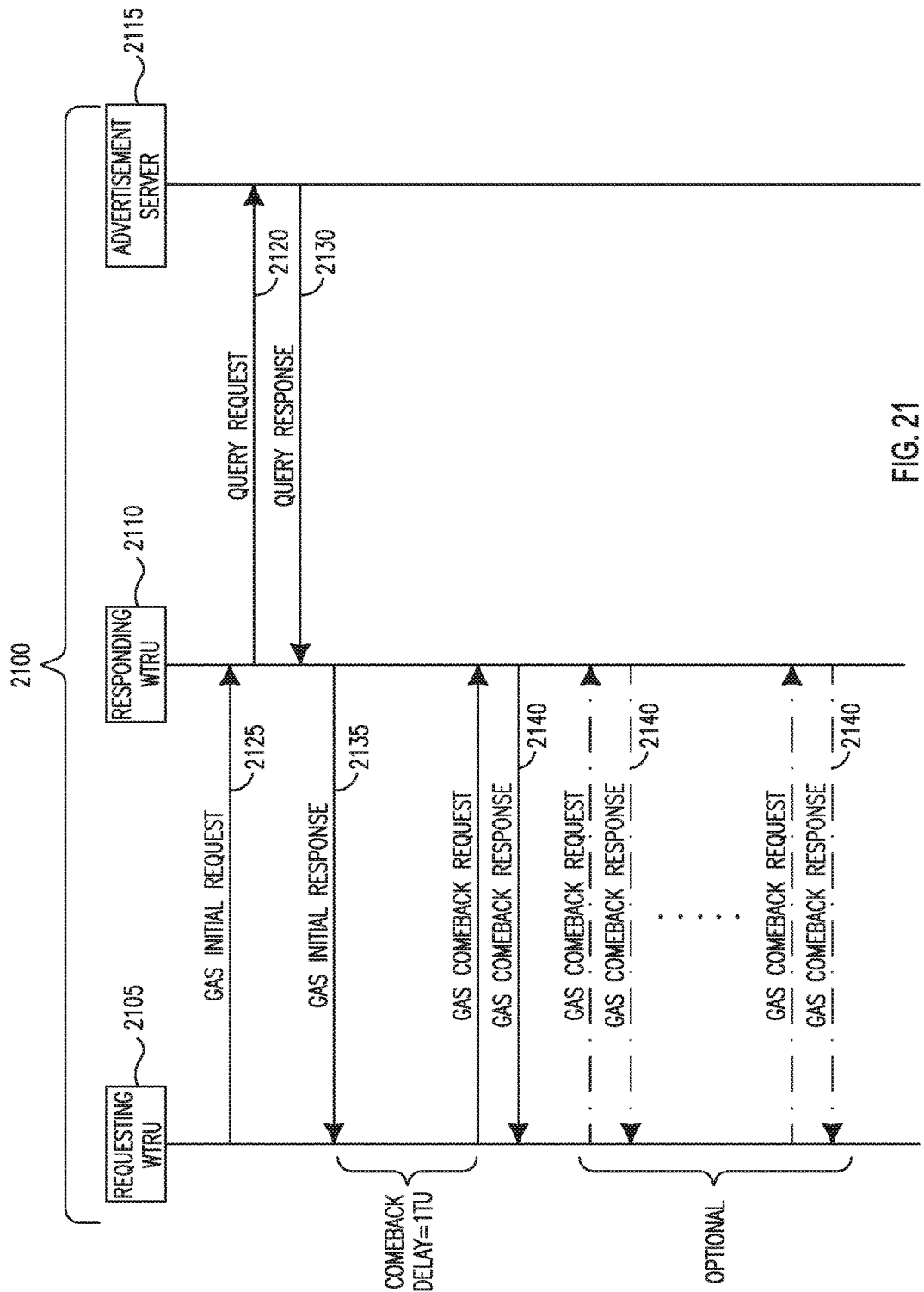
FIG. 21 shows a basic structure of a generic advertisement service (GAS) protocol.

FIG. 21 shows a basic structure of a generic advertisement service (GAS) protocol in a wireless communication system including a requesting WTRU 2105, a responding WTRU 2110 and an advertisement server 2115. The GAS protocol, which may be used to transport queries and query responses, may be transparent to the advertisement protocol.

As shown in FIG. 21, the responding WTRU 2110 may transmit a GAS query request frame 2120 to the advertisement server 2115 using a GAS initial request frame 2125 received from the requesting WTRU 2105. The responding WTRU 2110 may provide a GAS query response frame 2130 to responding WTRU 2110, which then issues a GAS initial response frame 2135 to the requesting WTRU 2105. The GAS query response frame 2130 may be delivered in a single GAS initial response frame 2135, or in one or more GAS comeback response frames 2140.

The advertisement server 2115 associated with the responding WTRU 2110 may incur delays or fill more than one frame, where the responding WTRU 2110 may indicate a time delay period before a response is sent, (e.g., X seconds or N frames). This behavior may set up the GAS comeback message exchange where the requesting WTRU 2105 pauses if necessary, and then sends a number of GAS comeback request frames 2140, each triggering a GAS comeback response frame from the responding WTRU 2110.

The ANQP may be a query and response protocol used by a mobile device to discover a range of information, including the hotspot operator's domain name, (a globally unique, machine searchable data element), roaming partners accessible via the hotspot along with their credential type and extensible authentication protocol (EAP) method supported for authentication, IP address type availability, (e.g., IPv4, IPv6), and other metadata useful in a WTRU's network selection process.

IEEE 802.11u may require support of the following ANQP elements: venue name information, network authentication type information, roaming consortium list, IP address type availability information, (e.g., IPv4 or IPv6), network access ID (NAI) realm list, domain name list and 3GPP cellular network information. Other information elements may be supported. For example, the WiFi Alliance is known to use an enhanced ANQP to enable its HotSpot 2.0 profile.

Implementation of NISE using GAS/ANQP may involve augmentation of the GAS protocol to allow "loading" of information into the advertising server in addition to just querying it.

Support of a D2D service advertisement via an ANQP query/response may be accomplished when the ANQP protocol is extended to support transmission of information associated with D2D. An OMA DM MO may be used as a "container" for this information. Thus, a new OMA DM MO may be created for ANQP. Alternately, the ANDSF may serve as an ANQP advertisement server, with ANQP enhanced to transport the ANDSF MO.

To support D2D via GAS, a significant enhancement of the protocol may be required that supports the loading of advertising content into the advertising server. To implement this, a "GAS advertising request" message and a "GAS advertising response" message may be used. The WTRU may initiate a session to post advertising with a GAS advertising request message containing WTRU identifying information. This message may include secure association (SA) including signaling required to establish an SA between the SA and an advertising server. The message may also include an indicator indicating that this as an initial request, (a default "advertising request ID" may be used). The message may include an indicator informing the server whether the content provided is complete or if more is forthcoming. Some or all of the content to be advertised (or none of such content) may be included.

The advertising server may respond with a "GAS advertising response" message containing SA Parameters. In the initial response, this may include SA parameters which the WTRU may need for follow-on messages. This message may also include a request accept/reject indicator. The server may use the WTRU identification information to determine if it is willing to accept content from the WTRU. If it is, it may send an "accept" indication to the WTRU. Otherwise, it may issue a "reject" indicator. The message may also include an "advertising request ID" that the WTRU may use in follow-up messages to identify the content of the follow-up message. If the request is rejected, this indicator may not have a meaning. The message may also include a content positive acknowledgement (ACK)/negative ACK (NACK) to indicate whether the server is able to process and post the information presented, (this may be different from the accept/reject indicator which is related to the server's ability accept any content from the WTRU). If the initial request is rejected, this indicator may not have a meaning.

If the WTRU did not send the complete set of advertising information in the initial "GAS advertising request" message, it may issue follow-up requests with WTRU identifying information that matches the initial request, and SA parameters, as derived from the previous response. The "advertising content ID" provided in the initial response may be used. The follow-up requests may include an indicator informing the server whether the content provided is complete or if more is forthcoming, and payload (content).

The response to such request may include SA Parameters, (for the next follow-up request). The accept/reject field may be set to "accept" since the server has already accepted the request. The "advertising request ID" may be set to the correct value and the content ACK/NACK may be used as described above.

An SA may be established between the WTRU and the advertising server to prevent numerous security threads, including posting of false or undesired information, denial-of-service attacks designed to overload the advertising database (DB), and the like. SA establishment may depend on whether the advertising is done before or after the WTRU has been given access to the IEEE 802.11 network. If the WTRU has already been gained access to the 802.11 network in IBSS mode, an SA between the WTRU and the infrastructure may already exist. This SA may then be used as the SA between the WTRU and the advertising server, (sharing of the SA within the infrastructure is implementation dependent). If the WTRU has not been given access to an 802.11 network, as is the case for ANQP, then the SA may be established directly between the advertising server and the WTRU. This SA may be completely separate from the SA which the WTRU may establish with the IEEE 802.11 network at a later time. The SA may be in existence for the duration of a single advertising content posting session, (i.e., the initial request and follow-up requests using the same content ID). The means for establishing this SA may be specific to the advertising server. For example, if the ANDSF is used as advertising server, the SA establishment procedure or a datagram transport layer security (DTLS) may be used. If the WTRU is part of a WTRU that is connected to a 3GPP network, a 3GPP generic bootstrapping architecture (GBA) framework may be used.

The discovery itself may be viewed from different points of view. At the service level, a device discovery may culminate in the knowledge that a certain wireless transmit/receive unit (WTRU) is in proximity. Service level discovery may be avoided if devices are provisioned accordingly, (e.g., a packet switched (PS) case). At the radio access network (RAN) level, discovery may precede link establishment. From the radio perspective, it is possible that the device discovery may occur on different frequencies as compared to the communication, (in this case, the judgment of the quality of the D2D link in the discovery frequency may have to be translated into a judgment of the corresponding D2D data link frequencies or an additional RAN level discovery performed). Further, one may envision discovery over a physical link between the devices, followed by communication over a local path of another radio access technology (RAT).

There may be a few use-cases for discovery. For example, to detect physical proximity for applications, (e.g., Foursquare, Facebook), or to detect radio frequency (RF) conditions for direct point-to-point data link, (for direct link communication, including offloading and public safety).

A method and apparatus are described for supporting a two-stage device-to-device (D2D) discovery using a D2D interworking function (IWF). A D2D IWF component may be configured to perform mapping between an application running on an application server and a 3GPP network, and provide a set of application programming interfaces (APIs) to allow discovery to be provided as a service to D2D applications. An application ID may be mapped to a 3GPP ID. Further, a method and apparatus are described for performing client-server discovery. A first wireless transmit/receive unit (WTRU) may be configured for a listen-only operation, and a second WTRU may be configured to transmit beacons. The first and second WTRUs may perform a radio access network (RAN) discovery procedure at an access stratum (AS) layer. In addition, D2D service registration may be performed by a WTRU registering with a network and obtaining a WTRU ID. The WTRU may register with an application server or a D2D server, and the WTRU may complete device discovery. The WTRU may be triggered to initiate radio access network (RAN) discovery. A method and apparatus for performing charging for D2D service using a D2D IWF are also described.

Architecture and procedures are described herein for providing service primitives and charging support for device-to-device (D2D) discovery using a D2D IWF. The architecture and procedures described herein may be applicable to both the network and WTRUs operating in D2D communications. The D2D IWF, (i.e., D2D/ProSe server), may be a logical entity providing an interface to a D2D/proximity services (ProSe) application server.

A direct path, wherein the physical communication is directly between two D2D devices, and a local path, wherein communication may be established through an eNB to which both of the D2D devices are connected, may both define scenarios that are within the scope of proximity services (ProSe) used for supporting D2D communications. Several use cases defined for ProSe may impose a new set of requirements on the system design. These requirements may be broadly categorized under commercial and public safety. Public safety requirements may be considered to be a super-set of the commercial requirements.

The social use cases may include a restricted case, whereby D2D users may be able to discover and be discoverable by other D2D users that they have specified, (e.g., that belong to their user group (for, e.g., a friends' list), and then use a social network application over the D2D link (but not necessarily do)). The discovery is performable without any WTRU location information.

The social use cases may include an unrestricted discovery case, whereby a D2D user may be discoverable by any other D2D user without needing specific prior permission from the discovered WTRU.

The social use cases may include a different public land mobile network (PLMN) discovery, whereby D2D users belonging to different PLMNs may be discoverable to each other. A sub-set of this may be when the D2D users are also roaming.

The social use cases may include a service continuity case. For an offloading case, D2D users may be able to move between a direct path and an infrastructure mode without the switch being apparent to the user.

The social use cases may include a location and presence case, whereby operators may be able to enhance their location and presence information with ProSe procedures. A somewhat different mode of discovery may occur when two WTRUs that are already communicating with each other are close enough so that the operator may switch them to a D2D mode without their request. It may include all the elements of discovery: a non-access stratum (NAS) as well as a RAN. However, there may not be an interaction with an application server and an identity may be derived, (e.g., from their Internet protocol (IP) addresses).

The public safety use cases may include all commercial use cases, a basic PS use case whereby two authorized PS users are able to communicate directly over the D2D link, a PS D2D user is able to maintain multiple simultaneous one-to-one D2D session with different D2D PS users, one to many communications, WTRU as a relay between two other WTRUs, a WTRU as a relay to infrastructure, and communications in multicast mode without prior discovery.

Depending on the use-case, the following implementation options may be possible:

1) Network based discovery—NAS+core network elements may be applicable if proximity is the only service desired to be supported. For example, user X may need to find out if user Y is in the vicinity of 100 m and if the deployment geometry is fine enough to make it meaningful, (a 5 km rural macro cell is not very useful). This may be used as a pre-filter to reduce the load of discovery on the system by limiting it to those WTRUs that are likely in proximity.

2) RAN based discovery (PHY impacts) may be applicable if the use-case is to establish a direct point to point link or if a more accurate relative distance information is required. In this case, the RF conditions may be determined between the devices. The physical layer may support transmission of discoverable waveforms and/or other information bearing messages and their reception.

3) Use another RAT, (e.g., WiFi), for discovery. As a hybrid solution, the network may use 1) to detect whether users are in "proximity" of each other, and then trigger discovery and user-link on another RAT. In this case, the WLAN discovery may be viewed as a RAN level discovery.

While the WTRUs, (i.e., mobile devices), may access application servers with which they have a service agreement, the mobile network (MN) may not.

Some of the functionalities of the D2D-IWF are that it hides the 3GPP operator's internal network topology, it terminates the interfaces to the D2D server, MME, HSS and performs the appropriate protocol translation, it may authenticate the D2D server before it communicates with the 3GPP network, and it may authorize and support control plane messaging to and from the D2D server. The proximity service may be implemented as a client application in the WTRU, also referred to as a user agent hereinafter. Any interaction between the application and the IWF may be through the user agent. The IWF may still need to obtain relevant user profile and authentication profile from the application server directly. The WTRU may receive the information through application programming interfaces (APIs) from an application on the WTRU which, in itself, may interact with the application server. The interaction of the application with the application server is out of scope for 3GPP. Nevertheless, certain information may be exchanged for D2D to work properly as described below.

Solutions are described to enable directed and client-server discovery of users using an interworking function entity (D2D IWF) and how discovery may be provided as a service by the operator. Methods are described for enabling an operator to charge the application services for this service. The D2D IWF function may be expanded to allow charging of discovery service to the application provider. Charging for discovery services using a D2D IWC component is also described below.

The D2D IWF component may perform mapping between applications, (e.g., Facebook, Foursquare), and a 3GPP network. The mapping function may perform mapping of an application ID to a 3GPP ID, (e.g., the 3GPP international mobile subscriber identity (IMSI)). While the operator may control the mapping operation, (by interacting with the application server), the operator may not need to be aware of the permanent application ID. Rather, a temporary ID may be provided by the application server.

The D2D IWF component may hold current reachability information of the WTRU, or it may perform interrogation of the appropriate components (e.g., the home location register (HLR)/home subscriber server (HSS)), when needed, to map an external ID to the 3GPP ID of the associated WTRU subscription and gather WTRU reachability information.

The D2D IWF may initiate device discovery on application request. The D2D IWF function may also interact with the HSS and policy and charging enforcement function (PCEF) to perform charging assistance for the discovery services provided. The D2D IWF may also generate charging data records (CDRs) with an external ID and an application ID and forward to a charging data function (CDF)/charging gateway function (CGF) over an instance of Rf/Ga.

The D2D IWF may export an API to provide a portal for communication with the application server and/or the application client/user agent running at the WTRU. The API may allow the following functions to be requested from the D2D IWF entity: initiate and terminate discovery of a WTRU, notify the WTRU or application server of the results of discovery, supports authorization and authentication of the application server, report to the application server the acceptance or non-acceptance of the D2D discovery request, or an HSS resolution mechanism for use when multiple and separately addressable HSSs have been deployed by the network operator.

In addition, the D2D IWF may perform an interrogation of the appropriate HSS, when needed for device discovery, to map E.164 mobile station international subscriber directory number (MSISDN) or external ID to IMSI of the associated WTRU, retrieve serving node information for the WTRU, (i.e., serving general packet radio service (GPRS) support node (SGSN)/mobility management entity (MME)/mobile switching center (MSC) address), to determine if an application server is allowed to discover a particular WTRU. Further, the D2D IWF may perform a selection of the most efficient and effective discovery mechanism and shielding this detail from application based on current WTRU serving node information from the HSS/HLR (e.g., serving MME/SGSN/MSC address), the discovery mechanisms supported by the WTRU, the possible discovery services supported by the home public land mobile network (HPLMN) and, when roaming, visited public land mobile network (VPLMN), and any information received from the application server.

The D2D IWF entity may be a logical entity, a new node, or may reside in any of the existing nodes in the 3GPP EUTRAN architecture. The D2D IWF functionality may reside within a policy and charging function (PCRF), and the associated discovery service API may be provided to the application server over an Rx interface.

For each application using D2D service, an application specific ID is introduced. This ID may include an application ID, possibly as previously agreed between a mobile network operator (MNO) and an application provider, a device ID, an application specific user ID provided by the application server or application client (user agent), an operator ID, and/or a domain ID.

In one example, the D2D ID may be of the form: app.device.user@operator.topdomain. The device ID may be a globally unique entity.

The MNO may not need to know what is the nature of the application, only a unique ID for it, as service parameters may be requested directly by the WTRU. A unique application ID across different application servers may be created with standardized application names registered in some service directory, or using long random IDs which leave some low probability of confusion. The implications of such confusion are not severe if the application ID is only used for discovery and the WTRU ID cannot be deduced from it. An application/service identity may be obtained in real time from a third party, (e.g., open ID perhaps at the same time as when it verifies WTRU subscriber identity). A uniform resource ID (URI) may be generated by the application server or the client/user agent The D2D application server may be an application such as Facebook, or it may be a portal/gateway that provides interface to multiple end applications. The application server may communicate with the mobile network through the IWF using the API exported by the IWF.

The D2D application server may be generally aware of the list of users allowed to use the service and their identities, the quality of service (QoS) needs of the service, including any context-specific information (e.g., location limitations), the applicable business terms for provisioning of this service by the mobile network provider such as billing, the users of interest to any particular user of an application, and the application server may also generate the URI for a particular user. The WTRU may run an application client. This client may act as a D2D user agent which interacts with the D2D IWF directly through the exported API. The WTRU may use this API to register with the IWF, provide the URI, provide the list of users of interest, and request/initiate discovery.

D2D impact on existing EPC nodes may be as follows. For the HSS, mapping may be performed between D2D device 3GPP identity and MME, policies, D2D capabilities, modes supported. The DNS entity may perform device reachability tracking, (i.e., it may maintain mapping of which devices are reachable through which IWF entity, i.e., it maintains the mapping between the device URI and an associated IWF ID or IWF IP address.

The key functions performed by the MME may include maintaining a list of interested entities for a particular device, performing monitoring of interested entities, receiving a discovery request from the D2D IWF, receiving a discovery report or proximity report from the WTRU, reporting discovery failure/success to the IWF, or implementation of the proximity detection function. If two devices who are in each other's interested parties list are found to report the same proximity area, and the policies allow them to discover each other, proximity is detected and a NAS message is sent to the two entities.

D2D service registration, service discovery and access procedure may be defined as a multi-stage process. In the first stage, the WTRU may register with the network and obtain required WTRU ID(s). In the second stage, the WTRU registers with the application server or D2D server. Note that D2D server is outside the operator's domain. In the third stage, the WTRU completes device discovery. In the fourth stage, using information obtained from application registration and device discovery, service discovery is completed. At this point, the application server may trigger the WTRU to initiate discovery and connection using another RAT, or initiate RAN discovery. The application registration and initial configuration from the MME to the devices is common in the first step of the discovery process.

Application server initiated device registration may include WTRU registration, whereby each D2D capable WTRU may attach to the cellular network (WTRU registration), and D2D server registration, whereby each D2D capable device may perform registration with D2D server, and obtains device/service URI. (application level signaling). Each D2D capable device may indicate "entities of interest" to the D2D server. Alternately, the D2D device may indicate interest in operating as a listen-only mode device or a transmit-only mode device.

The D2D server may communicate with the D2D IWF. The D2D IWF may perform mapping from the D2D device URI to a device ID (e.g., IMSI). The D2D IWF may obtain an "entities of interest" list from the D2D server. The D2D IWF may obtain a globally unique MME ID (GUMMEI) from the HSS. The D2D IWF may send a configuration to the MME. The configuration may include "entities of interest", or listen-only mode or transmit-only mode.

Alternately, in certain types of applications, the WTRU may directly register with the D2D IWF. The IWF may provide an API to the WTRU for this purpose.

The WTRU may register with the cellular network and sends its D2D capabilities. The MME may provide the WTRU with the IWF address at the end of the attach process. The WTRU may have a D2D client application or a user agent that communicates with the D2D application server or gateway, in order to register with the relevant application. The WTRU may also provide the D2D IWF address to the gateway. The user agent may generate the URI to be used for this application. Alternatively, if the D2D application server generates the URI, then the URI may be provided to the WTRU through the D2D IWF. The D2D application server may provide the WTRU's authentication profile to the D2D IWF. The authentication profile may be associated with the URI that the WTRU is expected to use. The application server may also provide the URI.

The D2D device may communicate with the D2D IWF. The D2D device may register with the D2D IWF. The IWF may authenticate the WTRU and may provide the URI to the WTRU if the URI was generated by the application server. The D2D IWF may register the URI with the DNS. The D2D IWF may possess a mapping from a D2D device URI to a device ID, (e.g., IMSI). The D2D IWF may obtain an "entities of interest" list from the D2D device. The D2D IWF may obtain GUMMEI from HSS. The D2D IWF may send a configuration to the MME. The configuration may include "entities of interest", or listen-only mode or transmit only mode.

The devices with D2D discovery capabilities may operate at any given time in a listen-only mode whereby the device is only listening for discovery beacons, a listen and transmit discovery mode, whereby the device is interested in discovering and being discovered, a transmit only mode, whereby the device is only broadcasting discovery beacons and generic data to nearby WTRUs and the device is only interested in being discovered, and a disabled discovery mode. The discovery procedure may include application registration and a mode specific discovery procedure. A mode specific discovery process may depend on the use-case and the mode in which discovery is performed. In a client-server discovery mode, one device may be passing by another device, whereby a first device is in a listen-only mode until it detects another device, at which time it is reconfigured to move to a transmit/listen mode, and it either notifies the network or respond to the other device, and initiate user-plane communication. In a directed device-to-device discovery mode, devices may specifically try to find each other either by expressly requesting discovery of "entities interested".

Once the application registration is performed, the discovery procedure may be initiated. At a high level the discovery process may be split into 2 stages: stage 1 discovery whereby the MME assists discovery of finding devices in the same "proximity group", and stage 2 discovery whereby air-interface assisted discovery uses a long term evolution (LTE) interface or another RAT, (e.g., WiFi direct). The WTRU may have multiple capabilities to support the discovery process. For example, it may support multiple interfaces (RATs) that may be used for discovery process. Based on WTRU and network capabilities, WTRU preferences, and network and subscriber policies, the WTRU may be configured to use different RATs for discovery process or combination of RATs for discovery process. The configuration may use an evolved universal terrestrial radio access network (EUTRAN) for stage 1 discovery and use WiFi direct for stage 2 discovery. The WiFi functions may be configured using network provided information.

One device may be passing by another device, first device is in listen only mode till it detects another device at which time it is reconfigured to move to transmit/listen mode, and it either notifies the network or responds to the other device, and initiates user-plane communication.

Figure 22A:
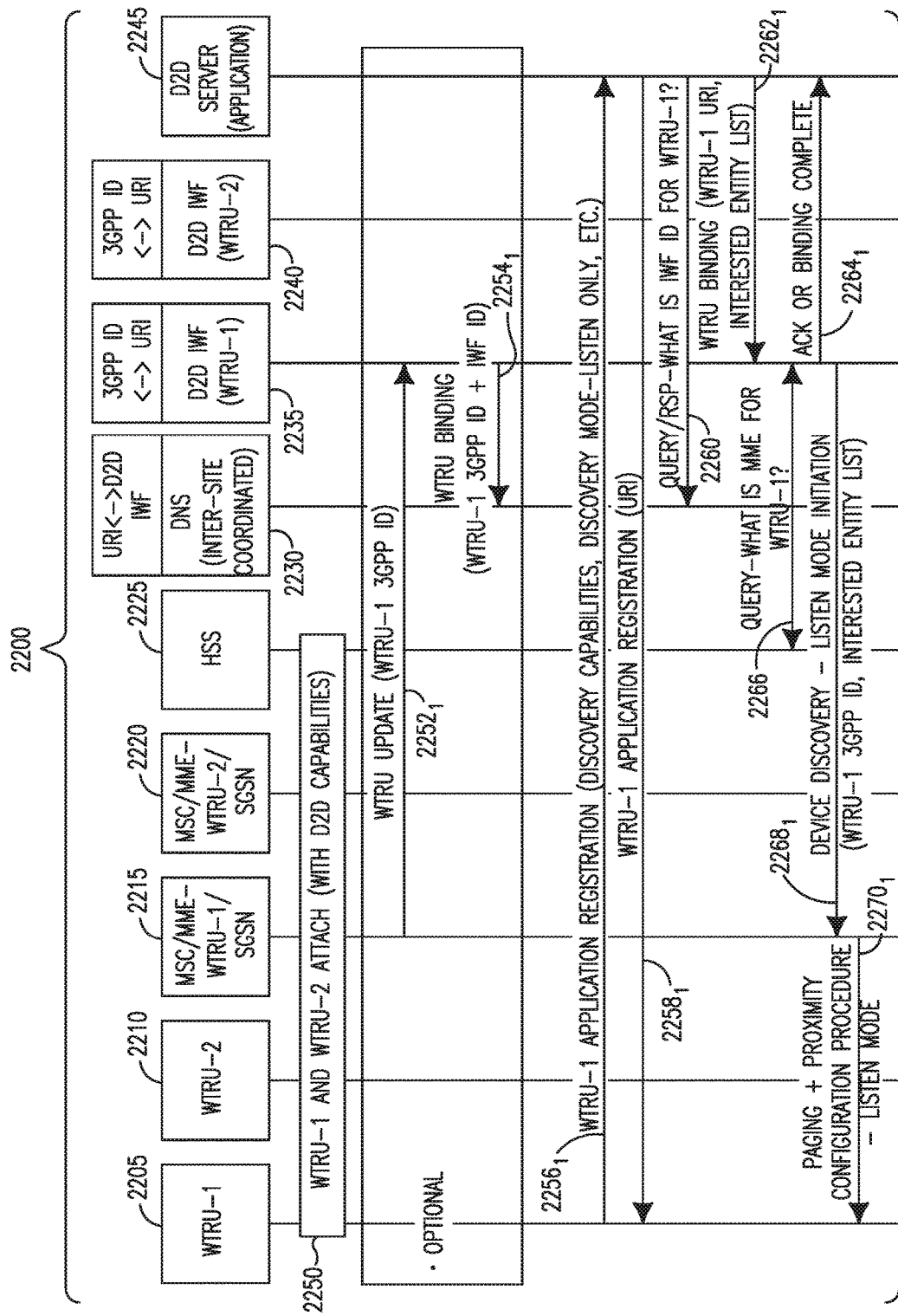
FIGS. 22A-22C, as taken together, are a signal flow diagram of an example client-server discovery procedure.
Figure 22B:
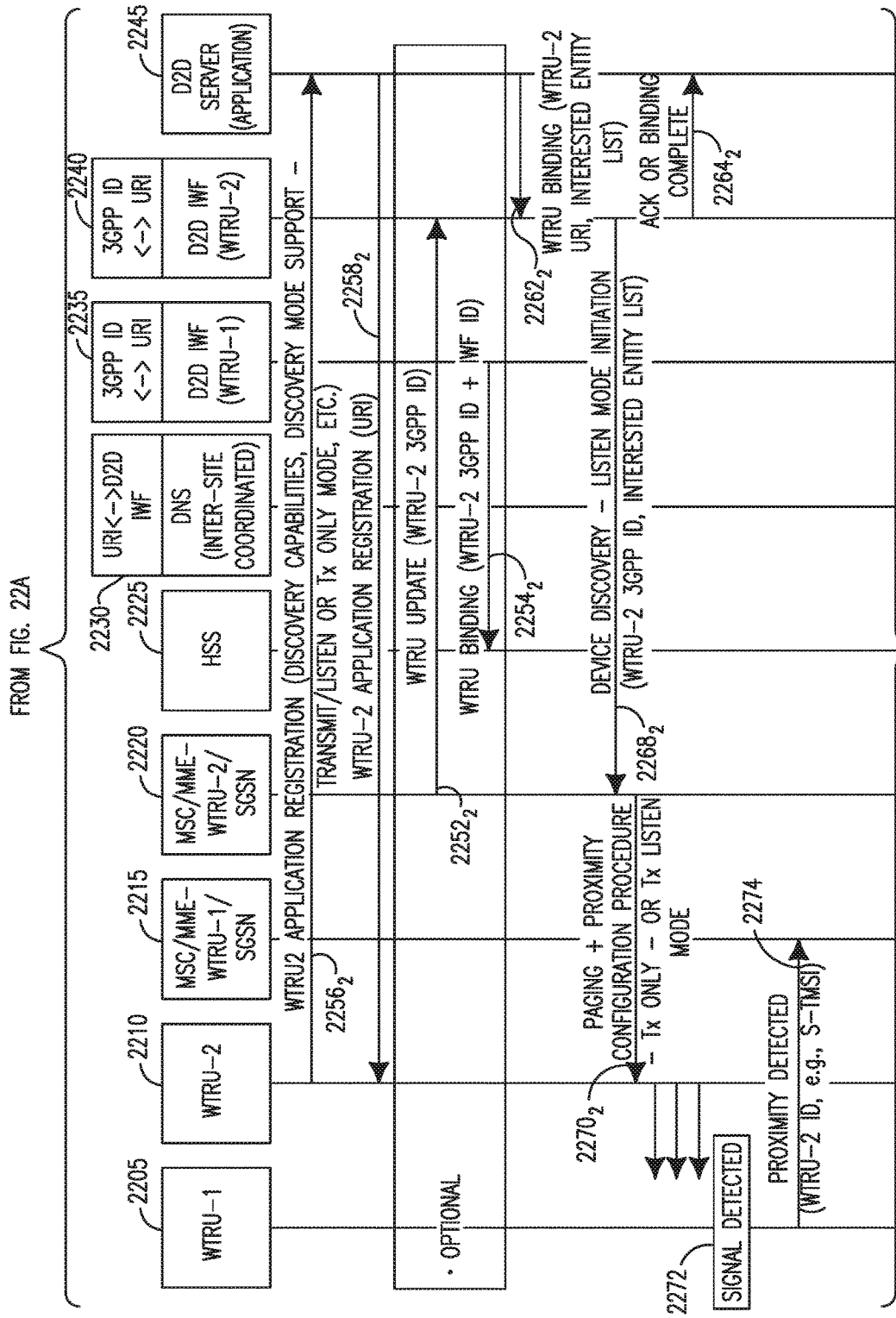
Figure 22C:
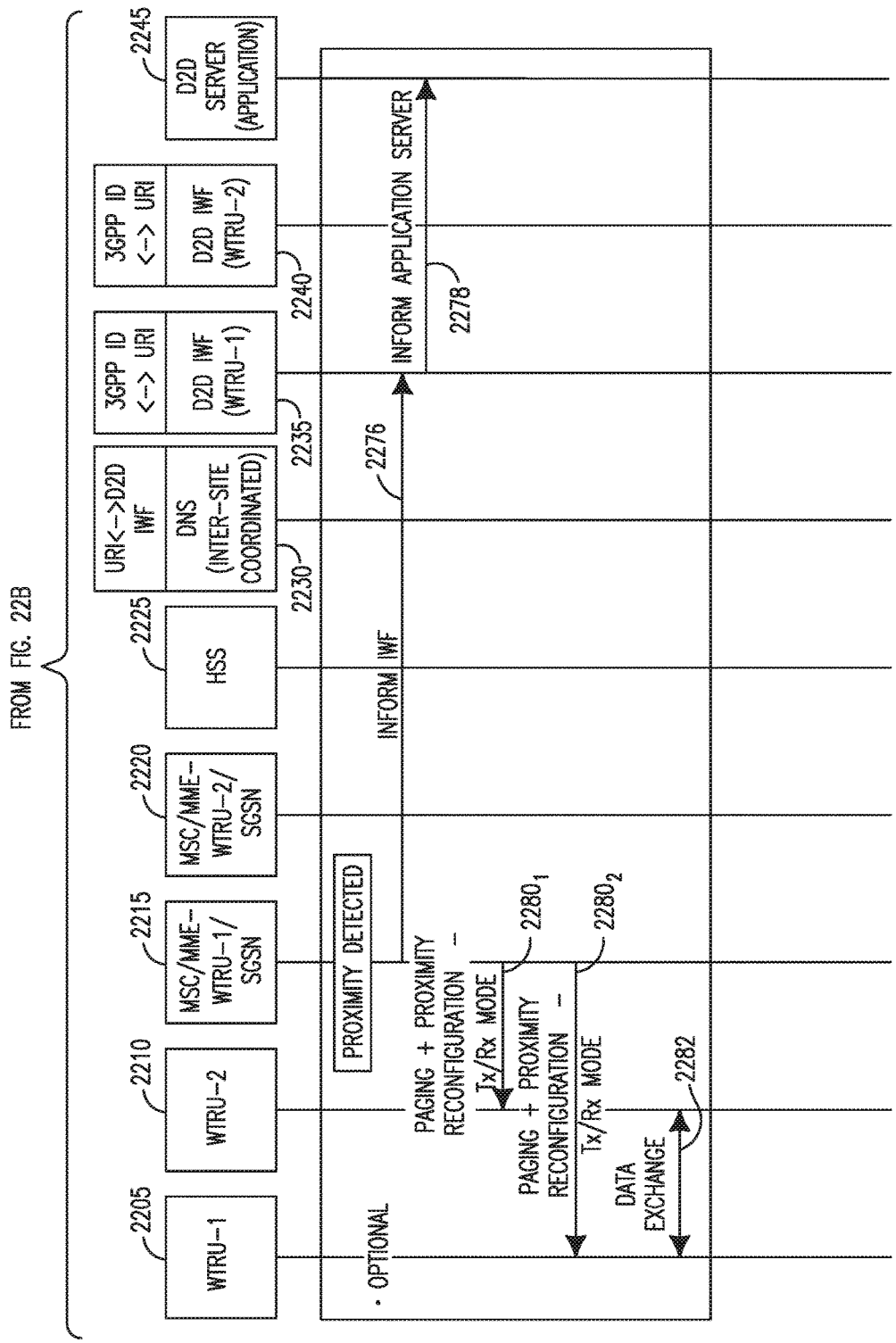

FIGS. 22A-22C, taken together, are a signal flow diagram of an example client-server discovery procedures in a wireless communication system 2200 including a first WTRU 2205, a second WTRU 2210, a first MME 2215, a second MME 2220, an HSS 2225, a domain name system (DNS) 2230, a first D2D IWF 2235, a second D2D IWF 2240 and a D2D (application) server 2245.

As shown in FIG. 22A, the WTRUs 2205 and 2210 may perform an attach procedure, (with D2D capabilities), (2250). The MME 2215 may configure the WTRU 2205 for listen-only operation, and the MME 2220 may configure the WTRU 2210 to initiate transmission of beacons. The WTRU 2205 configuration may include when to transmit beacons, periodicity, duty cycle and the like. The WTRU 2210 configuration may include a scrambling ID for a beacon, a ramp-up/ramp-down procedure for a beacon transmission, periodicity, and the like. The WTRU 2205 may listen for beacons and, on detecting any beacons, it may send a report to the MME 2215. If WTRUs 2205 and 2210 are within same "proximity area", the MME 2215 may inform the D2D IWF 2235, and the D2D IWF 2235 may inform the D2D server 2245. If stage 2 is entered, WTRUs 2205 and 2210 may perform RAN discovery transmissions/reception at an access stratum (AS) layer.

As shown in FIG. 22A, the MME 2215 may send a WTRU update message $2252_1$ with a 3GPP ID of the WTRU 2205 to the D2D IWF 2235, which in turn may send a WTRU binding message $2254_1$ with the 3GPP ID of the WTRU 2205 and an ID of the IWF 2235 to the DNS 2230. A 3GPP ID may include, but is not limited to, at least one of an IMSI, an MSISDN or a 3GPP external ID, (e.g., a URI). Examples of an IWF ID may include, but is not limited to, an IP address of the IWF, or an ID that may be mapped to an IP address, such as a URI.

Still referring to FIG. 22A, the WTRU 2205 may send an application registration message $2256_1$, (including discovery capabilities, discovery mode support-listen only, and the like), to the D2D server 2245, which in turn may send an application registration message $2258_1$ including a 3GPP external ID, (e.g., URI), to the WTRU 2205. Query and response messages 2260 may be exchanged between the DNS 2230 and the D2D server 2245 to determine what the IWF ID is for the WTRU 2205. The D2D server 2245 may send a WTRU binding message $2262_1$ to the D2D IWF 2235, including the 3GPP external ID, (e.g., URI), of the WTRU 2205, and an interested entity list. The D2D IWF 2235 may send an acknowledgement (ACK) or binding complete message $2264_1$ to the D2D server 2245. The HSS 2225 and the D2D IWF 2235 may exchange messages 2266 to query what MME is assigned to the WTRU 2205. The D2D IWF 2230 may then send a device discovery—listen node initiation message $2268_1$ to the MME 2215 including the 3GPP ID of the WTRU 2205 and an interested entity list. The MME 2215 may then send a paging and proximity configuration message $2270_1$ to the WTRU 2205 that indicates a listen mode procedure.

As shown in FIG. 22B, the WTRU 2210 may send an application registration message $2256_2$, (including discovery capabilities, discovery mode support-transmit/listen or transmit-only mode, and the like), to the D2D server 2245, which in turn may send an application registration message $2258_2$ including a 3GPP external ID, (e.g., URI), to the WTRU 2210. The MME 2220 may send a WTRU update message $2252_2$ with a 3GPP ID of the WTRU 2210 to the D2D IWF 2240, which in turn may send a WTRU binding message $2254_2$ with the 3GPP ID of the WTRU 2210 and an ID of the IWF 2240 to the DNS 2230. A 3GPP ID may include, but is not limited to, at least one of an IMSI, an MSISDN or a 3GPP external ID, (e.g., a URI). Examples of an IWF ID may include, but is not limited to, an IP address of the IWF, or an ID that may be mapped to an IP address, such as a URI.

Still referring to FIG. 22B, the D2D server 2245 may send a WTRU binding message $2262_2$ to the D2D IWF 2240 including the 3GPP external ID, (e.g., URI), of the WTRU 2210, and an interested entity list. The D2D IWF 2240 may send a send an ACK or binding complete message $2264_2$ to the D2D server 2245. The D2D IWF 2240 may then send a device discovery initiation message $2268_2$ to the MME 2220 including the 3GPP ID of the WTRU 2210 and an interested entity list. The MME 2220 may then send a paging and proximity configuration message $2270_2$ to the WTRU 2210 that indicates a transmit-only or a transmit/listen mode procedure. When the WTRU 2205, for example, detects a signal (2272), the WTRU 2205 may send a proximity detected message 2274 to the MME 2215 including the ID of the WTRU 2210 and, for example, an S-temporary mobile subscriber identity (S-TMSI).

As shown in FIG. 22C, the MME 2215 may then send a message 2276 to inform the IWF 2235 that proximity was detected, which then may send a message 2278 to inform the D2D server 2245 that proximity was detected. The MME 2215 may send a paging and proximity reconfiguration transmit/receive mode message $2280_1$ to the WTRU 2210, and send a paging and proximity reconfiguration transmit/receive mode message $2280_2$ to the WTRU 2205. Then a data exchange 2282 may take place between the WTRUs 2205 and 2210.

Figure 23B:
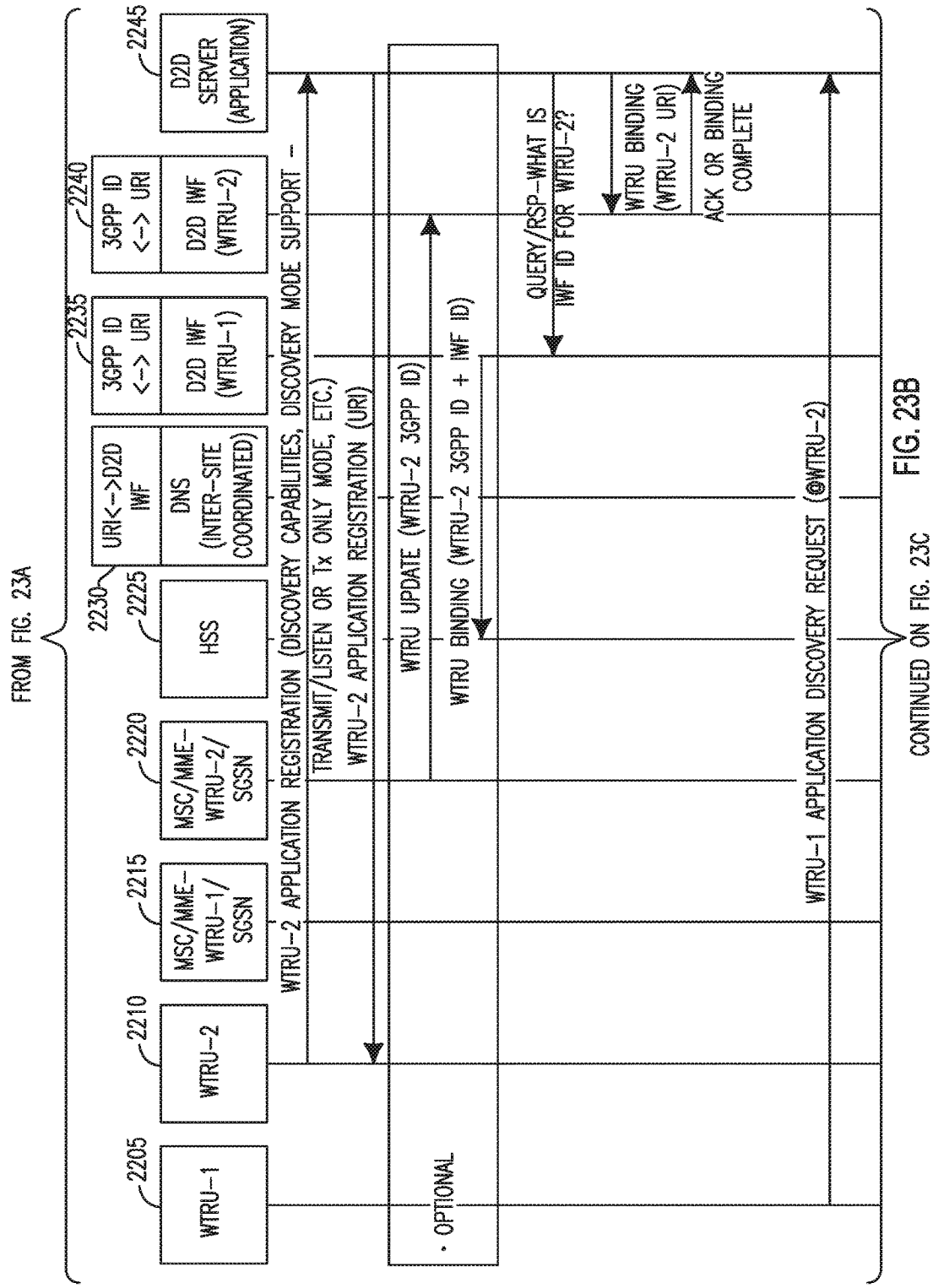
Figure 23C:
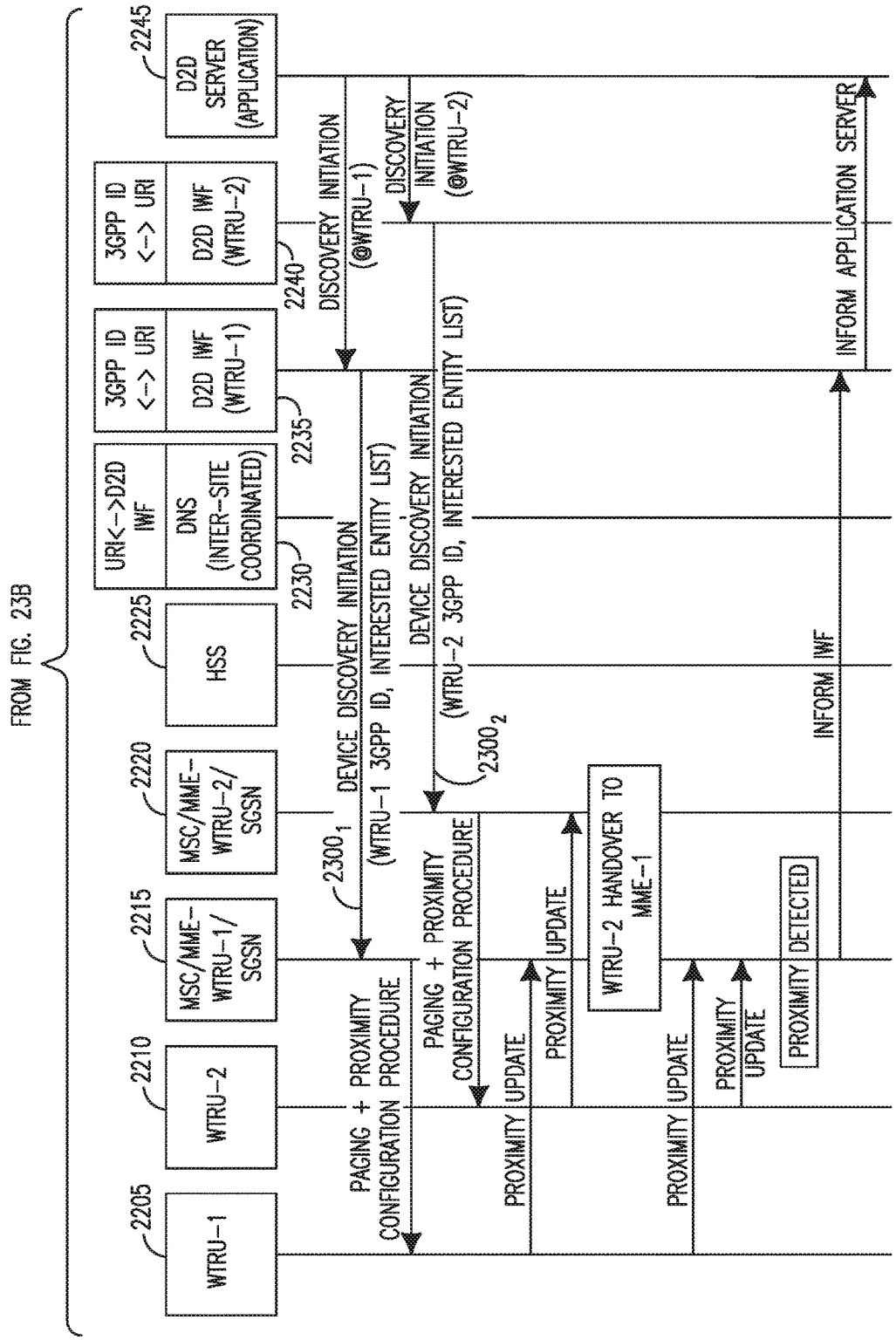

FIGS. 23A-23C, taken together, are a signal flow diagram of an example device-initiated directed service discovery procedure, similar to FIGS. 22A-22C. In a device-initiated directed discovery procedure model, the WTRU user agent may indicate the interested entity list, (i.e., the set of WTRUs that need to be discovered), to the application server. The device discovery initiation messages $2300_1$ and $2300_2$ shown in FIG. 23C may include the interested entity list.

Figure 24A:
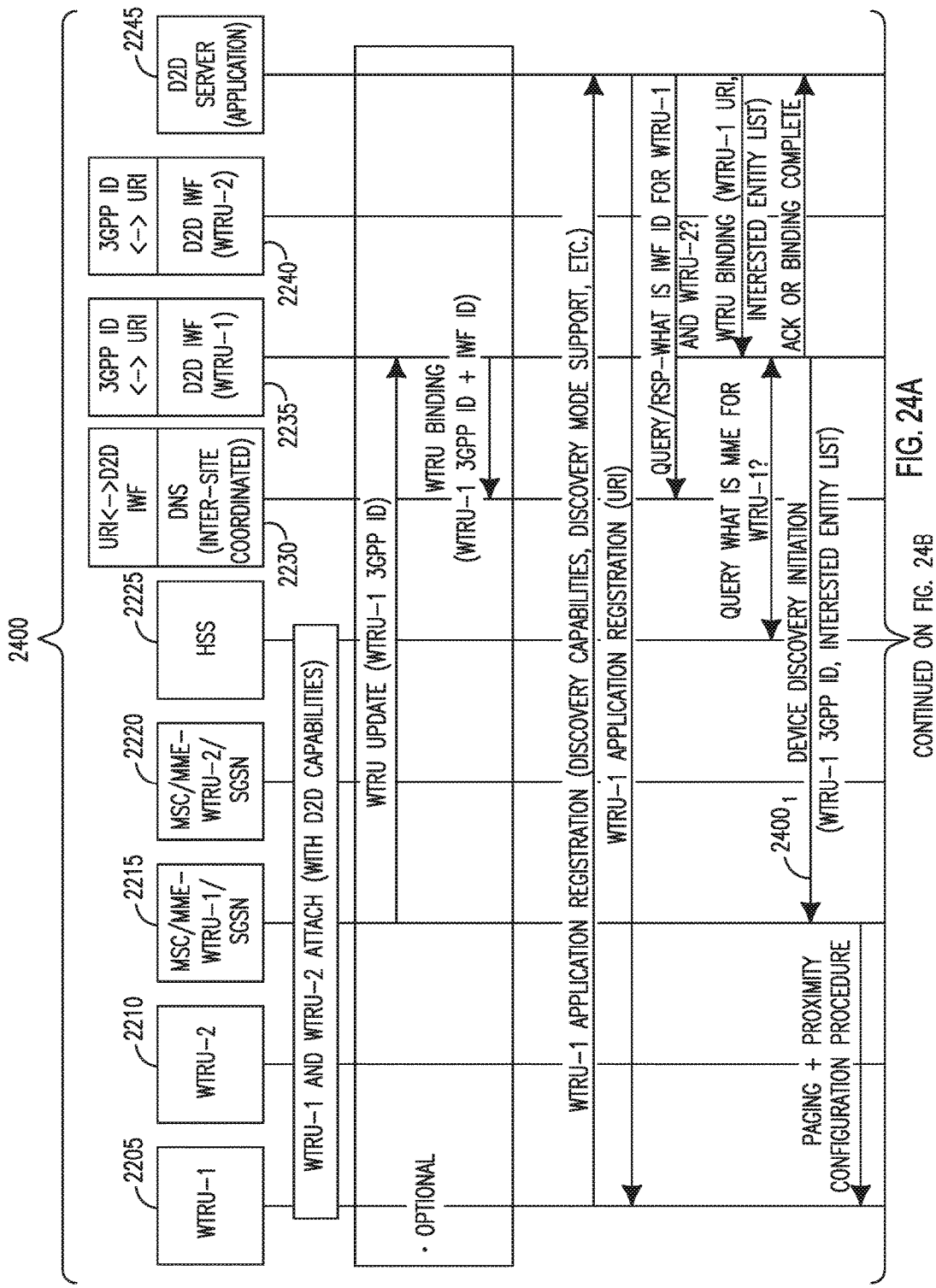
FIGS. 24A-24C, as taken together, are a signal flow diagram of an example network-initiated directed service discovery procedure.
Figure 24B:
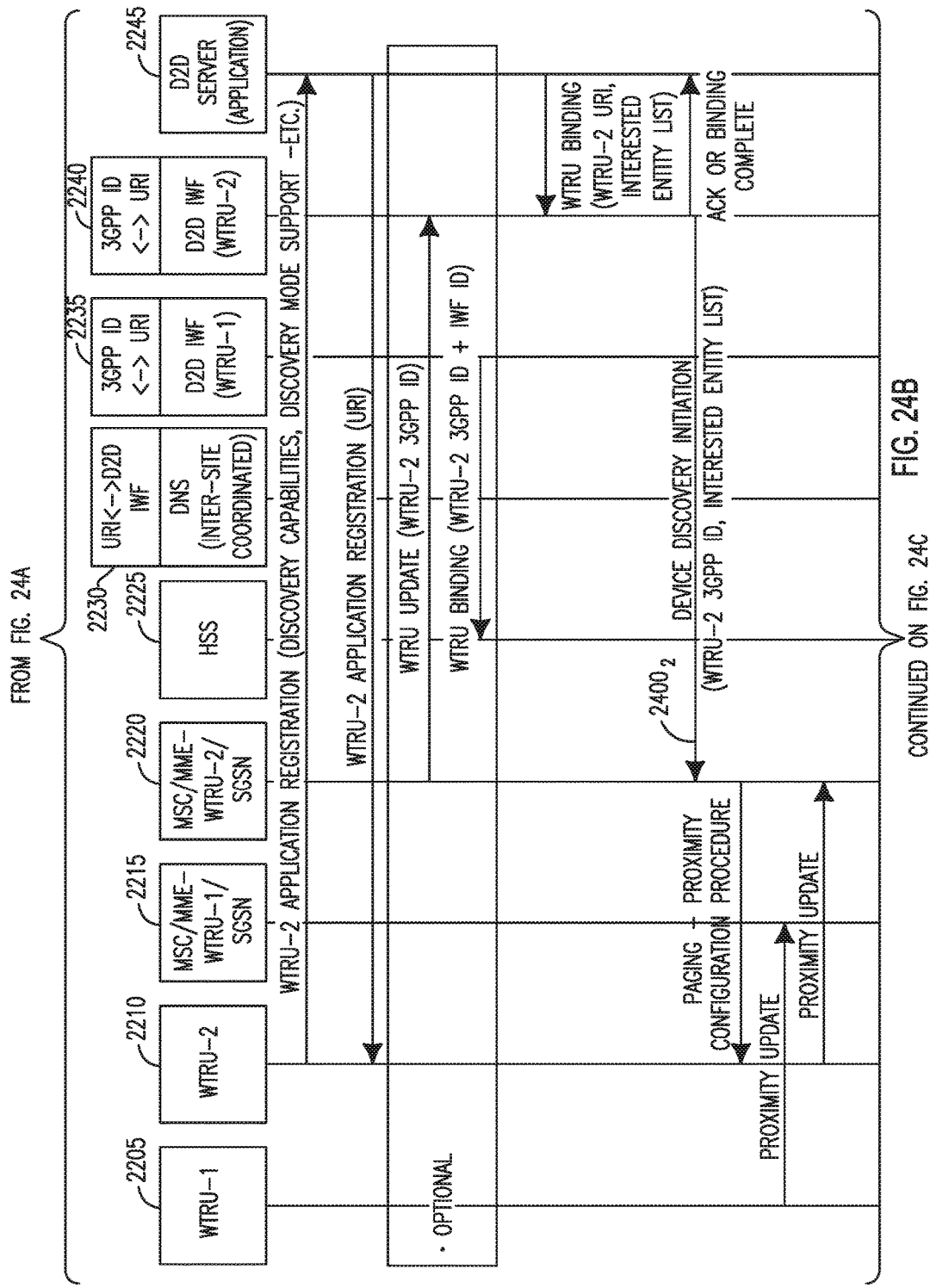
Figure 24C:
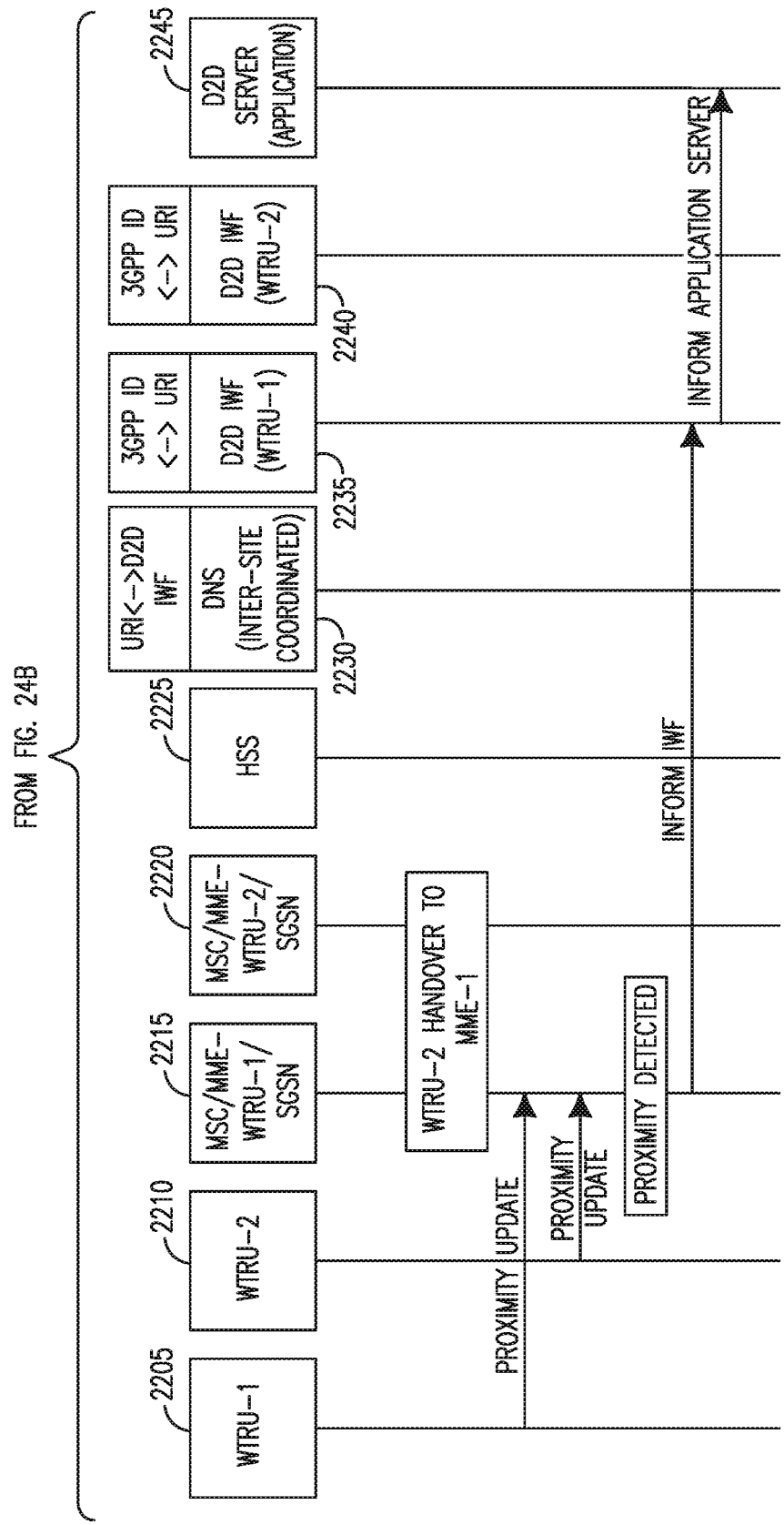
Figure 25A:
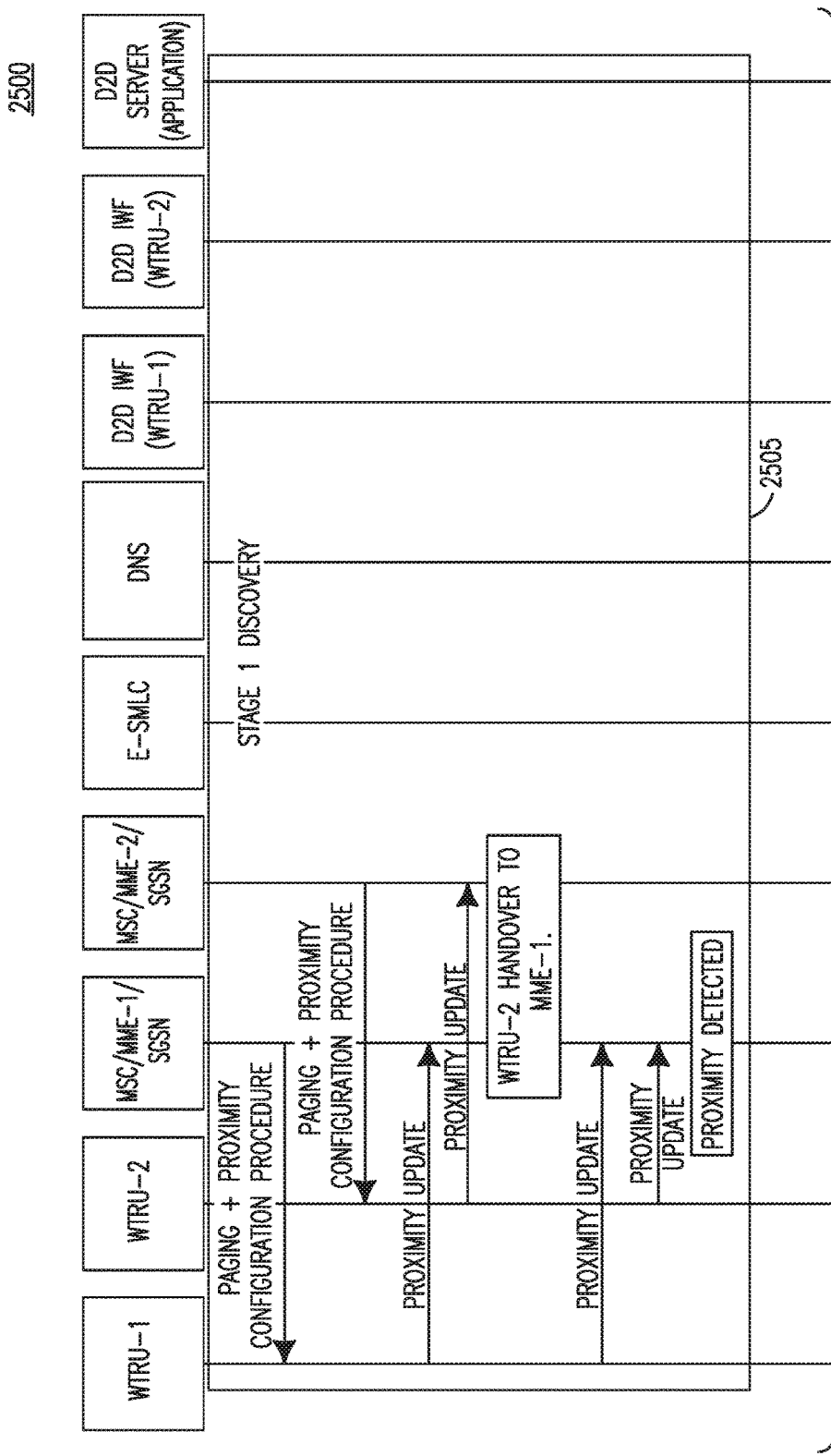
FIGS. 25A and 25B, taken together, are a signal flow diagram of an example point-to-point radio access network (RAN) level discovery procedure.
Figure 25B:
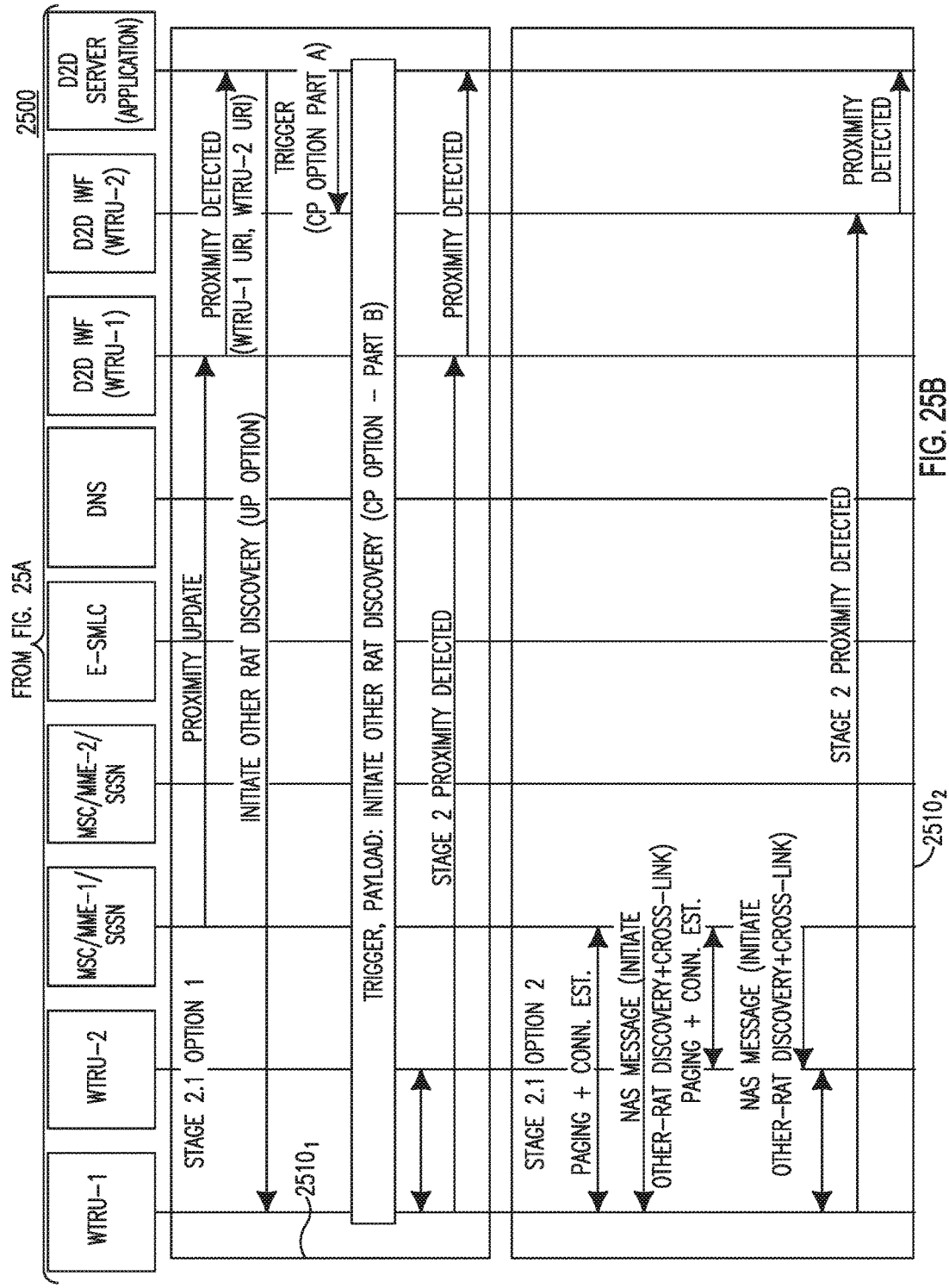
Figure 26A:
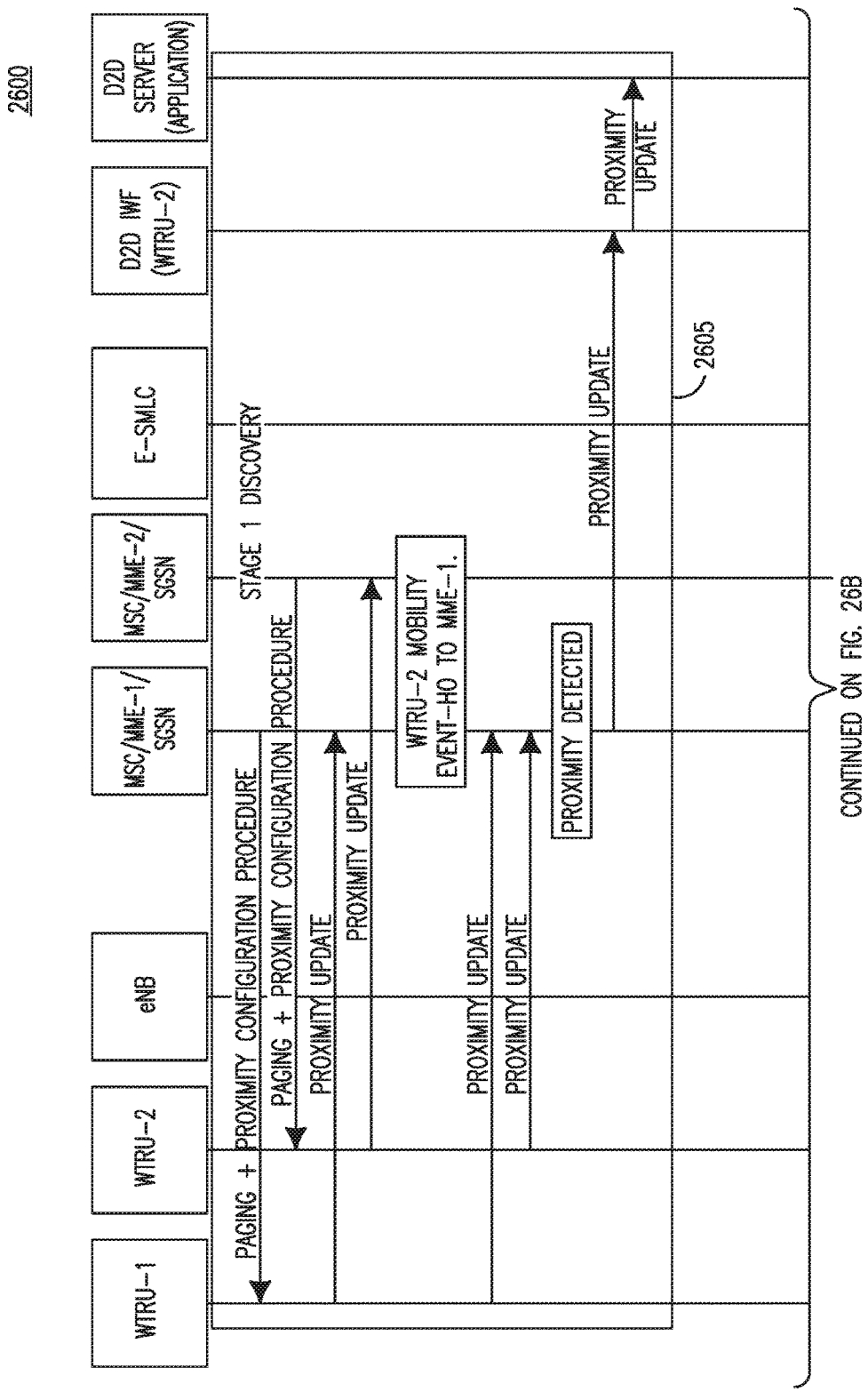
FIGS. 26A and 26B, taken together, are a signal flow diagram of another example point-to-point RAN level discovery procedure.
Figure 26B:
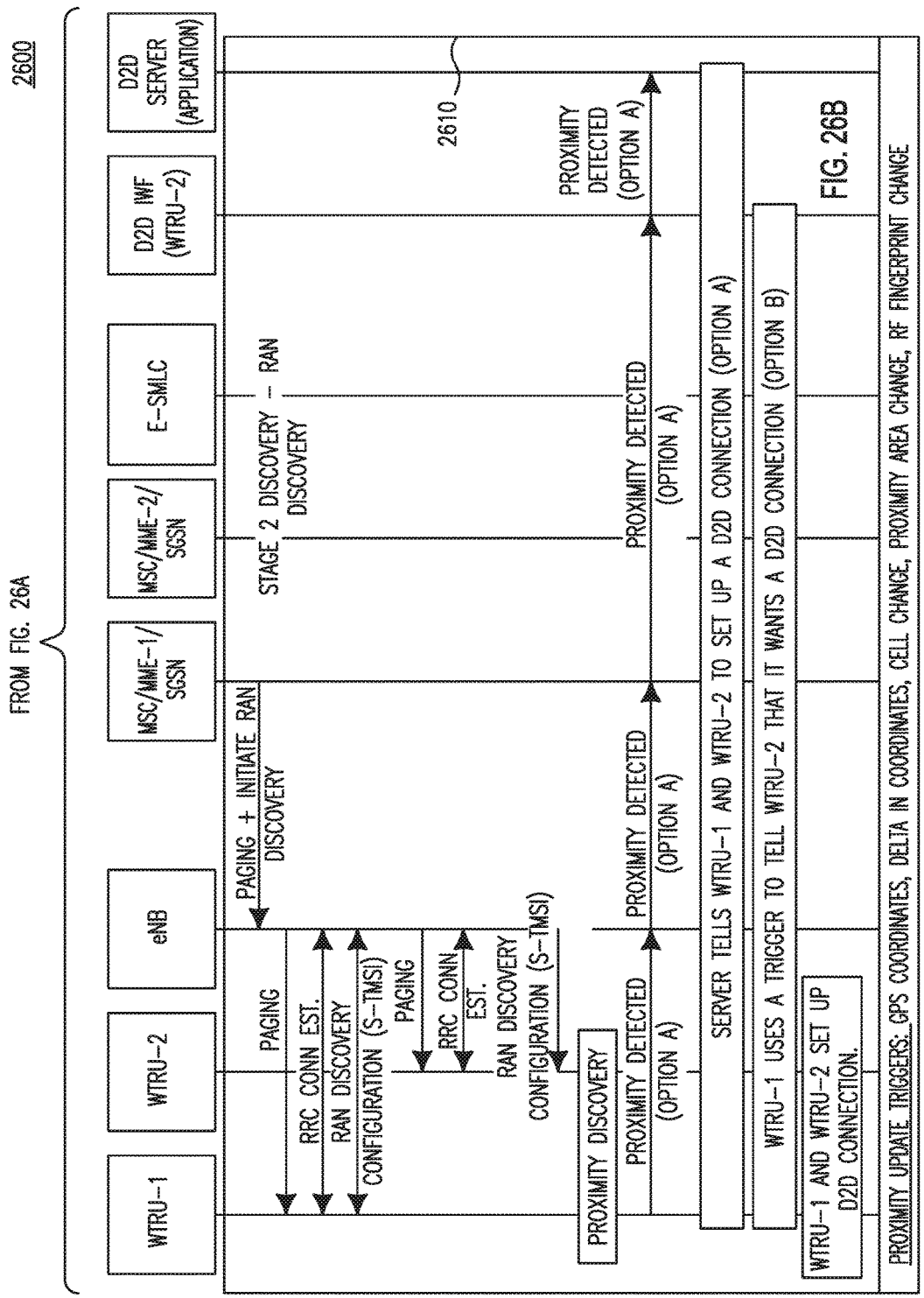

FIGS. 24A-24C, taken together, are a signal flow diagram of an example network-initiated directed service discovery procedure, similar to FIG. 22. In a network-initiated directed device discovery procedure model, the application server may indicate the interested entity list, (i.e., the set of WTRUs that need to be discovered), for a particular WTRU. The device discovery initiation message $2400_1$ shown in FIG. 24A, and the device discovery initiation message $2400_2$ shown in FIG. 24B may include the interested entity list.

In a directed discovery mode, stage 1 may be NAS layer proximity detection, and stage 2 may be AS layer proximity detection using LTE or another RAT. The WTRUs may perform proximity area monitoring/reporting at the NAS layer. The MMEs may configure the WTRUs to perform periodic "proximity reporting". The WTRUs may send periodic proximity reports to the network, (e.g., the MMEs). New NAS messaging from the WTRUs to the MMEs may update the "proximity area". If the WTRUs are within same "proximity area", stage 2 may be entered and the WTRUs may perform RAN discovery transmissions/reception at the AS layer. The MMEs may inform the WTRUs to initiate a "direct link" discovery procedure. Either of the MMEs may page the WTRUs to initiate a connection (mobile terminal (MT) procedure) or the NAS, or the WTRUs may initiate mobile originated call procedures. The WTRUs may complete a radio resource control (RRC) connection with an eNB (not shown). The WTRUs may obtain a discovery configuration from the eNB including information associated with duty cycle, frequencies to send and receive beacons, when to transmit and when to receive, and the like, and when to start, when to stop, and when to report.

In a two-stage discovery process, stage 1 may use a proximity detection procedure. There may be multiple procedures by which the proximity detection function at the MMEs may be implemented. For example, a cell or group of cells may be part of a proximity area and each cell may advertise its proximity area information broadcast in the system information. The WTRU may be configured to periodically report the proximity area code detected in the cell it is camped on to the MME using a new NAS procedure. A proximity area update may be mapped to the tracking area update procedure. The proximity area code may be in the system information block (SIB), (e.g., SIB Type 1->cell Access Related Info->Proximity Area Code). The AS may detect the proximity area code and send it to higher layers.

The proximity update may be triggered by different factors or a configuration that may include location coordinates, delta change in location coordinates, cell ID change, RF fingerprint, proximity area code change, or RF Fingerprint match or change in set of neighbor cell IDs detected.

The WTRU's location may be used to implicitly detect proximity. The WTRU may be configured to report when its location coordinates get updated by a delta threshold value, or the positioning infrastructure nodes, (e.g., the serving mobile location center (SMLC), may send periodic location updates for the WTRUs. The MME proximity mapping function may correlate this information, and when proximity is detected between WTRUs that are interested in discovering each other, the MME may notify the IWF entities associated with the two WTRUs.

In stage 2 where RAN level discovery or other RAT discovery is implemented, a D2D beacon may be used for RAN discovery. The D2D beacon may be encoded with the device ID as follows: hash the full ID (many to one mapping) to beacon ID/AND, transmit multiple beacons (product code), follow initial beacon discovery with a transmission of full ID if indicated by network, or follow initial beacon discovery with the discovery of another beacon directed by the network.

Other RAT discovery and user-plane connection may be implemented. After the initial proximity is detected, the application server is informed, and it may trigger application layer signaling to inform the WTRUs that they should initiate discovery and user-plane connection on the other RAT, (e.g., WiFi). The application server may also configure the WTRUs with assistance information to help in discovery and communication process of the other RAT. The configuration for other RAT may include a wireless service set ID (SSID), configuration of wireless beacon including timing, and the like, and a wireless band/mode/channel to be used for other RAT, and the like.

A Point-to-point RAN level discovery procedure may be implemented if stage 2 discovery is to be performed using an LTE air interface. LTE RAN discovery may be requested for IDLE and/or CONNECTED mode, as long as the WTRU is attached to the network. The WTRU may transmit or receive the discovery signals using in-band or out-of-band resources, as scheduled by the eNB. The WTRU may transmit between uplink (UL) and crosslink (XL) in a time division multiplexing (TDM) manner, where the resource configuration of XL communication may be configured by the WTRU, and may include a sub-frame configuration, (a pattern of sub-frames that are used for XL communication), slot configuration, (e.g., slot 0 used for transmission, slot 1 used for reception), or resource block configuration, (e.g., certain resource blocks are used for XL communication).

FIGS. 25A, 25B, 26A and 26B are signal flow diagrams of an example point-to-point radio access network (RAN) level discovery procedure. The procedure 2500 shown in FIGS. 25A and 25B may include a stage 1 discovery procedure 2505, and possible stage 2 procedures $2510_1$ and $2510_2$. The procedure 2600 shown in FIGS. 26A and 26B may include a stage 1 discovery procedure 2605, and a stage 2 RAN discovery procedure 2610.

D2D discovery architecture may implement a WTRU centric approach. The application server may be generally aware of the list of users allowed to use the service and their identities, the QoS needs of the service, including any context-specific information, (e.g., location limitations), and the like, and the applicable business terms for provisioning of this service by the mobile network provider such as billing.

WTRUs that are registered with their MNO may securely access the application server and establish with it the parameters above. Having established these parameters, they are subsequently stored on the devices. A WTRU that is interested in a service related to the application may contact the MNO and request a new service. Service type and parameters may indicate the nature of any data exchanged for the service, (e.g., "best effort"), the desired link type, (e.g., ProSe), a designator for the individual or groups of users with which service is desired, and a temporary name for an existing service which the WTRU wants to join.

Unless the service is promiscuous, specific user identification may be required. The application server may store on the WTRU the list of users that participate in the initiated sessions. Consequently, the user IDs used by the application may be associated with the user IDs used by the network. For example, the application server and network provider may develop mechanisms of generating and associating the ID used by the network provider with the persistent application identity. Alternatively, third party identity providers trusted by both the application and the mobile network may be used.

In addition to the ID used by the network, there may be a second ID transmitted by WTRUs in order to be discovered. The mapping between the two is one-to-one and known to the network.

OpenID protocols are an example of a protocol that can support such a federated identity management service. The identities used by the network provider may be usable across more than one network provider. For example, one user in a group may be provided application services by one MNO, another user in the same group may be provided application services by another MNO, and the identities may be harmonized across the MNOs and trace back to a single unique identity at the application server.

Once the WTRU and the network provider have negotiated the establishment of a new service, a temporary service name may be created for the service. Service identities obtained from a third party may be unique and therefore may be used across network providers. Others may be unique only within a network provider. The WTRU may be aware of the temporary service name and may provide it to the AppSe.

The application provider may now provide this service name to any user. At this point, the application provider's role may become limited. Its involvement may only be needed when the session needs to be changed, (users come online or leave, session QoS needs to be re-negotiated, or session needs to be terminated). Otherwise, the newly created service may be treated by the network as a generic "named" service with pre-negotiated QoS needs and the network may take over the connectivity management for this service.

Figure 27A:
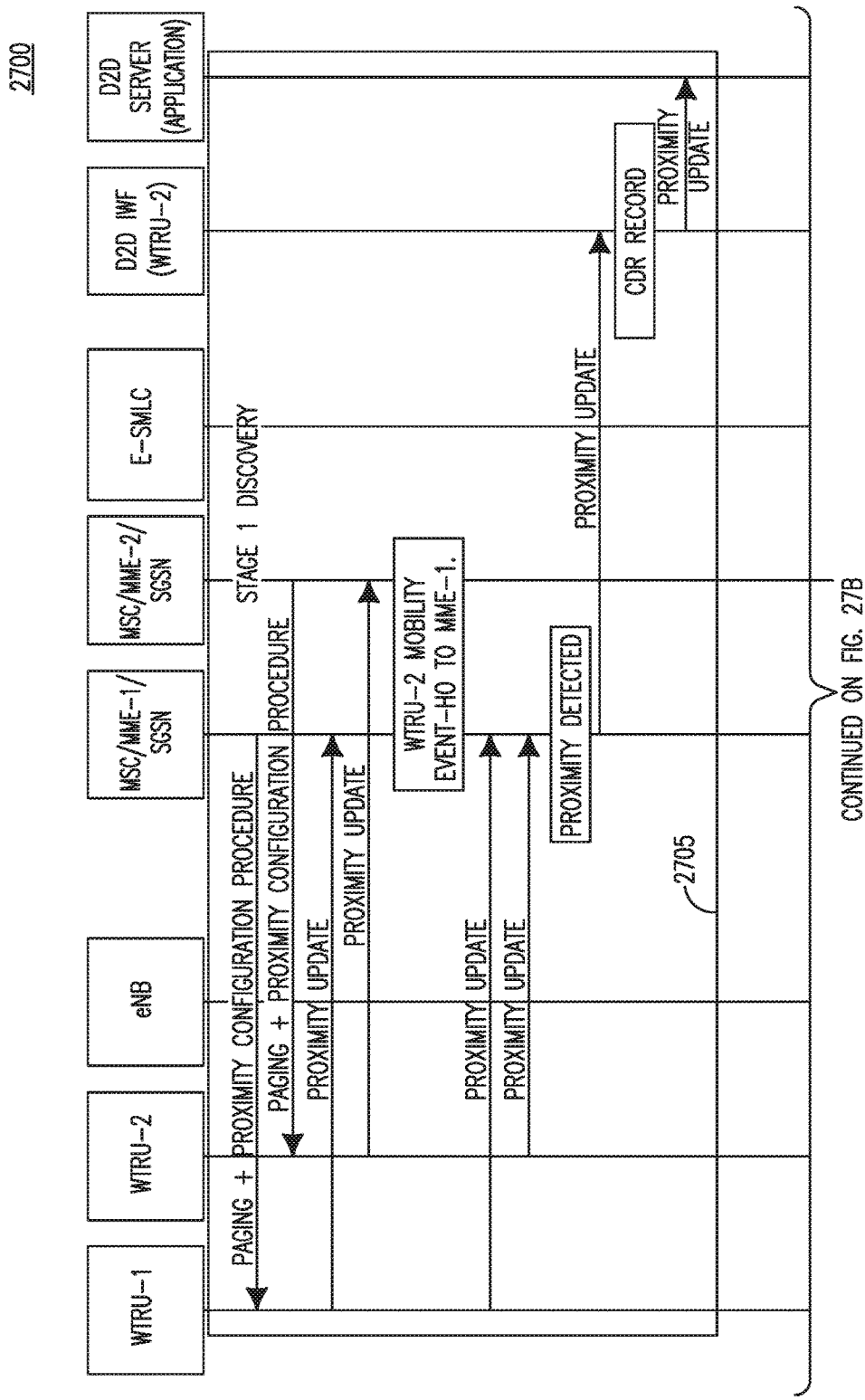
FIGS. 27A and 27B, taken together, are a signal flow diagram of an example D2D procedure of formatting charging data records.
Figure 27B:
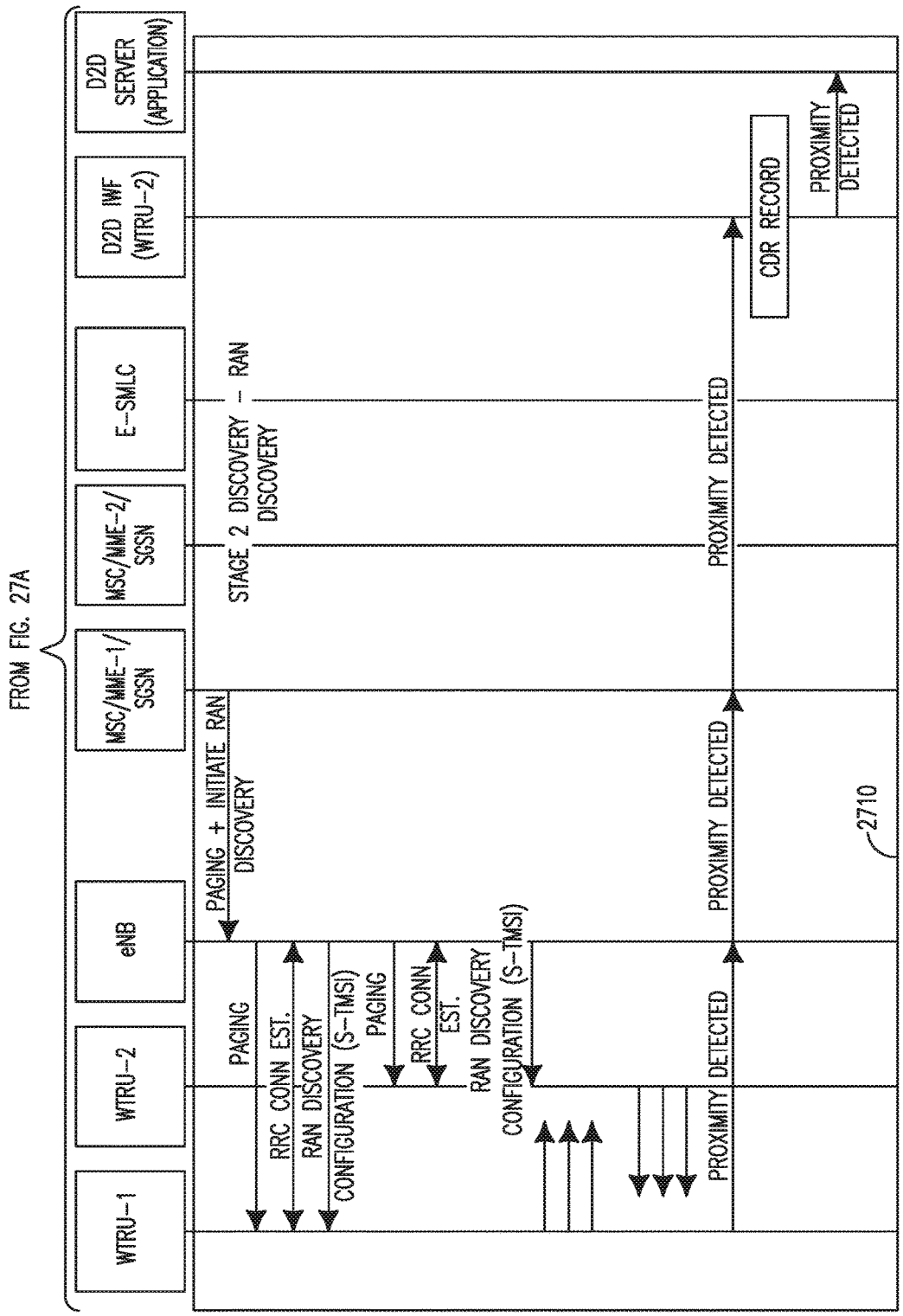

The network operator may use the service name in policies and procedures that the WTRUs and other network equipment may follow. For example, enabling D2D services may require that a particular set of IP addresses be used by the WTRUs for flows that need D2D. In that case, the network may instruct the WTRUs that any flows being originated by the BuildCity application associated with the specific session above may use D2D-enabling IP addresses and source IPs. The network may also collate and coordinate the information from multiple WTRUs that are part of the same service, and manage discrepancies in user lists, policies, and the like. FIGS. 27A and 27B, taken together, are a signal flow diagram of an example D2D procedure 2700 of formatting charging data records. The procedure 2700 shown in FIGS. 27A and 27B may include a stage 1 discovery procedure 2705 and a stage 2 RAN procedure 2710. Charging may be a function within the telecommunications network and the associated online charging system (OCS)/billing domain (BD) components, whereby information related to a chargeable event is collected, formatted, transferred and evaluated in order to make it possible to determine usage for which the charged party may be billed (offline charging) or the subscriber's account balance may be debited (online charging).

A charging data record (CDR) may be a formatted collection of information about a chargeable event, (e.g., time of call set-up, duration of the call, amount of data transferred, and the like), for use in billing and accounting. For each party to be charged for parts of or all charges of a chargeable event, a separate CDR may be generated, (i.e., more than one CDR may be generated for a single chargeable event, e.g., because of its long duration, or because more than one charged party is to be charged).

A charging event may be a set of charging information forwarded by a charging trigger function (CTF) towards the CDF (offline charging) or towards the OCS (online charging). Each charging event may match exactly one chargeable event.

Offline charging may be a process where charging information for network resource usage is collected concurrently with that resource usage. At the end of this process, CDR files may be generated by the network, which may be transferred to the network operator's BD for the purpose of subscriber billing and/or inter-operator accounting, (or additional functions, e.g., statistics, at the operator's discretion). The BD may typically comprise post-processing systems such as the operator's billing system or billing mediation device. The D2D IWF may also perform the charging function for the D2D discovery service and generate a CDR report. The CDR report may be based on RAN resources used or not used for charging, duration of discovery procedure, duty cycle, discovery mode (client server or directed discovery), or a RAT used for discovery and communication process, (e.g., whether WiFi Direct was used for discovery versus LTE RAN resources were used).

The IWF may generate a CDR when discovery is successfully terminated or aborted, or an error condition is detected by the network, (e.g., the HSS detects that the WTRU is unreachable).

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed:

1. A wireless transmit/receive unit (WTRU) configured to support proximity services and capable of performing device-to-device (D2D) communications, the WTRU comprising:

a transceiver and a processor configured to send, to a base station, an attach request message including D2D capability information of the WTRU, wherein the D2D capability information of the WTRU includes at least a D2D direct communication capability indication and a D2D relay capability indication;

wherein the transceiver and the processor are further configured to receive, from the base station, an attach accept message.

2. The WTRU of claim 1, wherein the attach accept message is received on a condition that the WTRU is authorized to perform proximity services by a mobility management entity (MME).

3. The WTRU of claim 1, wherein the transceiver and the processor are further configured to:

send a discovery request message for the WTRU to perform D2D discovery; and receive a discovery response message.

4. The WTRU of claim 3, wherein the discovery request message is initiated by an application running on the WTRU.

5. The WTRU of claim 3, wherein the discovery response message includes a unique identifier (ID) for the D2D discovery.

6. The WTRU of claim 5, wherein the unique ID for the D2D discovery includes an application ID for an application running on the WTRU and requesting the D2D discovery.

7. The WTRU of claim 1, wherein the attach accept message includes a unique identifier (ID) for the WTRU to perform D2D communications.

8. A method performed by a wireless transmit/receive unit (WTRU), wherein the WTRU is configured to support proximity services and capable of performing device-to-device (D2D) communications, the WTRU comprising:

sending, to a base station, an attach request message including D2D capability information of the WTRU, wherein the D2D capability information of the WTRU includes at least a D2D direct communication capability indication and a D2D relay capability indication; and receiving, from the base station, an attach accept message.

9. The method of claim 8, wherein the attach accept message is received on a condition that the WTRU is authorized to perform proximity services by a mobility management entity (MME).

10. The method of claim 8, further comprising:

sending a discovery request message for the WTRU to perform D2D discovery; and receiving a discovery response message.

11. The method of claim 10, the discovery request message is initiated by an application running on the WTRU.

12. The method of claim 10, wherein the discovery response message includes a unique identifier (ID) for the D2D discovery.

13. The method of claim 12, wherein the unique ID for the D2D discovery includes an application ID for an application running on the WTRU and requesting the D2D discovery.

14. The method of claim 8, wherein the attach accept message includes a unique identifier (ID) for the WTRU to perform D2D communications.

* * * * *